United States Patent
Waki et al.

(10) Patent No.: US 6,799,315 B2
(45) Date of Patent: Sep. 28, 2004

(54) HIGH SPEED VIRTUAL MACHINE AND COMPILER

(75) Inventors: Hiroyuki Waki, Hirakata (JP); Shinji Inoue, Neyagawa (JP); Satoru Hayama, Kobe (JP); Mitsuko Fujita, Tokyo-to (JP); Akira Ishikawa, Kashiba (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 10/403,600

(22) Filed: Mar. 31, 2003

(65) Prior Publication Data

US 2003/0191792 A1 Oct. 9, 2003

Related U.S. Application Data

(62) Division of application No. 09/288,263, filed on Apr. 8, 1999.

(30) Foreign Application Priority Data

Apr. 8, 1998 (JP) .............................................. 10-96204

(51) Int. Cl.[7] .............................................. G06F 9/45
(52) U.S. Cl. ...................................................... 717/148
(58) Field of Search ........................................ 717/148

(56) References Cited

U.S. PATENT DOCUMENTS

| | | | |
|---|---|---|---|
| 4,177,514 A | 12/1979 | Rupp ........................... 712/18 |
| 4,587,612 A | 5/1986 | Fisk et al. ..................... 703/26 |
| 5,428,754 A | 6/1995 | Baldwin ...................... 712/220 |
| 5,561,785 A | 10/1996 | Blandy et al. ................. 712/18 |
| 5,724,590 A | 3/1998 | Goettelmann et al. |
| 5,748,806 A | 5/1998 | Gates ........................ 710/315 |
| 5,836,014 A | 11/1998 | Faiman, Jr. |
| 5,889,986 A | 3/1999 | Nguyen et al. ............. 712/237 |
| 5,903,761 A | 5/1999 | Tyma |
| 5,923,883 A | 7/1999 | Tanaka et al. |
| 5,923,892 A * | 7/1999 | Levy ............................ 712/31 |
| 5,933,104 A | 8/1999 | Kimura ........................ 341/87 |
| 6,021,469 A | 2/2000 | Tremblay et al. ........... 711/125 |
| 6,044,222 A | 3/2000 | Simons et al. |
| 6,065,108 A | 5/2000 | Tremblay et al. ........... 712/201 |
| 6,075,935 A | 6/2000 | Ussery et al. ................. 716/17 |
| 6,078,744 A * | 6/2000 | Wolczko et al. ............ 717/153 |
| 6,125,439 A | 9/2000 | Tremblay et al. ......... 712/202 |
| 6,151,618 A | 11/2000 | Wahbe et al. .................. 709/1 |
| 6,158,048 A * | 12/2000 | Lueh et al. .................. 717/118 |
| 6,170,083 B1 | 1/2001 | Adl-Tabatabai |
| 6,289,506 B1 * | 9/2001 | Kwong et al. .............. 717/148 |
| 6,301,652 B1 | 10/2001 | Prosser et al. |
| 6,336,213 B1 * | 1/2002 | Beadle et al. ............... 717/136 |
| 6,381,739 B1 | 4/2002 | Breternitz et al. |
| 6,513,156 B2 | 1/2003 | Bak et al. |
| 6,530,075 B1 * | 3/2003 | Beadle et al. ............... 717/114 |

OTHER PUBLICATIONS

Ertl, M.A., "Stack Caching for Interpreters" Copyright 1995 ACM.

Leung, Allen et al. "Run–time Versus Compile–time Instruction Scheduling in Superscalar (RISC) Processors: Performance and Tradeoffs", 1996, IEEE pp. 215–224.

Natarajan, B. et al., "Spill–free Parallel Scheduling of Basic Blocks", 1995, IEEE pp. 119–124.

* cited by examiner

Primary Examiner—John Chavis

(57) ABSTRACT

A Just-In-Time compiler is provided for use with a virtual machine that executes a virtual machine instruction sequence under the control of a real machine. The compiler converts parts of the virtual machine instruction sequence into the real machine instruction sequence before execution and includes a block start information unit that determines whether the encoded block start information indicates a corresponding virtual machine instruction would correspond to the start of a basic block if the virtual machine instruction sequence was divided into basic blocks. A converting unit converts the virtual machine instructions into real machine instruction sequences and an outputting unit rearranges the real machine instruction sequences from the converting unit into basic blocks in accordance with the block start information. Additionally, the compiler can be enabled by a program stored on a computer readable recording medium.

10 Claims, 91 Drawing Sheets

FIG. 2

| VIRTUAL MACHINE INSTRUCTION | OPERATION CONTENTS | CHANGE IN STACK CONTENTS | SP VALUE |
|---|---|---|---|
| Push | PUSH OPERAND ONTO STACK | s0←operand | sp←sp+1 |
| Pop | POP VALUE OF TOP STACK AND PLACE IT INTO ADDRESS INDICATED BY OPERAND | operand←s0<br>s0←s1 | sp←sp-1 |
| Add | ADD VALUES ON TOP AND SECOND STACKS AND STORE RESULT ONTO STACK TOP | s0←s0+s1 | sp←sp-1 |
| Mult | MULTIPLY VALUES ON TOP AND SECOND STACKS AND STORE RESULT ONTO STACK TOP | s0←s0*s1 | sp←sp-1 |
| Br | JUMP UNCONDITIONALLY TO ADDRESS OF OPERAND | s0←s0 | sp←sp |
| Brz | JUMP TO ADDRESS OF OPERAND IF STACK TOP VALUE IS 0 | DELETE←s0<br>s0←s1 | sp←sp-1 |
| Bnz | JUMP TO ADDRESS OF OPERAND IF STACK TOP VALUE IS NOT 0 | DELETE←s0<br>s0←s1 | sp←sp-1 |
| Call | CALL FUNCTION SPECIFIED BY ADDRESS OF OPERAND | s0←NEXT VIRTUAL MACHINE CODE ADDRESS | sp←sp+1 |
| Ret | JUMP UNCONDITIONALLY TO ADDRESS OF STACK TOP VALUE | DELETE←s0<br>s0←s1 | sp←sp-1 |
| Stop | STOP VIRTUAL MACHINE PROCESSING | INITIAL STATE | sp←0 |

FIG. 3

| OPCODE | JUMP ADDRESS | NUMBER OF OPERANDS |
|---|---|---|
| .. | .. | .. |
| Push | <JUMP ADDRESS OF CODE TO PERFORM Push> | 1 |
| Pop | <JUMP ADDRESS OF CODE TO PERFORM Pop> | 1 |
| Add | <JUMP ADDRESS OF CODE TO PERFORM Add> | 0 |
| Sub | <JUMP ADDRESS OF CODE TO PERFORM Sub> | 0 |
| Inc | <JUMP ADDRESS OF CODE TO PERFORM Inc> | 0 |
| Dec | <JUMP ADDRESS OF CODE TO PERFORM Dec> | 0 |
| Mult | <JUMP ADDRESS OF CODE TO PERFORM Mult> | 0 |
| Div | <JUMP ADDRESS OF CODE TO PERFORM Div> | 0 |
| .. | .. | .. |

| MICROPROGRAM FOR VIRTUAL MACHINE INSTRUCTION "Push" | | |
|---|---|---|
| 1:Inc | r3 | ; INCREMENT SP VALUE BY ONE |
| 2:Load | r0,[r2] | ; EXTRACT OPERAND AND<br>; PLACE IT ONTO REGISTER #0 |
| 3:Inc | r2 | ; INCREMENT VIRTUAL MACHINE PC BY ONE AND<br>; PREPARE FOR READING NEXT INSTRUCTION |
| 4:Store | [r3],r0 | ; PUSH VALUE OF REGISTER #0 ONTO STACK |
| <MICROPROGRAM FOR JUMPING TO NEXT VIRTUAL MACHINE INSTRUCTION> | | |

FIG. 4B

| MICROPROGRAM FOR VIRTUAL MACHINE INSTRUCTION "Add" | | |
|---|---|---|
| 1:Load | r0,[r3] | ; EXTRACT VALUE FROM STACK<br>; PLACE IT ONTO REGISTER #0 |
| 2:Dec | r3 | ; DECREMENT VALUE OF VIRTUAL MACHINE SP BY ONE |
| 3:Load | r1,[r3] | ; EXTRACT VALUE FROM STACK<br>; PLACE IT ONTO REGISTER #1 |
| 4:Add | r0,r0,r1 | ; ADD VALUES OF REGISTER #0 AND #1 AND<br>; PLACE RESULT ONTO REGISTER #1 |
| 5:Store | [r3],r0 | ; PLACE VALUE OF REGISTER #0 ONTO STACK |
| <MICROPROGRAM FOR JUMPING TO NEXT VIRTUAL MACHINE INSTRUCTION> | | |

FIG. 4C

| MICROPROGRAM FOR VIRTUAL MACHINE INSTRUCTION "Mult" | | |
|---|---|---|
| 1:Load | r0,[r3] | ; EXTRACT VALUE FROM STACK AND<br>; PLACE IT ONTO REGISTER #0 |
| 2:Dec | r3 | ; DECREMENT VALUE OF VIRTUAL MACHINE SP BY ONE |
| 3:Load | r1,[r3] | ; EXTRACT VALUE FROM STACK AND<br>; PLACE IT ONTO REGISTER #1 |
| 4:Mult | r0,r0,r1 | ; MULTIPLY VALUES OF REGISTERS #0 AND #1 AND<br>; PLACE RESULT ONTO REGISTER #1 |
| 5:Store | [r3],r0 | ; PLACE VELUE OF REGISTER #0 ONTO STACK |
| <MICROPROGRAM FOR JUMPING TO NEXT VIRTUAL MACHINE INSTRUCTION> | | |

FIG. 4D

| <MICROPROGRAM FOR JUMPING TO NEXT VIRTUAL MACHINE INSTRUCTION> | | |
|---|---|---|
| 1:Load | r0,[r2] | ; READ VIRTUAL MACHINE INSTRUCTION<br>; (JUMP ADDRESS) INDICATED BY PC<br>; INTO REGISTER #0 |
| 2:Inc | r2 | ; INCREMENT VIRTUAL MACHINE PC VALUE BY ONE |
| 3:Jmp | r0 | ; JUMP UNCONDITIONALLY TO LOCATION<br>; INDICATED BY REGISTER #0 |

FIG. 5

| REAL MACHINE INSTRUCTION | OPERATION CONTENTS | NOTATION | | EXAMPLE | |
|---|---|---|---|---|---|
| Load | PLACE VALUE OF DESIGNATED REGISTER (x1) OR THAT OF MEMORY LOCATION ([x1]) DESIGNATED BY REGISTER ONTO VALUE OF DESIGNATED REGISTER (x0) | Load | x0,x1 | Load | r0,r1 |
| | | Load | x0,[x1] | Load | r1,[r2] |
| Store | PLACE VALUE OF DESIGNATED REGISTER (x1) ONTO MEMORY LOCATION [x0] DESIGNATED BY REGISTER | Store | [x0],x1 | Store | [r0],r1 |
| Add | ADD VALUES OF DESIGNATED REGISTERS (x1,x2), AND PLACE RESULT ONTO DESIGNATED REGISTER (x0) | Add | x0,x1,x2 | Add | r0,r1,r2 |
| Mult | MULTIPLY VALUES OF DESIGNATED REGISTERS (x1,x2), AND PLACE RESULT ONTO DESIGNATED REGISTER (x0) | Mult | x0,x1,x2 | Mult | r0,r1,r2 |
| Inc | ADD 1 TO VALUE OF DESIGNATED REGISTER (x1), AND STORE RESULT IN SAME REGISTER | Inc | x0 | Inc | r4 |
| Dec | SUBTRACT 1 FROM VALUE OF DESIGNATED REGISTER (x0), AND STORE RESULT IN SAME REGISTER | Dec | x0 | Dec | r3 |
| Jmp | JUMP TO ADDRESS INDICATED BY DESIGNATED REGISTER (x0) | Jmp | x0 | Jmp | r2 |
| Jz | JUMP TO ADDRESS INDICATED BY DESIGNATED REGISTER (x1) IF VALUE OF DESIGNATED REGISTER (x0) IS 0 | Jz | x0,x1 | Jz | r0,r2 |
| Jnz | JUMP TO ADDRESS INDICATED BY DESIGNATED REGISTER (x1) IF VALUE OF DESIGNATED REGISTER (x0) IS NOT 0 | Jnz | x0,x1 | Jnz | r0,r2 |
| Nop | NOTHING PERFORMED | Nop | | Nop | |

FIG. 10A

| 1: | Push |
|---|---|
| 2: | 2 |
| 3: | Push |
| 4: | 3 |
| 5: | Push |
| 6: | 4 |
| 7: | Add |
| 8: | Mult |
| 9: | Pop |
| 10: | 0 |

FIG. 10B

ARITHMETIC EXPRESSION : <DATA AREA #0>=2*(3+4)

FIG. 10C

| 1: <JUMP ADDRESS OF CODE TO PERFORM Push> |
|---|
| 2: OPERAND "2" |
| 3: <JUMP ADDRESS OF CODE TO PERFORM Push> |
| 4: OPERAND "3" |
| 5: <JUMP ADDRESS OF CODE TO PERFORM Push> |
| 6: OPERAND "4" |
| 7: <JUMP ADDRESS OF CODE TO PERFORM Add> |
| 8: <JUMP ADDRESS OF CODE TO PERFORM Mult> |
| 9: <JUMP ADDRESS OF CODE TO PERFORM Pop> |
| 10: OPERAND "0" |

FIG. 11A
FIG. 11B
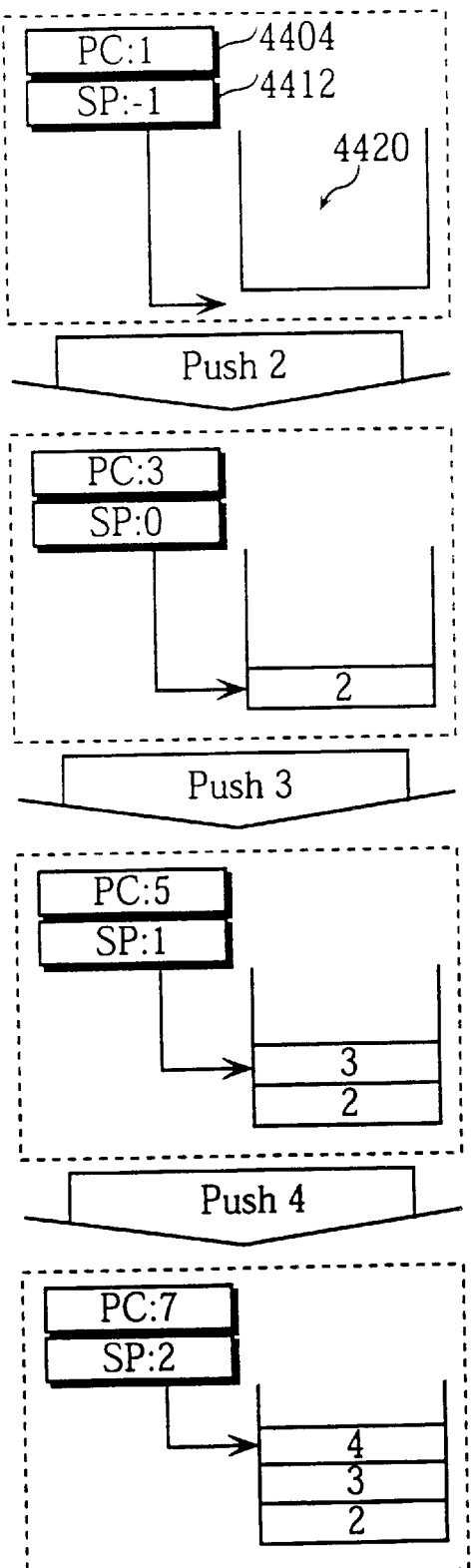
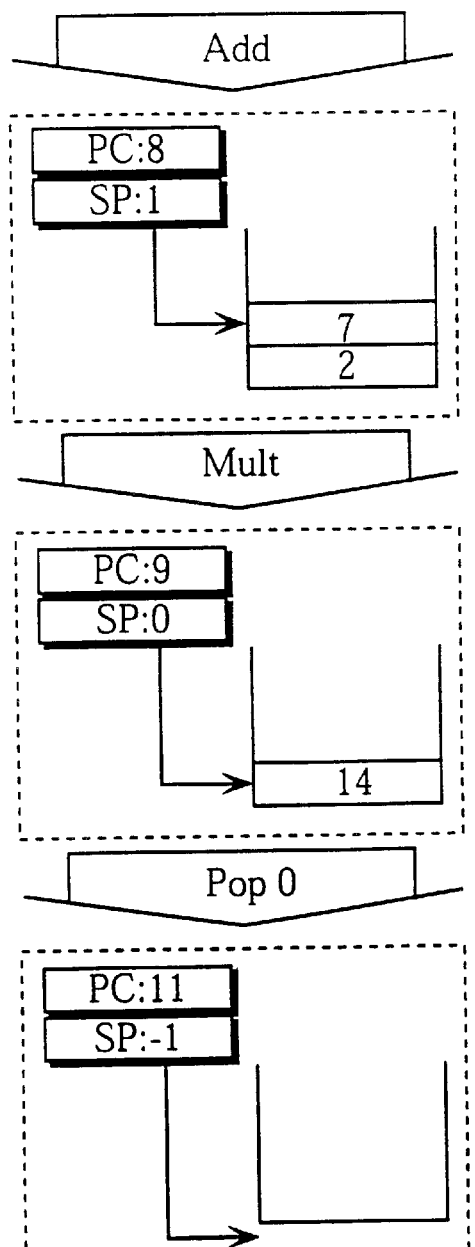

FIG. 12A

| MICROPROGRAM FOR VIRTUAL MACHINE INSTRUCTION "Push" | | |
|---|---|---|
| 1:Inc | r3 | ; INCREMENT SP VALUE BY ONE |
| 2:Store | [r3],r0 | ; PLACE VALUE OF TOS REGISTER (#0)<br>; INTO STACK |
| 3:Load | r0,[r2] | ; EXTRACT OPERAND AND<br>; PLACE IT ONTO TOS REGISTER |
| 4:Inc | r2 | ; INCREMENT PC OF VIRTUAL MACHINE BY ONE TO PREPARE<br>; FOR READING NEXT INSTRUCTION |
| <MICROPROGRAM FOR JUMPING TO NEXT VIRTUAL MACHINE INSTRUCTION> | | |

FIG. 12B

| MICROPROGRAM FOR VIRTUAL MACHINE INSTRUCTION "Add" | | |
|---|---|---|
| 1:Load | r1,[r3] | ; EXTRACT VALUE FROM STACK<br>; PLACE IT ONTO REGISTER #1 |
| 2:Dec | r3 | ; DECREMENT VALUE OF VIRTUAL MACHINE PC BY ONE |
| 3:Add | r0,r0,r1 | ; ADD VALUES OF REGISTERS #0 AND #1 AND<br>; PLACE RESULT ONTO TOS REGISTER |
| <MICROPROGRAM FOR JUMPING TO NEXT VIRTUAL MACHINE INSTRUCTION> | | |

FIG. 12C

| MICROPROGRAM FOR VIRTUAL MACHINE INSTRUCTION "Mult" | | |
|---|---|---|
| 1:Load | r1,[r3] | ; EXTRACT VALUE FROM STACK AND<br>; PLACE IT ONTO REGISTER #1 |
| 2:Dec | r3 | ; DECREMENT VALUE OF VIRTUAL MACHINE SP BY ONE |
| 3:Mult | r0,r0,r1 | ; MULTIPLY VALUES OF REGISTERS #0 AND #1 AND<br>; PLACE RESULT ONTO TOS REGISTER |
| <MICROPROGRAM FOR JUMPING TO NEXT VIRTUAL MACHINE INSTRUCTION> | | |

FIG. 12D

| <MICROPROGRAM FOR JUMPING TO NEXT VIRTUAL MACHINE INSTRUCTION> | | |
|---|---|---|
| 1:Load | r1,[r2] | ; READ VIRTUAL MACHINE INSTRUCTION (JUMP ADDRESS)<br>; INDICATED BY PC INTO REGISTER #1 |
| 2:Inc | r2 | ; INCREMENT VIRTUAL MACHINE PC BY ONE |
| 3:Jmp | r1 | ; JUMP UNCONDITIONALLY TO LOCATION<br>; INDICATED BY REGISTER #1 |

FIG. 14

| STAGE NAME | NOTATION |
|---|---|
| INSTRUCTION FETCH | IF |
| INSTRUCTION DECODE AND REGISTER REFERENCE | RF |
| EXECUTION | ALU |
| MEMORY ACCESS | MEM |
| RESULT WRITING TO REGISTER | WB |

FIG. 15

| CLOCK | 1 | 2 | 3 | 4 | 5 | 6 | 7 | 8 |
|---|---|---|---|---|---|---|---|---|
| INSTRUCTION A | IF | RF | ALU | MEM | WB | | | |
| INSTRUCTION B | | IF | RF | ALU | MEM | WB | | |
| INSTRUCTION C | | | IF | RF | ALU | MEM | WB | |
| INSTRUCTION D | | | | IF | RF | ALU | MEM | WB |

FIG. 16

| CLOCK | 1 | 2 | 3 | 4 | 5 | 6 | 7 | 8 |
|---|---|---|---|---|---|---|---|---|
| INSTRUCTION A1 | IF | RF | ALU | MEM | WB | | | |
| INSTRUCTION A2 | IF | RF | ALU | MEM | WB | | | |
| INSTRUCTION B1 | | IF | RF | ALU | MEM | WB | | |
| INSTRUCTION B2 | | IF | RF | ALU | MEM | WB | | |
| INSTRUCTION C1 | | | IF | RF | ALU | MEM | WB | |
| INSTRUCTION C2 | | | IF | RF | ALU | MEM | WB | |
| INSTRUCTION D1 | | | | IF | RF | ALU | MEM | WB |
| INSTRUCTION D2 | | | | IF | RF | ALU | MEM | WB |

FIG. 17

| CLOCK | 1 | 2 | 3 | 4 | 5 | 6 | 7 | 8 | 9 |
|---|---|---|---|---|---|---|---|---|---|
| INSTRUCTION A | IF | RF | ALU | MEM | WB | | | | |
| INSTRUCTION B | | IF | RF | · | ALU | MEM | WB | | |
| INSTRUCTION C | | | IF | · | RF | ALU | MEM | WB | |
| INSTRUCTION D | | | | · | IF | RF | ALU | MEM | WB |

FIG. 18

| CLOCK | 1 | 2 | 3 | 4 | 5 | 6 | 7 | 8 | 9 |
|---|---|---|---|---|---|---|---|---|---|
| INSTRUCTION A1 | IF | RF | ALU | MEM | WB | | | | |
| INSTRUCTION A2 | IF | RF | ALU | MEM | WB | | | | |
| INSTRUCTION B1 | | IF | RF | · | ALU | MEM | WB | | |
| INSTRUCTION B2 | | IF | RF | ALU | MEM | WB | | | |
| INSTRUCTION C1 | | | IF | RF | ALU | MEM | WB | | |
| INSTRUCTION C2 | | | IF | RF | · | ALU | MEM | WB | |
| INSTRUCTION D1 | | | | IF | RF | ALU | MEM | WB | |
| INSTRUCTION D2 | | | | IF | RF | · | ALU | MEM | WB |

FIG. 19

| CLOCK | 1 | 2 | 3 | 4 | 5 | 6 | 7 | 8 | 9 | 10 |
|---|---|---|---|---|---|---|---|---|---|---|
| INSTRUCTION A | IF | RF | ALU | MEM | WB | | | | | |
| INSTRUCTION B | | IF | RF | · | · | ALU | MEM | WB | | |
| INSTRUCTION C | | | IF | · | · | RF | ALU | MEM | WB | |
| INSTRUCTION D | | | | · | · | IF | RF | ALU | MEM | WB |

FIG. 20

| CLOCK | 1 | 2 | 3 | 4 | 5 | 6 | 7 | 8 | 9 |
|---|---|---|---|---|---|---|---|---|---|
| INSTRUCTION A1 | IF | RF | ALU | MEM | WB | | | | |
| INSTRUCTION A2 | IF | RF | ALU | MEM | WB | | | | |
| INSTRUCTION B1 | | | IF | RF | · | · | ALU | MEM | WB |
| INSTRUCTION B2 | | | IF | RF | ALU | MEM | WB | | |
| INSTRUCTION C1 | | | | IF | RF | ALU | MEM | WB | |
| INSTRUCTION C2 | | | | IF | RF | ALU | MEM | WB | |
| INSTRUCTION D1 | | | | | IF | RF | ALU | MEM | WB |
| INSTRUCTION D2 | | | | | IF | RF | · | ALU | MEM | WB |

FIG. 21

| CLOCK | 1 | 2 | 3 | 4 | 5 | 6 | 7 |
|---|---|---|---|---|---|---|---|
| INSTRUCTION A | IF | RF | ALU | MEM | WB | | |
| INSTRUCTION B | | IF | x | | | | |
| INSTRUCTION C | | | IF | RF | ALU | MEM | WB |

FIG. 22

| CLOCK | 1 | 2 | 3 | 4 | 5 | 6 | 7 |
|---|---|---|---|---|---|---|---|
| INSTRUCTION A1 | IF | RF | ALU | MEM | WB | | |
| INSTRUCTION A2 | IF | RF | ALU | MEM | WB | | |
| INSTRUCTION B1 | | IF | x | | | | |
| INSTRUCTION B2 | | IF | x | | | | |
| INSTRUCTION C1 | | | IF | RF | ALU | MEM | WB |
| INSTRUCTION C2 | | | IF | RF | ALU | MEM | WB |

FIG. 23

| CLOCK | 1 | 2 | 3 | 4 | 5 | 6 | 7 | 8 | 9 | 10 | 11 |
|---|---|---|---|---|---|---|---|---|---|---|---|
| Load  r1,[r2] | IF | RF | ALU | MEM | WB | | | | | | |
| Inc   r2 | | IF | RF | ALU | MEM | WB | | | | | |
| Jmp   r1 | | | IF | RF | ALU | MEM | WB | | | | |
| | | | | IF | x | | | | | | |
| Load  r1,[r3] | | | | | IF | RF | ALU | MEM | WB | | |
| Dec   r3 | | | | | | IF | RF | ALU | MEM | WB | |
| Mult  r0,r0,r1 | | | | | | | IF | RF | ALU | MEM | WB |

FIG. 24

| CLOCK | 1 | 2 | 3 | 4 | 5 | 6 | 7 | 8 | 9 | 10 | 11 |
|---|---|---|---|---|---|---|---|---|---|---|---|
| Load  r1,[r2] | IF | RF | ALU | MEM | WB | | | | | | |
| Inc   r2 | IF | RF | ALU | MEM | WB | | | | | | |
| Jmp   r1 | | IF | RF | · | ALU | MEM | WB | | | | |
| | | IF | RF | ALU | x | | | | | | |
| | | | IF | RF | x | | | | | | |
| | | | IF | RF | x | | | | | | |
| | | | | IF | x | | | | | | |
| | | | | IF | x | | | | | | |
| Load  r1,[r3] | | | | | | IF | RF | ALU | MEM | WB | |
| Dec   r3 | | | | | | IF | RF | ALU | MEM | WB | |
| Mult  r0,r0,r1 | | | | | | | IF | RF | · | ALU | MEM | WB |

FIG. 25

| CLOCK | 1 | 2 | 3 | 4 | 5 | 6 | 7 | 8 | 9 | 10 | 11 | 12 | 13 |
|---|---|---|---|---|---|---|---|---|---|---|---|---|---|
| Load r1,[r2] | IF | RF | ALU | MEM | WB | | | | | | | | |
| Inc r2 | | IF | RF | ALU | MEM | WB | | | | | | | |
| Jmp r1 | | | IF | RF | · | ALU | MEM | WB | | | | | |
| | | | | IF | · | · | x | | | | | | |
| | | | | | · | · | | | | | | | |
| Load r1,[r3] | | | | | | IF | RF | ALU | MEM | WB | | | |
| Dec r3 | | | | | | | IF | RF | ALU | MEM | WB | | |
| Mult r0,r0,r1 | | | | | | | | IF | RF | · | ALU | MEM | WB |

FIG. 26

| CLOCK | 1 | 2 | 3 | 4 | 5 | 6 | 7 | 8 | 9 | 10 | 11 | 12 | 13 |
|---|---|---|---|---|---|---|---|---|---|---|---|---|---|
| Load r1,[r2] | IF | RF | ALU | MEM | WB | | | | | | | | |
| Inc r2 | IF | RF | ALU | MEM | WB | | | | | | | | |
| Jmp r1 | | IF | RF | · | · | ALU | MEM | WB | | | | | |
| | | IF | RF | ALU | MEM | x | | | | | | | |
| | | | IF | RF | ALU | x | | | | | | | |
| | | | IF | RF | ALU | x | | | | | | | |
| | | | | IF | RF | x | | | | | | | |
| | | | | IF | RF | x | | | | | | | |
| | | | | | IF | x | | | | | | | |
| | | | | | IF | x | | | | | | | |
| Load r1,[r3] | | | | | | IF | RF | ALU | MEM | WB | | | |
| Dec r3 | | | | | | IF | RF | ALU | MEM | WB | | | |
| Mult r0,r0,r1 | | | | | | | IF | RF | · | · | ALU | MEM | WB |

FIG. 27

```
 0:Push    0         ;i←0
 2:Pop     [0]
 4:Push    0         ;sum←0
 6:Pop     [1]

8:Push    [0]       ;i<10 ?
10:Push    10
12:Sub
13:Brz     31

15:Push    [1]       ;sum←sum+i
17:Push    [0]
19:Add
20:Pop     [1]
22:Push    [0]       ;i←i+1
24:Push    1
26:Add
27:Pop     [0]
29:Br      8

31:Stop
```

FIG. 29

| VIRTUAL MACHINE INSTRUCTION | SIZE OF REAL MACHINE CODE TEMPLATE | REAL MACHINE CODE TEMPLATE | NUMBER OF OPERANDS |
|---|---|---|---|
| .. | .. | .. | .. |
| Push | 4 WORDS | ⟨CODE TO PERFORM Push⟩ | 1 |
| Pop | 5 WORDS | ⟨CODE TO PERFORM Pop⟩ | 1 |
| Add | 3 WORDS | ⟨CODE TO PERFORM Add⟩ | 0 |
| Sub | 3 WORDS | ⟨CODE TO PERFORM Sub⟩ | 0 |
| Mult | 3 WORDS | ⟨CODE TO PERFORM Mult⟩ | 0 |
| Push[] | 5 WORDS | ⟨CODE TO PERFORM Push[]⟩ | 1 |
| Br | 3 WORDS | ⟨CODE TO PERFORM Br⟩ | 1 |
| Brz | 5 WORDS | ⟨CODE TO PERFORM Brz⟩ | 1 |
| Stop | 2 WORDS | ⟨CODE TO PERFORM Stop⟩ | 0 |
| .. | .. | .. | .. |

FIG. 30

| VIRTUAL MACHINE CODE ADDRESS | VIRTUAL MACHINE CODE | REAL MACHINE CODE SIZE | CORRESPONDING REAL MACHINE CODE ADDRESS |
|---|---|---|---|
| 0 | Push 0 | 4 | 0-3 |
| 2 | Pop [0] | 5 | 4-8 |
| 4 | Push 0 | 4 | 9-12 |
| 6 | Pop [1] | 5 | 13-17 |
| 8 | Push [0] | 5 | 18-22 |
| 10 | Push 10 | 4 | 23-26 |
| 12 | Sub | 3 | 27-29 |
| 13 | Brz 31 | 5 | 30-34 |
| 15 | Push [1] | 5 | 35-39 |
| 17 | Push [0] | 5 | 40-44 |
| 19 | Add | 3 | 45-47 |
| 20 | Pop [1] | 5 | 48-52 |
| 22 | Push [0] | 5 | 53-57 |
| 24 | Push 1 | 4 | 58-61 |
| 26 | Add | 3 | 62-64 |
| 27 | Pop [0] | 5 | 65-69 |
| 29 | Br 8 | 3 | 70-72 |
| 31 | Stop | 2 | 73-75 |

|  BIT SEQUENCE  |  MEANING  |
| --- | --- |
| 0 | "a" |
| 10 | "b" |
| 110 | "c" |
| 111 | "d" |

9300a — BIT SEQUENCE
9300b — MEANING

INSTRUCTION SEQUENCE A: "babc"

INSTRUCTION SEQUENCE B: "aabc"

FIG. 36A
FIG. 36B
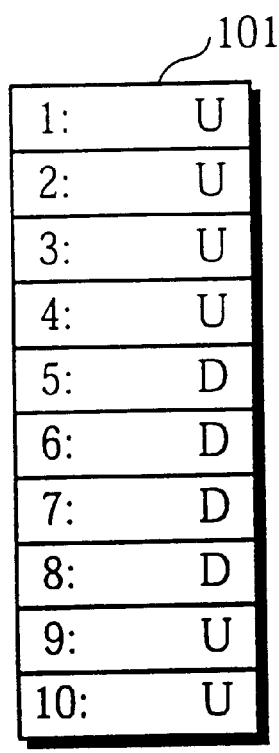
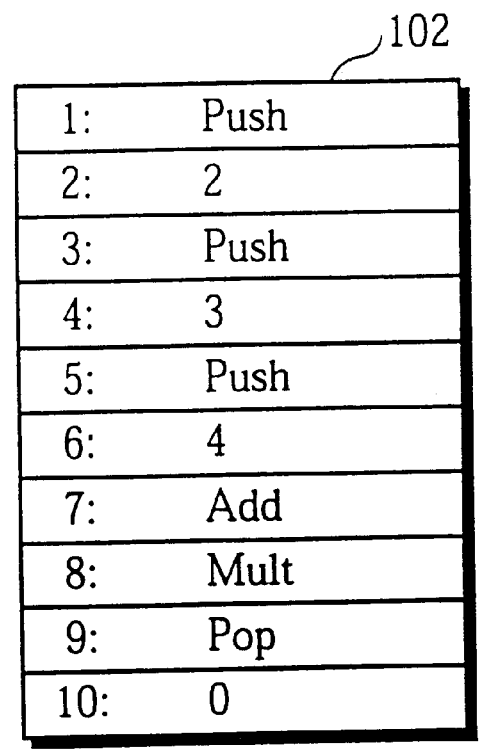

FIG. 37

| OPCODE | NEXT INSTRUCTION INFORMATION 108a | JUMP ADDRESS 108c | NUMBER OF OPERANDS 108d |
|---|---|---|---|
| .. | .. | .. | .. |
| Push | U | <JUMP ADDRESS OF CODE TO PERFORM Push ASSIGNED "U"> | 1 |
| Push | D | <JUMP ADDRESS OF CODE TO PERFORM Push ASSIGNED "D"> | 1 |
| Pop | U | <JUMP ADDRESS OF CODE TO PERFORM Pop ASSIGNED "U"> | 1 |
| Pop | D | <JUMP ADDRESS OF CODE TO PERFORM Pop ASSIGNED "D"> | 1 |
| Add | U | <JUMP ADDRESS OF CODE TO PERFORM Add ASSIGNED "U"> | 0 |
| Add | D | <JUMP ADDRESS OF CODE TO PERFORM Add ASSIGNED "D"> | 0 |
| Sub | U | <JUMP ADDRESS OF CODE TO PERFORM Sub ASSIGNED "U"> | 0 |
| Sub | D | <JUMP ADDRESS OF CODE TO PERFORM Sub ASSIGNED "D"> | 0 |
| Inc | U | <JUMP ADDRESS OF CODE TO PERFORM Inc ASSIGNED "U"> | 0 |
| Inc | D | <JUMP ADDRESS OF CODE TO PERFORM Inc ASSIGNED "D"> | 0 |
| .. | .. | .. | .. |

FIG. 38A

| MICROPROGRAM FOR VIRTUAL MACHINE INSTRUCTION "Push" WITH "U" |
|---|
| 1:Load  r4,r0   ;COPY VALUE OF TOS REGISTER (#0) INTO SOS REGISTER (#4) |
| 2:Load  r0,[r2]  ;READ OPERAND INTO TOS REGISTER |
| 3:Inc   r2      ;INCREMENT VIRTUAL MACHINE PC BY ONE TO PREPARE FOR READING NEXT INSTRUCTION |
| 4:Inc   r3      ;INCREMENT VIRTUAL MACHINE SP BY ONE |
| 5:Store [r3],r4 ;PLACE SOS REGISTER VALUE INTO STACK |
| 6:Load  r1,[r2] ;READ VIRTUAL MACHINE INSTRUCTION (JUMP ADDRESS) INDICATED BY PC INTO REGISTER #1 |
| 7:Inc   r2      ;INCREMENT VIRTUAL MACHINE PC BY ONE |
| 8:Jmp   r1      ;JUMP UNCONDITIONALLY TO LOCATION INDICATED BY REGISTER #1 |

FIG. 38B

| MICROPROGRAM FOR VIRTUAL MACHINE INSTRUCTION "Push" WITH "D" |
|---|
| 1:Load  r4,r0   ;COPY VALUE OF TOS REGISTER (#0) INTO SOS REGISTER (#4) |
| 2:Load  r0,[r2] ;READ OPERAND INTO TOS REGISTER |
| 3:Inc   r2      ;INCREMENT VIRTUAL MACHINE PC BY ONE TO PREPARE FOR READING NEXT INSTRUCTION |
| 6:Load  r1,[r2] ;READ VIRTUAL MACHINE INSTRUCTION (JUMP ADDRESS) INDICATED BY PC INTO REGISTER #1 |
| 7:Inc   r2      ;INCREMENT VIRTUAL MACHINE PC BY ONE |
| 8:Jmp   r1      ;JUMP UNCONDITIONALLY TO LOCATION INDICATED BY REGISTER #1 |

FIG. 39A

| MICROPROGRAM FOR VIRTUAL MACHINE INSTRUCTION "Add" WITH "U" |
|---|
| 1:Add  r0,r0,r4  ;ADD VALUES OF TOS REGISTER AND SOS REGISTER, AND PLACE RESULT INTO TOS REGISTER |
| <MICROPROGRAM FOR VIRTUAL MACHINE JUMP CODE WITH "U"> |

FIG. 39B

| MICROPROGRAM FOR VIRTUAL MACHINE INSTRUCTION "Add" WITH "D" |
|---|
| 1:Add  r0,r0,r4  ;ADD VALUES OF TOS REGISTER AND SOS REGISTER, AND PLACE RESULT INTO TOS REGISTER |
| <MICROPROGRAM FOR VIRTUAL MACHINE JUMP CODE WITH "D"> |

FIG. 40A

| MICROPROGRAM FOR VIRTUAL MACHINE INSTRUCTION "Mult" WITH "U" |
|---|
| 1:Mult r0,r0,r4 ;MULTIPLY VALUES OF TOS REGISTER AND SOS REGISTER, AND PLACE RESULT INTO TOS REGISTER<br><MICROPROGRAM FOR VIRTUAL MACHINE JUMP CODE WITH "U"> |

FIG. 40B

| MICROPROGRAM FOR VIRTUAL MACHINE INSTRUCTION "Mult" WITH "D" |
|---|
| 1:Mult r0,r0,r4 ;MULTIPLY VALUES OF TOS REGISTER AND SOS REGISTER, AND PLACE RESULT INTO TOS REGISTER<br><MICROPROGRAM FOR VIRTUAL MACHINE JUMP CODE WITH "D"> |

FIG. 41A

| MICROPROGRAM FOR VIRTUAL MACHINE JUMP CODE WITH "U" |
|---|
| 1:Load r1,[r2] ;READ VIRTUAL MACHINE INSTRUCTION (JUMP ADDRESS) INDICATED BY VIRTUAL MACHINE PC INTO REGISTER #1 |
| 2:Inc r2 ;INCREMENT VALUE OF VIRTUAL MACHINE PC BY ONE |
| 3:Jmp r1 ;JUMP UNCONDITIONALLY TO LOCATION INDICATED BY REGISTER #1 |

FIG. 41B

| MICROPROGRAM FOR VIRTUAL MACHINE JUMP CODE WITH "D" |
|---|
| 1:Load r1,[r2] ;READ VIRTUAL MACHINE INSTRUCTION (JUMP ADDRESS) INDICATED BY VIRTUAL MACHINE PC INTO REGISTER #1 |
| 2:Load r4,[r3] ;READ VALUE FROM STACK AND COPY IT INTO SOS REGISTER |
| 3:Inc r2 ;INCREMENT VALUE OF VIRTUAL MACHINE PC BY ONE |
| 4:Dec r3 ;DECREMENT VALUE OF VIRTUAL MACHINE SP BY ONE |
| 5:Jmp r1 ;JUMP UNCONDITIONALLY TO LOCATION INDICATED BY REGISTER #1 |

FIG. 46

| 1:<JUMP ADDRESS OF CODE TO PERFORM Push WITH "U"> |
|---|
| 2:OPERAND "2" |
| 3:<JUMP ADDRESS OF CODE TO PERFORM Push WITH "U"> |
| 4:OPERAND "3" |
| 5:<JUMP ADDRESS OF CODE TO PERFORM Push WITH "D"> |
| 6:OPERAND "4" |
| 7:<JUMP ADDRESS OF CODE TO PERFORM Add WITH "D"> |
| 8:<JUMP ADDRESS OF CODE TO PERFORM Mult WITH "D"> |
| 9:<JUMP ADDRESS OF CODE TO PERFORM Pop WITH "U"> |
| 10:OPERAND "0" |

FIG. 48

| CLOCK | 1 | 2 | 3 | 4 | 5 | 6 | 7 | 8 | 9 | 10 | 11 |
|---|---|---|---|---|---|---|---|---|---|---|---|
| Load r1,[r2] | IF | RF | ALU | MEM | WB | | | | | | |
| Load r4,[r3] | | IF | RF | ALU | MEM | WB | | | | | |
| Inc r2 | | | IF | RF | ALU | MEM | WB | | | | |
| Dec r3 | | | | IF | RF | ALU | MEM | WB | | | |
| Jmp r1 | | | | | IF | RF | ALU | MEM | WB | | |
| | | | | | | | IF | x | | | |
| Mult r0,r0,r4 | | | | | | | | IF | RF | ALU | MEM | WB |

FIG. 49

| CLOCK | 1 | 2 | 3 | 4 | 5 | 6 | 7 | 8 | 9 |
|---|---|---|---|---|---|---|---|---|---|
| Load r1,[r2] | IF | RF | ALU | MEM | WB | | | | |
| Load r4,[r3] | IF | RF | ALU | MEM | WB | | | | |
| Inc r2 | | | IF | RF | ALU | MEM | WB | | |
| Dec r3 | | | IF | RF | ALU | MEM | WB | | |
| Jmp r1 | | | | IF | RF | ALU | MEM | WB | |
| | | | | IF | RF | x | | | |
| | | | | | IF | x | | | |
| | | | | | IF | x | | | |
| Mult r0,r0,r4 | | | | | | IF | RF | ALU | MEM | WB |

FIG. 50

| CLOCK | 1 | 2 | 3 | 4 | 5 | 6 | 7 | 8 | 9 | 10 | 11 |
|---|---|---|---|---|---|---|---|---|---|---|---|
| Load r1,[r2] | IF | RF | ALU | MEM | WB | | | | | | |
| Load r4,[r3] | | IF | RF | ALU | MEM | WB | | | | | |
| Inc r2 | | | IF | RF | ALU | MEM | WB | | | | |
| Dec r3 | | | | IF | RF | ALU | MEM | WB | | | |
| Jmp r1 | | | | | IF | RF | ALU | MEM | WB | | |
| | | | | | | IF | x | | | | |
| Mult r0,r0,r4 | | | | | | | IF | RF | ALU | MEM | WB |

FIG. 51

| CLOCK | 1 | 2 | 3 | 4 | 5 | 6 | 7 | 8 | 9 | 10 |
|---|---|---|---|---|---|---|---|---|---|---|
| Load r1,[r2] | IF | RF | ALU | MEM | WB | | | | | |
| Load r4,[r3] | IF | RF | ALU | MEM | WB | | | | | |
| Inc r2 | | | IF | RF | ALU | MEM | WB | | | |
| Dec r3 | | | IF | RF | ALU | MEM | WB | | | |
| Jmp r1 | | | IF | RF | · | ALU | MEM | WB | | |
| | | | IF | RF | ALU | x | | | | |
| | | | | IF | RF | x | | | | |
| | | | | IF | RF | x | | | | |
| | | | | | IF | x | | | | |
| | | | | | IF | x | | | | |
| Mult r0,r0,r4 | | | | | | IF | RF | ALU | MEM | WB |

FIG. 53 DATA CONSTRUCTION OF INSTRUCTION SEQUENCE: "x=(1+2)*(3+4)"

(CORRESPONDING ADDRESS)

| | 6502 |
|---|---|
| RMmax | (RMmax-RMmin)th POINTER TO REAL MACHINE FUNCTION |
| RMmax-1 | (RMmax-RMmin-1)th POINTER TO REAL MACHINE FUNCTION |
| RMmax-2 | (RMmax-RMmin-2)th POINTER TO REAL MACHINE FUNCTION |
| | ⋮ |
| RMmin | 0th POINTER TO REAL MACHINE FUNCTION |

FIG. 78

| | CODE POSITION : | REGISTRATION FLAG : | REFERENCE POSITION OFFSET : | REFERENCE POSITION IDENTIFIER : |
|---|---|---|---|---|
| 0 | CODE POSITION : | REGISTRATION FLAG : | REFERENCE POSITION OFFSET : | REFERENCE POSITION IDENTIFIER : |
| 1 | CODE POSITION : | REGISTRATION FLAG : | REFERENCE POSITION OFFSET : | REFERENCE POSITION IDENTIFIER : |
| 2 | CODE POSITION : | REGISTRATION FLAG : | REFERENCE POSITION OFFSET : | REFERENCE POSITION IDENTIFIER : |
| 3 | CODE POSITION : | REGISTRATION FLAG : | REFERENCE POSITION OFFSET : | REFERENCE POSITION IDENTIFIER : |
| 4 | CODE POSITION : | REGISTRATION FLAG : | REFERENCE POSITION OFFSET : | REFERENCE POSITION IDENTIFIER : |
| ... | | | | |
| Rcount-1 | CODE POSITION : | REGISTRATION FLAG : | REFERENCE POSITION OFFSET : | REFERENCE POSITION IDENTIFIER : |

7663a

| BIT SEQUENCE | VIRTUAL MACHINE INSTRUCTION |
|---|---|
| 000 | Push [0] |
| 100 | Push 0 |
| 101 | Pop [0] |
| 110 | Pop [1] |
| 111 | Br 0x01 |
| 0011 | Stop |
| 0100 | Add |
| 0110 | Brz 0x03 |
| 0111 | Br 0x02 |
| 00100 | Push [1] |
| 00101 | Push 1 |
| 01010 | Push 10 |
| 01011 | Sub |

FIG. 102

| ADDRESS | VIRTUAL MACHINE CODE | | REAL MACHINE CODE SIZE | CORRESPONDING REAL MACHINE CODE ADDRESS | BLOCK START INFORMATION | Nop OUTPUT |
|---|---|---|---|---|---|---|
| 0 | Push | 0 | 4 | 0-3 | T | - |
| 2 | Pop | [0] | 5 | 4-8 | N | - |
| 4 | Push | 0 | 4 | 9-12 | N | - |
| 6 | Pop | [1] | 5 | 13-17 | N | - |
| 8 | Push | [0] | 5 | 18-22 | T | - |
| 10 | Push | 10 | 4 | 23-26 | N | - |
| 12 | Sub | | 3 | 27-29 | N | - |
| 13 | Brz | 31 | 5 | 30-34 | N | Nop |
| 15 | Push | [1] | 5 | 36-40 | T | - |
| 17 | Push | [0] | 5 | 41-45 | N | - |
| 19 | Add | | 3 | 46-48 | N | - |
| 20 | Pop | [1] | 5 | 49-53 | N | - |
| 22 | Push | [0] | 5 | 54-58 | N | - |
| 24 | Push | 1 | 4 | 59-62 | N | - |
| 26 | Add | | 3 | 63-65 | N | - |
| 27 | Pop | [0] | 5 | 66-70 | N | - |
| 29 | Br | 8 | 3 | 71-73 | N | - |
| 31 | Stop | | 2 | 74-75 | T | - |

HIGH SPEED VIRTUAL MACHINE AND COMPILER

This is a divisional application of U.S. Ser. No. 09/288,263 filed on Apr. 8, 1999.

BACKGROUND OF THE INVENTION (1) Field of the Invention

The present invention relates to virtual machines and to virtual machine compilers. In particular, the invention relates to a technique for increasing the execution speed of virtual machines.

(2) Description of the Prior Art

Standard Virtual Machine

Virtual machines are used to have a same program executed by computers, such as personal computers and workstations, that include different types of CPU. Virtual machines are useful in the field of communications, especially on a network to which different types of computers are connected, since they can overcome the differences in CPU architecture between computers and so allow the efficient and high-speed use of shared resources. Note that in this specification, CPUs are called "real machines".

A virtual machine is a virtual processor, which is to say, a processor achieved by executing software. A virtual machine decodes and executes executable programs (hereinafter referred to as "virtual machine programs" or "virtual machine instruction sequences") that are sequences of instructions (hereinafter, "virtual machine instructions") specific to the virtual machine. Virtual machines are normally realized by programs (hereinafter, "real machine programs" or "real machine instruction sequences" composed of instructions (hereinafter, "real machine instructions") specific to a target real machine on which the virtual program is to be run. Maintaining a high execution speed is a central issue for virtual machines, so that many virtual machines have a stack architecture.

One example of conventional virtual machines are the JAVA (trademark) virtual machines developed by SUN MICROSYSTEMS, INC.

FIG. 1 is a block diagram showing a construction of a conventional virtual machine 4400 with a stack architecture, such as a JAVA virtual machine. The virtual machine 4400 comprises the instruction storing unit 4401, the decoding unit 4402, the executing unit 4410, and the stack 4420. The instruction storing unit 4401 stores a virtual machine program to be executed. The decoding unit 4402 reads and decodes a virtual machine instruction. The execution unit 4410 executes operations according to the decoded data produced by the decoding unit 4402. The stack 4420, which is a LIFO (last-in first-out) memory area, temporarily stores data used in the processing of the execution unit 4410. In FIG. 1, solid lines show the data flows, while dotted lines show the control flows.

The decoding unit 4402 includes the decode table 4406, the program counter (PC) 4404, the instruction reading unit 4403, and the search unit 4405. The decode table 4406 stores data, such as jump addresses of microprograms (stored in the executing unit 4410) that correspond to all of the virtual machine instructions that can be executed by the virtual machine 4400 with a stack architecture. The program counter (PC) 4404 holds the address of the next instruction to be read from the instruction storing unit 4401. The instruction reading unit 4403 reads this next instruction. The search unit 4405 refers to the decode table 4406 to find a jump address corresponding to the read instruction and outputs the jump address to the execution unit 4410. In this specification, a microprogram is a real machine program that corresponds to a virtual machine instruction.

The executing unit 4410 includes a microprogram storing unit 4411 and a stack pointer (SP) 4412. The microprogram storing unit 4411 stores microprograms, which are real machine programs corresponding to virtual machine instructions, in advance at locations indicated by jump addresses. The stack pointer (SP) 4412 indicates the address at the top of the stack 4420.

FIG. 2 is a table for describing the instruction set of the virtual machine 4400. In FIG. 2, all of the virtual machine instructions that the virtual machine 4400 can decode and execute are shown in mnemonic form, along with the operation content of each instruction, changes in the content of the stack 4420 caused by each instruction, and the value of the SP 4412 after execution. In FIG. 2, the legend "s0" indicates the value at the top of the stack 4420, while "s1" indicates the second highest value. As one example, the notation "sp←s0+s1" for the virtual machine instruction "Add" denotes that the value at the top of the stack is set equal to a sum of the top and second highest values of the stack before execution. The notation "sp←sp-1" denotes that the height of the stack decreases by one due to the execution of the "Add" instruction.

FIG. 3 shows the stored contents of the decode table 4406 shown in FIG. 1. This decode table 4406 includes opcodes 4406a that indicate the operation types of virtual machine instructions, jump addresses 4406b which are the addresses of microprograms in the microprogram storing unit 4411 that correspond to these virtual machine instructions, and numbers of operands 4406c that show the number of operands in each virtual machine instruction. Here, each opcode is set as 1-byte long, and operands are counted in one-byte units. Virtual machine instructions, which may include only an opcode or only an operand, that are represented by a physical bit pattern are hereinafter referred to as "virtual machine code".

FIGS. 4A–4D show examples of the microprograms stored in the microprogram storing unit 4411 in FIG. 1. The microprograms in FIGS. 4A–4C respectively correspond to the virtual machine instructions "Push", "Add", and "Mult", while the microprogram in FIG. 4D shows a microprogram that forms the common latter part of each of the microprograms in FIGS. 4A–4C. This microprogram in FIG. 4D is a real machine program for jumping to the next virtual machine instruction. The operation contents of the real machine instructions in these microprograms are shown in FIG. 5. The virtual machine 4400 itself is realized by a real machine that can decode and execute the real machine instructions shown in FIG. 5. Note that the PC 4404 is physically realized by register #2 (r2) of the real machine, and the SP 4423 by register #3 (r3).

FIG. 6 is a flowchart showing the processing of decoding unit 4404 shown in FIG. 1. The instruction reading unit 4403 is instructed by the execution unit 4410 via a signal line R to read the next instruction (steps 4502–4503) and so reads the virtual machine instruction with the address stored in the PC 4404 from the instruction storage unit 4401 (steps 4504–4505). Following this, search unit 4405 refers to the decode table 4406 to find a jump address and operands corresponding to the read virtual machine instruction, outputs the jump address and operands (if any) to the executing unit 4410 as decoded data (step 4506), and gives the executing unit 4410 a "read end" notification via the signal line R (step 4507). This "read end" notification marks the completion of decoding for one virtual machine instruction.

FIG. 7 is a flowchart showing the processing in step 4506 in detail. The search unit 4405 compares 1-byte of virtual machine code (the opcode) read by reading 4403 with one opcode 4406a in decode table 4406 at a time until a match is found (steps 4802–4807). The search unit 4405 then reads the jump address 4406b and the number of operands 4406c corresponding to the matching opcode 4406a from the decode table 4406. The search unit 4405 outputs the read jump address 4406b to the executing unit 4410 (step 4808), has the instruction reading unit 4403 read as many operands as are indicated by the number of operands 4406c from the instruction storing unit 4401, and outputs the operands to execution unit 4410 (steps 4809–4813).

The flowcharts of FIGS. 6 and 7 show the processing when decoded data sent from the decoding unit 4402 is directly transferred to the executing unit 4410. The flowchart in FIG. 8 shows the case when the decoded data is transferred to the executing unit 4410 via a buffer that is capable of storing sets of decoded data. In this latter case, the reading of virtual machine instructions from the instruction storing unit 4401 and the subsequent decoding may be performed independently of the execution by the executing unit 4410 and repeated as long as there is space in the buffer (steps 4605–4613).

FIG. 9 shows the processing of executing unit 4410 in FIG. 1. The executing unit 4410 initializes SP 4412 and PC 4404 (step 4702) and repeats the processing described below for each virtual machine instruction (steps 4703–4707). That is, the executing unit 4410 instructs the instruction reading unit 4403 via the signal line R to read the next virtual machine instruction (step 4703). The executing unit 4410 then reads decoded data transmitted from the search unit 4405, jumps to a jump address that is included in the decoded data and that specifies a microprogram stored in the microprogram storing unit 4411, the microprogram corresponding to the read virtual machine instruction, and executes the microprogram until the executing unit 4410 receives a "read end" notification via the signal line R (steps 4704–4707).

FIG. 10A shows a sample program for describing a specific example of the processing of the virtual machine 4400. In this example, instruction storing unit 4401 stores a virtual machine program for calculating the arithmetic expression "2*(3+4)" shown in FIG. 10B.

FIG. 10C shows the decoded data that is sequentially outputted from the decoding unit 4402 when the virtual machine program shown in FIG. 10A is decoded and executed by the conventional virtual machine 4400. The decoding unit 4402 successively outputs jump addresses and the necessary operands corresponding to the decoded virtual machine instructions as decoded data to the executing unit 4410.

FIGS. 11A and 11B show the states of the PC 4404, the SP 4412, and the stack 4420 before and after the execution of the each virtual machine instruction when the executing unit 4410 executes the virtual machine program shown in FIG. 10A in accordance with the decoded data sequences shown in FIG. 10C. These figures show the processing of the virtual machine program split into a former and a latter part. Here, PC 4404 indicates the address of the next virtual machine instruction to be executed in the virtual machine program. The addresses of virtual machine instructions are the numbers shown to the left of the virtual machine instructions in FIG. 10A. The initial value of the PC 4404 is "1". The SP 4412 indicates the top of stack 4420, and so marks a position at which an item was most recently stored or read. The initial value of SP 4412 is "−1" and indicates that the stack 4420 is empty. As can be understood from FIGS. 11A and 11B, the calculation of the arithmetic expression "2*(3+4)" is completed when PC 4404 indicates "9".

The major problem for conventional virtual machines like virtual machine 4400 is how to increase execution speed. Processes such as the decoding of virtual machine instructions generate overheads, so that virtual machines end up operating at a much slower speed than when an equivalent real machine program is directly executed by a real machine. To improve the performance speed of virtual machines, the following methods have been proposed.

First Conventional Technique

In this first conventional technique, the storage area at the top of the stack (TOS) is assigned not to memory but to a specified register of a real machine. Hereinafter, such a storage area is called the TOS variable (See pp315–327 "PLDI" (1995), ACM).

FIGS. 12A–12D are microprograms corresponding to the principal virtual machine instructions that are stored in a microprogram storage unit of a virtual machine based on this first conventional technique. These figures correspond to FIGS. 4A–4D that were used to describe the virtual machine 4400. This example uses the following physical mapping. The TOS variable is assigned to register #0 (r0) of the real machine and, as in FIGS. 4A–4D, PC 4404 to register #2 (r2), and SP 4421 to register #3 (r3).

FIGS. 13A and 13B show the changes in the states of the PC 4404, the SP 4412, the TOS variable 4421, and the memory stack 4422 (the part of the stack 4420 that is allocated to memory) as a virtual machine provided with the microprograms shown in FIGS. 12A~12D executes the virtual machine program shown in FIG. 10A. These figures shows the processing split into a former and a latter part and correspond to the FIGS. 11A and 11B that were used to describe the operation of the virtual machine 4400. As before, the calculation of the arithmetic expression "2*(3+4)" is completed in FIGS. 13A and 13B when the PC 4404 indicates "9".

As can be seen by comparing FIGS. 12A~12D with FIGS. 4A~4D, the first conventional technique makes fewer accesses to the memory. When the virtual machine 4400 executes a virtual machine instruction such as an addition "Add" or a multiplication "Mult", two reads and one write are performed for the stack 4420, making a total of three memory accesses for one virtual machine instruction. With the first conventional technique, the assigning of the TOS variable to a register enables the same instruction to be executed with only one access to the memory stack 4422. This results in the execution speed being increased in proportion to the reduction in the number of memory accesses.

Second Conventional Technique

A second conventional technique uses a "native coding" method, in which a predetermined part of a virtual machine programs is written in real machine instructions and is directly executed by a real machine. As a result, identifiers are used to indicate that such predetermined part is written using real machine instructions.

As one example, a JAVA virtual machine can store the constant name "ACC_NATIVE" (256) into an access flag (such as the 16-bit flag "access_flags" that forms part of the "method_info" structure) of a class file that includes a virtual machine program to show that part of the program is written in real machine instructions (see the Java Bytecodes and the JAVA Virtual Machine Specification, 1995 editions, produced by SUN MICROSYSTEMS, INC.).

In this way, this second conventional technique improves execution speed by having the real machine directly execute a predetermined part of a program.

Third Conventional Technique

A third conventional technique uses a "just-in-time" (JIT) compiler that compiles parts of a virtual machine program as required during execution. Here, compiling refers to the replacement of virtual machine instructions with real machine instructions (see Laura Lemay et al., *Java Gengo Nyumon* (*An Introduction to JAVA*), Prentice Hall, 1996, and Laura Lemay and Charles L. Perkins, *Teach yourself JAVA in 21 days*). Virtual machines that use a JIT compiler have the real machine directly execute compiled parts of a virtual machine program, and so increase the overall execution speed of virtual machine programs.

Fourth Conventional Technique

A fourth conventional technique is used when computers on a network execute virtual machine programs that they download from a server computer. In this technique, the code in a virtual machine program is compressed beforehand using LZ (Lempel-Zif) methods or Huffman coding to reduce the time taken by file transfer (see Japanese Laid-Open Patent Application H07-121352 or H08-263263).

With this technique, an increase in execution speed can be obtained if the time taken to transfer the virtual machine program forms a large part of the overall processing time required to execute the virtual machine program.

The first to fourth conventional techniques described above have the following problems.

Problems with the First Conventional Technique

The first conventional technique, where the TOS variable is allocated to a register of a real machine, has a drawback in that it is not suited to real machines with superscalar architecture that have become increasingly inexpensive in recent years. This means that the improvements in the execution speed for a superscalar real machine (hereinafter, "superscalar machine") are relatively small when compared with the improvement for a standard real machine (hereinafter called a "standard machine") that is incapable of parallel processing. This is described in more detail below.

The following describes the standard operation and notation of a pipeline used by a register machine, such as a superscalar machine or a standard machine, with reference to FIGS. 14–22.

FIG. 14 shows the mnemonics used to indicate each stage included in the pipeline. The superscalar machine and a standard machine described below are assumed to each have a pipeline containing the five stages shown in this figure.

FIG. 15 shows the ideal pipeline flow for a standard machine. In this example, four real machine instructions are sequentially processed with each pipeline stage taking exactly one clock cycle. Each pipeline stage is performed in parallel for a different real machine instruction so that as the long-term average, one instruction is executed in one clock cycle.

FIG. 16 shows an ideal pipeline flow for a superscalar machine. This superscalar machine has two separate pipelines. In FIG. 16, two real machine instructions are executed in one clock cycle as the long-term average, giving the superscalar machine a throughput twice that of the standard machine.

FIG. 17 shows a pipeline flow for a standard machine when pipeline hazards occur. Here, instruction B uses the execution result of instruction A, which is to say, instruction B has a true dependency (also called a data dependency) on the preceding instruction A. Since the execution result of instruction A cannot be obtained until the memory access stage MEM is completed, the execution of instruction B is delayed, which causes the hazard as shown by "-" in the figure.

When the processing of an instruction is delayed in a real machine with a pipeline structure, the processing of the following instructions is also delayed. This is shown in FIG. 17, where the processing of instruction C, which follows instruction B, is also delayed.

FIG. 18 shows a pipeline flow for a superscalar machine when pipeline hazards occur. Here, instruction B1 has a true dependency on the preceding instructions A1 and A2. Here, the reason that a pipeline hazard occurs in the fifth clock cycle for the instruction C2 is that the two processing-units (arithmetic logic units or "ALUs") provided in the processor are busy with the execution of the preceding instructions B1 and C1. This means that instruction C2 cannot be executed in that cycle.

FIGS. 19 and 20 correspond to FIGS. 17 and 18, and show pipeline flows when two clock cycles need to pass before values obtained through memory access (MEM) can be used. In reality, in most real machines, obtaining a value from the primary cache takes two clock cycles. Note that obtaining a value from the secondary cache takes more clock cycles.

FIGS. 21 and 22 respectively show pipeline flows for a standard machine and superscalar machine when instructions A1 and A2 are instructions that indicate a jump destination using a register. The jump destinations of these instructions are not known until the register reference stage (RF) is completed, so that the succeeding instructions B, B1, and B2 that are fetched as per normal during the register reference operation are canceled (as shown by the "x" in FIGS. 21 and 22) in the third clock cycle following the RF stages.

The following describes the specific problems of a superscalar machine and a real machine of the first conventional technique, with reference to FIGS. 23–26.

FIGS. 23–26 show pipeline flows when the virtual machine of the first conventional technique is realized by a real machine executing the virtual machine program shown in FIG. 10A. In detail, these figures show the pipeline flow for the latter part (the jump processing shown in FIG. 12D) of the microprogram (of FIG. 12A) with the address 7 that corresponds to the virtual machine instruction "Add" and the pipeline flow for the former part (the multiplication processing) of the microprogram (of FIG. 12C) with the address 8 that corresponds to the virtual machine instruction "Mult". FIGS. 23 and 24 respectively show the pipeline flows for a standard machine and a superscalar machine where one clock cycle needs to pass before a value read during a memory access can be used, while FIGS. 25 and 26 respectively show the pipeline flows for a standard machine and a superscalar machine where two clock cycles needs to pass before a value read during a memory access can be used.

This series of microprograms shown in FIGS. 12D and 12A contain two significant true dependencies. The first is in the microprogram for jump processing shown in FIG. 12D corresponding to the virtual machine instruction "Add", and exists between the instruction "Load" for reading a jump address and the instruction "Jump" for jumping to the address. The second is in the microprogram shown in FIG. 12C corresponding to the virtual machine instruction "Mult" for multiplication processing and exists between the instruction "Load" for reading a variable from the memory stack and the instruction "Mult" for multiplication processing.

In the pipeline shown in FIG. 23, the first data dependency is absorbed by the real machine instruction "Inc" that is inserted between the instructions "Load" and "Jump". The second data dependency is absorbed by the real machine instruction "Dec" that is inserted between the instructions "Load" and "Mult". The processing in this pipeline is only disturbed by the cancellation of one instruction that is necessitated by the execution of the real machine instruction "Jmp". As a result, the entire procedure is completed in 11 cycle clocks.

In the pipeline shown in FIG. 24, the first and second data dependencies are not absorbed. As a result, the processing in these pipelines is disturbed at three points. The first disturbance is the hazard in the fourth clock cycle caused by the first data dependency, the second is the cancellation of five instructions necessitated by the execution of real machine instruction "Jmp", and the third is the hazard in the eighth clock cycle caused by the second data dependency. As was the case with FIG. 24, the entire procedure is completed in 11 clock cycles in FIG. 23.

As in FIG. 24, the above first and second data dependencies are not absorbed in the pipeline shown in FIG. 25, so that the processing in this pipeline is disturbed at three points. The first disturbance is the hazard in the fifth clock cycle caused by the first data dependency, the second is the cancellation of one instruction necessitated by the execution of the real machine instruction "Jmp", and the third is the hazard in the tenth clock cycle caused by the second data dependency. The entire procedure is completed in 13 clock cycles.

As in FIG. 24, the above first and second data dependencies are not absorbed in the pipeline shown in FIG. 26, so that the processing is disturbed at three points. The first disturbance is the hazards caused in the fourth and fifth clock cycles by the first data dependency, the second is the cancellation of seven instructions necessitated by the execution of the real machine instruction "Jmp", and the third is the hazards caused in the eighth and tenth clock cycles by the second data dependency. As in FIG. 25, the entire procedure is completed in 13 clock cycles.

Considering that the processing shown in either of FIGS. 23 and 24 requires 11 clock cycles and that the processing shown in either of FIGS. 25 and 26 requires 13 clock cycles, it is clear that there is no difference in execution time between a standard machine and a superscalar machine for this first conventional technique. This means that no advantage is gained from using a superscalar machine capable of parallel processing.

In this way, this first conventional technique causes a large drop in the processing efficiency of a superscalar machine. Another drawback is the lack of provisions for exception handling, such as for errors, or interrupt handling, which is required for debugging.

As a result, a virtual machine that uses this first conventional technique needs to detect an interrupt state and to perform interrupt handling every time the machine executes a virtual machine instruction. This means that another memory access (i.e., data transfer of a variable in the memory that indicates an interrupt state into a register) is required every time a virtual machine instruction is executed. This cancels out the advantage of this first conventional technique, wherein assigning the TOS variable to a register reduces the number of memory accesses, so that the overall execution speed is not improved.

Problems with the Second Conventional Technique

The second conventional technique, which is to say the use of native coding, has a problem in that it is difficult to provide common virtual machine programs to real machines with different architectures. This is because part of the virtual machine program is written in real machine instructions for a specific type of real machine. As a result, when a virtual machine program is to be provided on a network for common use by five types of computers with different real-machine architectures, it becomes necessary to provide real machine programs of all five real machines.

Since there are also differences in system configuration between computers, there is no guarantee that real machine instructions will have a faster execution speed than virtual machine instructions, even for real machines with the same architecture. As one example, if programs are written for RISC (Reduced Instruction Set Computers) type real machines where code size is generally large, the use of insufficient memory will lead to frequent page swapping between main and virtual memory when virtual machine instructions are replaced with real machine instructions. This reduces the overall execution speed.

Problems with the Third Conventional Technique

The third conventional technique, which uses a JIT compiler, has a problem in that the compiling of the virtual machine program can take a long time. The reasons for this are explained below.

A first reason is that the processing must satisfy the specific restrictions of the target real machine concerning jump destinations. As one example, when the target machine has a restriction that the address of a jump destination must be within word (basic word length) boundaries in the main memory, simple conversion of the virtual machine instructions to corresponding real machine instructions will result in a violation of this restriction.

FIG. 27 is a program list for a sample virtual machine program for explaining this first reason. FIG. 28 is a flowchart for this sample virtual machine program.

The present virtual machine program calculates the total of ten integers from zero to nine. It is composed of a setting of initial values (step 7002, Addresses 0~6), judgment of the end of calculation (step 7003, Addresses 8~13), addition and setting of the next value to be added (step 7004, Addresses 15~29), and end processing (step 7005, Address 31).

FIG. 29 is a conversion table that is used when compiling this virtual machine program according to this third conventional technique. This conversion table is a correspondence table that associates virtual machine instructions with the real machine programs into which they are to be converted. Note that for reference purposes, the conversion table in FIG. 29 also shows the code size of each real machine program.

FIG. 30 shows the code arrangement of the real machine program that is obtained when the sample virtual machine program shown in FIG. 27 is compiled using the conversion table shown in FIG. 29. In FIG. 30, relative addresses in original virtual machine program are given for each real machine program to show the correspondence between the real machine program and the virtual machine program.

If the target real machine has a restriction whereby only jump destinations complying with a two-word alignment can be indicated, it can be seen from FIG. 30 that the virtual machine instruction "Stop" with address 31 that is the jump destination indicated by the virtual machine instruction "Brz" at address 13 is arranged at odd-numbered addresses in the real machine program. Since this address does not correspond to the two-word alignment, this branch instruction violates the restrictions concerning jump destinations. As a result, processing that rectifies this violation needs to be performed.

A second reason for the above problem is that special processing that accompanies branches can be necessary for the target real machine. Some CPUs with RISC architecture, such as CPUs with SPARC (Registered Trademark) architecture produced by SPARC INTERNATIONAL, INC. and CPUs produced by MIPS TECHNOLOGIES, INC., have special rules that are used when executing a number of instructions located after a branch instruction. Specific examples of these rules are the execution of a specific succeeding instruction regardless of whether a branch is performed (called a "delayed branch") or the execution of a specific succeeding instruction only when a branch is performed (called a "canceling branch").

When the target real machine is of this type, special processing needs to be performed, such as scheduling that analyzes the instructions and changes their order or the insertion of no operation instructions (such as NOP codes) directly after branch instructions.

Problems with the Fourth Conventional Technique

The fourth conventional technique, which is to say the compression of virtual machine programs in advance, has a problem in that there is no resolving means for dealing with problems that occur due to the execution of branch instructions in the compressed virtual machine program.

FIG. 31A shows a compression table for explaining this problem. This compression table associates variable-length codes 9300a with virtual machine instructions 9300b. FIG. 31B is example code that is obtained by encoding the virtual machine instruction sequence A using the compression table shown in FIG. 31A.

If the example code shown in FIG. 31B is decoded starting from the first bit, the original virtual machine instruction A ("babc") will be obtained. However, when the execution flow moves to point B in FIG. 31B due to a branch instruction, decoding the code sequence "0010110" that starts at point B using the compression table in FIG. 31A gives the mistaken virtual machine instruction "aabc".

Problems Common to the First~Fourth Conventional Techniques

The first~fourth conventional techniques described above have a common problem in that none of them is able to raise the efficiency of cache processing. As a result, the market is still waiting for the realization of a high-speed virtual machine that makes full use of the processing power of real machines and computers that are equipped with a cache memory.

FIG. 32 is a block diagram showing the program counter 6901 and the instruction cache 6902 of a virtual machine. This drawing will be used to explain the problems that can occur for a virtual machine that is equipped with a cache memory.

The instruction cache 6902 is equipped with a cache table 6904 that stores addresses for specifying each cache block in the cache memory, where a cache block is an instruction sequence 6903 composed of the data in ten consecutive addresses. FIG. 33 shows the case where the sample virtual machine program shown in FIG. 27 is stored in the cache memory, with the boundary lines A, B, and C marking the boundaries between the cache blocks. These boundary lines simply divide the virtual machine program into cache blocks of an equal size, as can be seen from the boundary line C that splits the virtual machine instruction "Br 8" into the opcode "Br" and the operand "8". Accordingly, when dividing a virtual machine program into cache blocks, it is necessary to judge whether any of the virtual machine instructions that changes the value of the program counter 6901 will end up spanning a boundary between cache blocks. This increases the complexity of the processing and results in an actual decrease in the overall execution speed of a virtual machine when a cache is provided.

It would be conceivably possible to devise a method for storing an entire virtual machine program in cache memory or a method for arranging the virtual machine program in the cache based on analysis of the virtual machine program by a JIT compiler. However, the former of these methods uses cache memory inefficiently and has a further problem in that the time required for file transfer in a network environment is greatly increased. The latter method, meanwhile, has a problem in that writing the virtual machine program into cache memory is very time-consuming. Accordingly, both of these methods result in a marked decrease in the overall execution efficiency of a virtual machine.

SUMMARY OF THE INVENTION

In view of the above problems, the present invention has an overall aim of providing a virtual machine that executes a virtual machine program at a higher execution speed than a conventional virtual machine, a virtual machine compiler that generates a program for this virtual machine (hereafter, a virtual machine and a virtual machine compiler are together called a virtual machine system), and a JIT compiler. Here, a virtual machine compiler refers to a program that translates a source program written in a high-level language such as C into a virtual machine program.

To achieve the above aim, the invention has the following six specific objects.

The first object is to provide a virtual machine system that can diminish disadvantages caused by true data dependencies so that high execution speed is maintained.

The second object is to provide a high-speed virtual machine system by minimizing the decreases in execution efficiency caused by interrupt handling.

The third object is to provide a virtual machine system with which "native coding" for different real machines can be performed without decreasing overall execution speed, even when the virtual machine is used by real machines with different architectures. Such a virtual machine is highly independent of real machine architectures without decreasing execution speed.

The fourth object is to provide a high-speed virtual machine system that can be used by a real machine with a cache system without decreases in execution efficiency which may result from a virtual machine instruction program being divided into cache blocks or from complicated resolving addresses being performed when using a JIT compiler.

The fifth object is to provide a high-speed virtual machine system that can decompress a compressed virtual machine program correctly even when the compressed program contains branch instructions.

The sixth object is to provide a high-speed JIT compiler that does not need to perform a complex resolving of addresses.

The first object can be achieved by a virtual machine of claim 1.

The virtual machine executes a virtual machine instruction sequence under control of a real machine, the virtual machine comprising: a stack unit for temporarily storing data in a last-in first-out format; an instruction storing unit for storing the virtual machine instruction sequence and a plurality of sets of succeeding instruction information, wherein each virtual machine instruction in the virtual machine instruction sequence is associated with a set of succeeding instruction information that indicates a change in a storage state of the data in the stack unit due to execution of a virtual machine instruction executed after the associated virtual machine instruction; a read unit for reading a virtual machine instruction and an associated set of succeeding instruction information from the instruction storing unit; and a decoding-executing unit for specifying and executing operations corresponding to a combination of the read virtual machine instruction and the read set of succeeding instruction information.

With the above construction, the instruction storing unit stores next instruction information in addition to virtual machine instructions and the decoding-executing unit performs not only operations for the decoded virtual machine instruction but also a stack handling in advance for a virtual machine instruction executed immediately after the decoded virtual machine instruction. Performing appropriate stack handling in advance in machine cycles where pipeline hazards (which occur especially frequently in superscalar machines) would otherwise occur, enables the detrimental effects of true data dependencies to be absorbed and so increases the execution speed of the virtual machine.

Here, the decoding-executing unit may include: a real machine instruction sequence storing unit for storing a plurality of real machine instruction sequences that correspond to all combinations of virtual machine instructions and sets of succeeding instruction information; a specifying unit for specifying a real machine instruction sequence in the real machine instruction sequence storing unit, the real machine instruction sequence corresponding to a combination of the virtual machine instruction and the set of succeeding instruction information read by the read unit; and an executing unit for executing the specified real machine instruction sequence.

In this way, advance stack handling for absorbing data dependencies can be included in the real machine instruction sequence corresponding to a virtual machine instruction.

Here, each set of succeeding instruction information may indicate a change in a number of sets of data in the stack unit due to execution of a virtual machine instruction executed after a virtual machine instruction associated with the set of succeeding instruction information, and at least one real machine instruction sequence stored in the real machine instruction sequence storing unit may contain real machine instructions that perform a stack handling in the stack unit in advance for a virtual machine instruction that is to be executed based on a set of succeeding instruction information associated with a currently executed virtual machine instruction.

With this construction, when a change in a number of stack levels due to execution of a given instruction is canceled out by execution of an instruction executed immediately after the given instruction, needless stack handling can be avoided, which improves the execution speed of the virtual machine.

Here, the real machine instruction sequences stored in the real machine instruction sequence storing unit may be composed with a premise that regions of the stack unit used to store two sets of data to be read first and second are mapped to two registers in the real machine.

The above construction replaces the load and store stack operations that are frequently performed by stack-type virtual machines with read/write operations for the internal registers of the real machine. Such operations are suited for rearrangement as the advance stack handling performed in machine cycles where pipeline hazards would otherwise occur. In this way, execution efficiency of the virtual machine is raised.

Here, the instruction storing unit may include a first storage area for storing the virtual machine instruction sequence and a second storage area for storing the sets of succeeding instruction information, wherein each location that stores a virtual machine instruction in the first storage area may be associated with a location that stores an associated set of succeeding instruction information in the second storage area, and the read unit may read the virtual machine instruction from a location in the first storage area and the associated set of succeeding instruction information from a location in the second storage area, the location in the first storage area being associated with the location in the second storage area.

In this way, a virtual machine instruction sequence and next instruction information are stored separately, which means that a virtual machine instruction sequence of the present virtual machine has the same data format as a conventional virtual machine instruction sequence. Compatibility of instruction data format with a conventional virtual machine is therefore maintained.

Here, the virtual machine instruction sequence stored in the instruction storing unit may be an extended virtual machine instruction sequence that includes extended virtual machine instructions, the extended virtual machine instructions being combinations of virtual machine instructions and associated sets of succeeding instruction information, wherein the read unit may read an extended virtual machine instruction from the instruction storing unit, and wherein the decoding-executing unit may specify and execute operations corresponding to the extended virtual machine instruction.

In this way, since an extended virtual machine instruction is a combination of a virtual machine instruction and next instruction information, next instruction information need not be processed or stored separately. This means that a virtual machine with a similar architecture to a conventional computer can be provided.

The first object can be also achieved by a virtual machine compiler. The compiler generates programs for a virtual machine with a stack architecture that includes a stack, the compiler including: an instruction sequence converting unit for converting a source program into a virtual machine instruction sequence executable by the virtual machine; a succeeding instruction information generating unit for generating sets of succeeding instruction information corresponding to virtual machine instructions in the virtual machine instruction sequence, each set of succeeding instruction information indicating a change in a storage state of data in the stack due to execution of a virtual machine instruction executed immediately after a virtual machine instruction corresponding to the set of succeeding instruction information; and an associating unit for associating each set of generated succeeding instruction information with a corresponding virtual machine instruction and outputting the set of succeeding instruction information and the virtual machine instruction.

In this way, the above virtual machine compiler generates not only virtual machine instructions but also next instruction information which can be used by a virtual machine to absorb true data dependencies. Thus, the present virtual machine compiler can generate programs for a virtual machine whose execution speed is improved by having data dependencies absorbed.

The second object can be achieved by a virtual machine. The virtual machine executes a virtual machine instruction sequence under control of a real machine, the virtual machine including: an instruction storing unit for storing the virtual machine instruction sequence; a read unit for reading a virtual machine instruction in the virtual machine instruction sequence from the instruction storing unit; and a decoding-executing unit for specifying and executing operations corresponding to the virtual machine instruction, wherein the decoding-executing unit includes a branch instruction judging unit for judging if the virtual machine instruction is a branch instruction and an interrupt handling unit for detecting, if the virtual machine instruction is judged to be a branch instruction, whether there is an interrupt request, and, if so, performing a corresponding interrupt handling in addition to executing the branch instruction.

In this way, an interrupt handling is only performed whenever a branch instruction is executed, which is sufficient for most virtual machine programs. This suppresses decreases in execution speed caused by performing interrupt more frequently.

Here, the decoding-executing unit may further include a real machine instruction sequence storing unit for storing real machine instruction sequences corresponding to every virtual machine instruction and real machine instruction sequences for having interrupt handling performed corresponding to each interrupt request and an executing unit for executing a real machine instruction sequence corresponding to the virtual machine instruction read by the read unit, wherein if the virtual machine instruction is judged to be the branch instruction and an interrupt request is detected, the interrupt handling unit has the executing unit execute a real machine instruction sequence for having the corresponding interrupt handling performed and then the real machine instruction sequence corresponding to the branch instruction.

With this construction, an interrupt handling to be additionally performed can be specified by a real machine instruction sequence. This realizes a virtual machine capable of performing an interrupt handling with a simpler architecture.

The second object can be also achieved by a virtual machine. The virtual machine executes a virtual machine instruction sequence under control of a real machine, the virtual machine including: an instruction storing unit for storing the virtual machine instruction sequence; a read unit for reading a virtual machine instruction in the virtual machine instruction sequence from the instruction storing unit; and a decoding-executing unit for specifying and executing operations corresponding to the read virtual machine instruction, wherein the decoding-executing unit includes a block judging unit for judging if the read virtual machine instruction is a virtual machine instruction representative of a block, a block being a predetermined number of virtual machine instructions and an interrupt handling unit for detecting, if the read virtual machine instruction is judged to be the representative virtual machine instruction, whether there is an interrupt request to the virtual machine, and if so, performing a corresponding interrupt handling in addition to executing the representative virtual machine instruction.

In this way, an interrupt handling is performed every time a predetermined number of virtual machine instructions are executed, and a frequency to perform interrupt handling can be controlled by changing this number in advance. This avoids decreases in execution speed caused by performing interrupt handling more frequently.

Here, the decoding-executing unit may include a real machine instruction sequence storing unit for storing a plurality of real machine instruction sequences corresponding to every virtual machine instruction and at least one real machine instruction sequence for having interrupt handling performed in response to an interrupt request and an executing unit for executing a real machine instruction sequence corresponding to the read virtual machine instruction, wherein the block judging unit may judge that the read virtual machine instruction is a virtual machine instruction representative of the block when a number of virtual machine instructions that have been read is equal to a multiple of the predetermined number and wherein if the read virtual machine instruction is judged to be a representative virtual machine instruction and an interrupt request has been detected, the interrupt handling unit may have the executing unit execute a real machine instruction sequence for having the interrupt handling performed and then the real machine instruction sequence corresponding to the representative virtual machine instruction.

With this construction, an interrupt handling to be additionally performed can be specified by a real machine instruction sequence. As a result, a virtual machine that is capable of performing an interrupt handling with a simpler architecture can be achieved.

The third object may be achieved by a virtual machine. The virtual machine executes a virtual machine instruction sequence under control of a real machine, the virtual machine including: a real machine program storing unit for storing a plurality of subprograms composed of real machine instructions; an instruction storing unit that includes a first area for storing the virtual machine instruction sequence and a second area for storing a plurality of pointers to the subprograms in the real machine program storing unit; a read unit for reading a virtual machine instruction in the virtual machine instruction sequence from the first area in the instruction storing unit; and a decoding-executing unit for specifying and executing operations corresponding to the read virtual machine instruction, wherein the decoding-executing unit includes an area judging unit for judging whether the virtual machine instruction is an instruction that transfers control flow to a location in the second area and an address converting-executing unit for executing, if the virtual machine instruction is judged to be an instruction that transfers control flow to a location in the second area, a subprogram indicated by a pointer stored in the location.

With this construction, execution of either a virtual machine function or a real machine function is solely determined by a corresponding location in an area of the memory map in the virtual machine, so a setting of whether a virtual machine function or a real machine function is executed for a function can be easily changed. This makes it possible to use "native-coding" in virtual machine programs for real machines with different architectures.

Here, the first area and the second area in the instruction storing unit may be two adjacent storage areas whose boundary is marked by an address, and the area judging unit may judge, when the read virtual machine instruction is a call instruction for a subprogram, whether the virtual machine instruction is an instruction that transfers control flow, by comparing a call address of the call instruction with the address.

With this construction, control over switches between executing a virtual machine function and a real machine function can be easily achieved by shifting the boundary line between areas in the memory map of the virtual machine. As a result, virtual machines that have improved execution speed and are suited to different real machine environments can be realized.

The fourth object can be achieved by a virtual machine. The virtual machine executes a virtual machine instruction sequence under control of a real machine, the virtual machine including: an instruction storing unit for storing the virtual machine instruction sequence; a read unit for reading a virtual machine instruction in the virtual machine instruction sequence from the instruction storing unit; and a decoding-executing unit for specifying and executing operations corresponding to the read virtual machine instruction, wherein the instruction storing unit is a plurality of instruction blocks that constitute the virtual machine instruction sequence, the instruction blocks corresponding to basic blocks, wherein the instruction blocks each include: an identifier area for storing an identifier that specifies a start position of the instruction block in the instruction storing unit; a non-branch instruction area for storing non-branch instructions belonging to a corresponding basic block; and a branch instruction area for storing at least one branch instruction belonging to the corresponding basic block, wherein each branch instruction stored in the branch instruction area designates a branch destination using an identifier stored in one of the identifier areas, and wherein if the read virtual machine instruction is a branch instruction, the decoding-executing unit has control flow branch to a start position of a non-branch instruction area in an instruction block having an identifier designated by the branch instruction as a branch destination.

With this construction, there is always only one entry point for each instruction block, which is the start of the instruction block. As a result, the address analysis for branch destinations of branch instructions is simplified, and the timing taken by compiling is reduced. Also, by caching instructions in instruction block units, the judgment processing regarding the cache boundaries is simplified, and decreases in execution efficiency that occur when a cache is provided for the virtual machine can be made smaller than in conventional techniques.

Here, the decoding-executing unit may include a program counter composed of (a) an identifier register for storing an identifier of an instruction block to which a virtual machine instruction to be read belongs and (b) an offset counter for storing an offset that indicates a relative storage position of the virtual machine instruction in the instruction block, wherein the read unit may read the virtual machine instruction based on the identifier and the offset in the program counter, wherein the decoding-executing unit may update, if the read virtual machine instruction is the branch instruction, the program counter by writing the identifier designated as the branch destination by the branch instruction into the identifier register and by setting an initial value in the offset counter, and if the read virtual machine instruction is a non-branch instruction, update the program counter by incrementing the offset counter, and the read unit may read a virtual machine instruction to be executed next based on the program counter updated by the decoding-executing unit.

Accordingly, each instruction block is specified only by a value of the identifier segment register, and each relative instruction storage position of a virtual machine instruction by a value of the offset counter. As a result, an address converting technique according to a conventional "segment method" can be used.

Here, the decoding-executing unit may include a real machine instruction sequence storing unit that stores a plurality of real machine instruction sequences that each correspond to a different virtual machine instruction, the instruction blocks in the instruction storing unit each may include a decoded data sequence area for storing a decoded data sequence that specifies real machine instruction sequences in the real machine instruction sequence storing unit, the real machine instruction sequences corresponding to virtual machine instructions stored in the non-branch instruction area and the branch instruction area of the instruction block, wherein if a decoded data sequence is stored in an instruction block where reading is to be performed, the read unit may read a set of decoded data in the decoded data sequence instead of a virtual machine instruction, and if not, the read unit may read the virtual machine instruction and then generate a set of decoded data to specify a real machine instruction sequence in the real machine instruction sequence storing unit that corresponds to the virtual machine instruction, and wherein the decoding-executing unit may read from the real machine instruction sequence storing unit the real machine instruction sequence specified by the set of decoded data that has been either read or generated by the read unit, and executes the real machine instruction sequence.

With this construction of the virtual machine, in addition to the effects achieved in the virtual machine that manages a virtual machine program in units of instruction blocks, a time to decode a virtual machine instruction is shortened for the instruction blocks that already have a decoded data sequence. This is because the decoded data sequence is executed directly instead of virtual machine instructions. As a result, the execution speed of the virtual machine is improved.

Here, the decoded data sequence area in the instruction storing unit may include a flag area for storing a flag that indicates whether the decoded data sequence is stored in the decoded data sequence area, wherein the decoding-executing unit may include a current flag storing unit for storing a flag that is read from a flag area in a branch destination instruction block by the decoding-executing unit when executing a branch instruction, and wherein the read unit may read a set of decoded data or a virtual machine instruction depending on the flag in the current flag storing unit.

For this construction, a flag indicating whether a decoded data sequence exists is provided to each instruction block and read from the instruction block to be held by the virtual machine. As a result, when executing virtual machine instructions in an instruction block that has a decoded data sequence, the virtual machine need not refer to a flag every time it executes one virtual machine instruction.

Here, each instruction block in the instruction storing unit may further include a flag area for storing a flag that indicates whether a decoded data sequence is stored in the decoded data sequence area of the instruction block, and the decoding-executing unit may include a decoded data sequence writing unit for judging, after a branch instruction has been executed, whether the instruction block designated as the branch destination by the branch instruction stores a decoded data sequence by referring to a flag stored in a flag area of the instruction block, and if no decoded data sequence is stored, having a virtual machine instruction sequence in the instruction block read, decoding the read virtual machine instruction sequence to produce a decoded data sequence, and writing the decoded data sequence into a decoded data sequence area in the instruction block.

For this construction, a decoded data sequence is generated when an instruction block is executed for the first time. As a result, when the same instruction block needs to be repeatedly executed as in loop processing, the time required for executing instructions corresponding to the block is reduced from the second execution of the block onwards.

The fifth object can be achieved by a virtual machine. The virtual machine executes a virtual machine instruction sequence under control of a real machine, the virtual machine including: an instruction storing unit for storing a compressed virtual machine instruction sequence to be executed; a read unit for reading a compressed virtual machine instruction in the compressed virtual machine instruction sequence from the instruction storing unit and decompressing the compressed virtual machine instruction to generate a decompressed virtual machine instruction; and a decoding-executing unit for specifying and executing operations corresponding to the decompressed virtual machine instruction, wherein the instruction storing unit is a plurality of instruction blocks containing compressed virtual machine instructions constituting the compressed virtual machine instruction sequence, the instruction blocks corresponding to basic blocks, wherein the instruction blocks each include: an identifier area for storing an identifier that specifies a start position of the instruction block in the instruction storing unit; a non-branch instruction area for storing compressed non-branch instructions belonging to a corresponding basic block; and a branch instruction area for storing at least one compressed branch instruction belonging to the corresponding basic block, wherein each compressed branch instruction stored in a branch instruction area designates a branch destination using an identifier stored in one of the identifier areas, and wherein if the decompressed virtual machine instruction is a branch instruction, the decoding-executing unit has control flow branch to a start position of a non-branch instruction area in an instruction block having an identifier designated by the branch instruction as a branch destination.

For this construction, the compressed virtual machine program is stored in units of the instruction blocks based on basic blocks and is decompressed by the decoding-executing unit. As a result, malfunctions caused when compressed bit sequences are mistakenly decoded starting midway through do not occur to this virtual machine.

Here, each instruction block may include a decompression table area for storing a decompression table for use during decompression of compressed virtual machine instructions in the instruction block, the decompression table containing at least one combination of a compressed virtual machine instruction stored in the instruction block and a corresponding decompressed virtual machine instruction and wherein the read unit may read the compressed virtual machine instruction from the instruction storing unit and decompresses the compressed virtual machine instruction by referring to a decompression table in an instruction block to which the compressed virtual machine instruction belongs to generate the decompressed virtual machine instruction.

With this virtual machine, each instruction block stores a decompression table, and a different decompression table is referred for execution of instructions belonging to each instruction block. Accordingly, the present virtual machine assures that even when each instruction block is compressed in a different format, decompression can be correctly performed.

The sixth object can be achieved by JIT compilers. The JIT compiler is for use with a virtual machine that executes a virtual machine instruction sequence under control of a real machine, the JIT compiler converting parts of the virtual machine instruction sequence into real machine instruction sequences before execution, the JIT compiler including: a block start information receiving unit for receiving an input of block start information for each virtual machine instruction that composes the virtual machine instruction sequence, the block start information showing whether a corresponding virtual machine instruction would correspond to a start of a basic block if the virtual machine instruction sequence were divided into basic blocks; a converting unit for converting virtual machine instructions in the virtual machine instruction sequence into real machine instruction sequences; and an outputting unit for rearranging the real machine instruction sequences produced by the converting unit into basic block units in accordance with the block start information received by the block start information receiving unit. Here, this JIT compiler may further include a branch violation judging unit for judging, when a real machine instruction at a start of a produced real machine instruction sequence corresponds to a virtual machine instruction whose block start information indicates that the virtual machine instruction would be a start of a basic block, whether the real machine instruction is going to be arranged in an address that violates an address alignment restriction of the real machine, wherein if the real machine instruction is going to be arranged in an address that violates the address alignment restriction, the outputting unit may rearrange the real machine instruction sequence so that the real machine instruction is not arranged in the address.

Accordingly, without performing the complicated processing for analyzing branch destinations of branch instructions, the present JIT compiler can produce a real machine instruction program at a higher speed in which branch destinations are arranged at addresses complying with a two-word alignment.

Here, the outputting unit may insert a certain number of no-operation instructions at a start of each basic block, the number being a number of real machine instructions processed during a delay of a delayed branch.

As a result, the above JIT compiler is capable of dealing with delayed branch by inserting no-operation instructions at a start of each basic block without performing a complicated delayed branch analyzing.

As has been described, the present invention improves execution speed of virtual machines and is especially valuable as a technique to promote efficient and high-speed use of shared resources by different types of computers connected on a network environment.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 is an explanation drawing that shows a virtual machine instruction set used in the conventional technique and the present invention;

FIG. 3 shows contents of the decode table shown in FIG. 1;

FIG. 4 shows microprogram lists stored in the microprogram storing unit shown in FIG. 1;

FIG. 5 shows operation contents of real machine instructions of the conventional technique and the present invention;

FIG. 10A shows a sample program list;

FIG. 10B shows the arithmetic expression "2*(3+4)" based on FIG. 10A;

FIG. 10C shows decoded data transmitted from the decoding unit in order;

FIG. 11 shows changing internal states of the conventional virtual machine when the executing unit of the virtual machine processes the decoded data shown in FIG. 10C;

FIGS. 12A–12D show a microprogram list for the conventional virtual machine that uses the TOS variable;

FIG. 14 is an explanation drawing that shows abbreviated symbols for pipeline stages;

FIG. 15 shows an ideal pipeline flow of the standard machine;

FIG. 16 shows an ideal pipeline flow of the superscalar machine;

FIG. 17 shows a pipeline flow of the standard machine when hazzards occur;

FIG. 18 shows a pipeline flow of the superscalar machine when hazzards occur;

FIG. 19 shows a pipeline flow when two clock cycles need to pass before values obtained through memory access can be used in the case shown in FIG. 17;

FIG. 20 shows a pipeline flow when two clock cycles need to pass before values obtained through memory access can be used in the case shown in FIG. 18;

FIG. 21 shows a pipeline flow for the standard machine when instructions A1 and A2 are instructions that indicate jump destinations using a register;

FIG. 22 shows a pipeline flow for the superscalar machine when instructions A1 and A2 are instructions that indicate a jump destination using a register;

FIG. 23 shows a pipeline flow when the virtual machine of the first conventional technique is realized by a standard machine where one clock cycle needs to pass before values obtained through memory access can be used and the virtual machine program shown in FIG. 10A is executed;

FIG. 24 shows a pipeline flow corresponding to FIG. 23 when the virtual machine of the first conventional technique is realized by a superscalar machine;

FIG. 25 shows a pipeline flow for the standard machine when two clock cycles need to pass before values obtained through memory access can be used;

FIG. 26 shows a pipeline flow corresponding to FIG. 25 in the case of the superscalar machine;

FIG. 27 shows a virtual machine program list as a sample;

FIG. 29 is a conversion table that is used by the conventional JIT compiler;

FIG. 30 shows the code arrangement of the real machine program that is obtained when the sample virtual machine program shown in FIG. 27 is compiled using the conversion table shown in FIG. 29;

FIG. 36A shows the next instruction information stored in the next instruction information storing unit of the virtual machine shown in FIG. 35;

FIG. 36B shows the virtual machine program that is stored in the instruction storing unit and that corresponds to the next instruction information shown in FIG. 36A;

FIG. 37 shows stored contents of the decode table of the first embodiment;

FIGS. 38A and 38B show microprograms corresponding to virtual machine instructions "Push" assigned "U" and "D", respectively;

FIGS. 39A and 39B show microprograms corresponding to virtual machine instructions "Add" assigned "U" and "D", respectively;

FIGS. 40A and 40B show microprograms corresponding to virtual machine instructions "Mult" assigned "U" and "D", respectively;

FIG. 41A shows a microprogram corresponding to the latter half of the microprograms assigned "U" shown in FIGS. 39A and 40A;

FIG. 41B shows a microprogram corresponding to the latter half of the microprograms assigned "D" shown in FIGS. 39B and 40B;

FIG. 46 shows a decoded data sequence successively outputted from the decoding unit to the executing unit of the virtual machine in the first embodiment;

FIG. 48 shows a pipeline flow for the standard real machine when one clock cycle needs to pass before values obtained through memory access can be used;

FIG. 49 shows a pipeline flow for the superscalar real machine when one clock cycle needs to pass before values obtained through memory access can be used;

FIG. 50 shows a pipeline flow for the standard real machine when two clock cycles need to pass before values obtained through memory access can be used;

FIG. 51 shows a pipeline flow for the superscalar real machine when two clock cycles need to pass before values obtained through memory access can be used;

FIG. 78 shows the construction of the branch address conversion table of the virtual machine compiler;

FIG. 102 is a table showing the block start information generated by the block start information generating unit, the timing of the generation of "Nop" real machine instructions generated by the branch position amending unit of the JIT compiler, and other related information; and, FIG. 103 shows a modification example of a virtual machine instruction format used by the virtual machine of the present invention.

DESCRIPTION OF THE PREFERRED EMBODIMENT(S)

The following explains embodiments of the present invention, with reference to figures.

First Embodiment

The following describes the virtual machine system of the first embodiment that can absorb a true data dependency.

Figure 34:
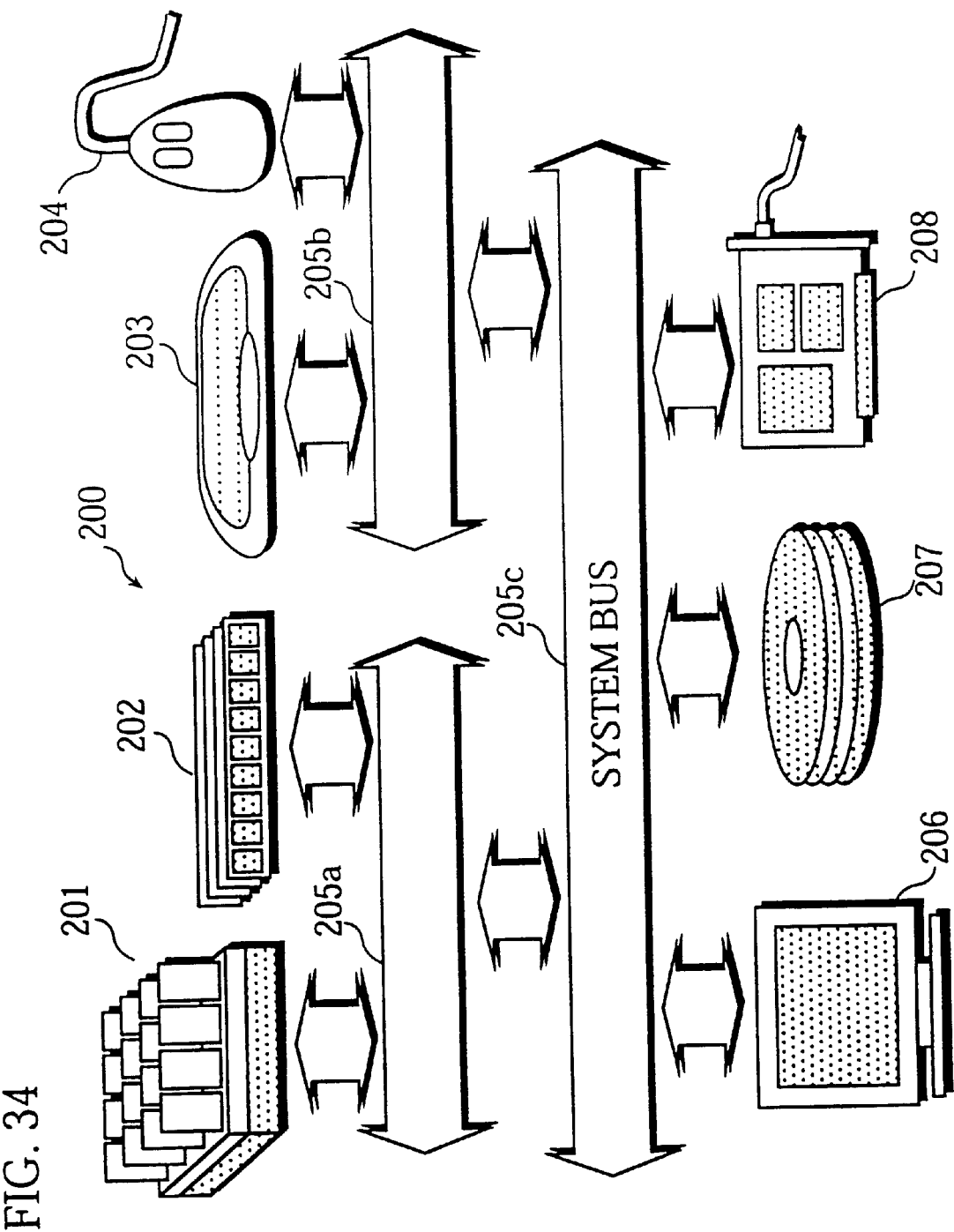
FIG. 34 is a hardware construction drawing of a computer system where the virtual machine systems of the first to ninth embodiments are used.

FIG. 34 shows a hardware construction of the computer system 200 that operates the virtual machine system of the present embodiment. The computer system 200 comprises a real machine 201, a memory 200, a keyboard 203, a mouse 204, a display screen 206, a hard disks 207, a network card 208, and internal busses 205A–205C that connect these elements. This hardware construction is the same as that of a normal personal computer.

The virtual machine and the virtual machine compiler of the present embodiment are programs written with instructions for the real machine 201. These programs are stored in the hard disks 207 and loaded into the memory 202 according to instructions from the user or from another program that is being executed by the real machine 201. The real machine 201 is a CPU that decodes and executes the real machine instructions shown in FIG. 5 in the same way as described in the prior art.

Virtual Machine Construction

Figure 35:
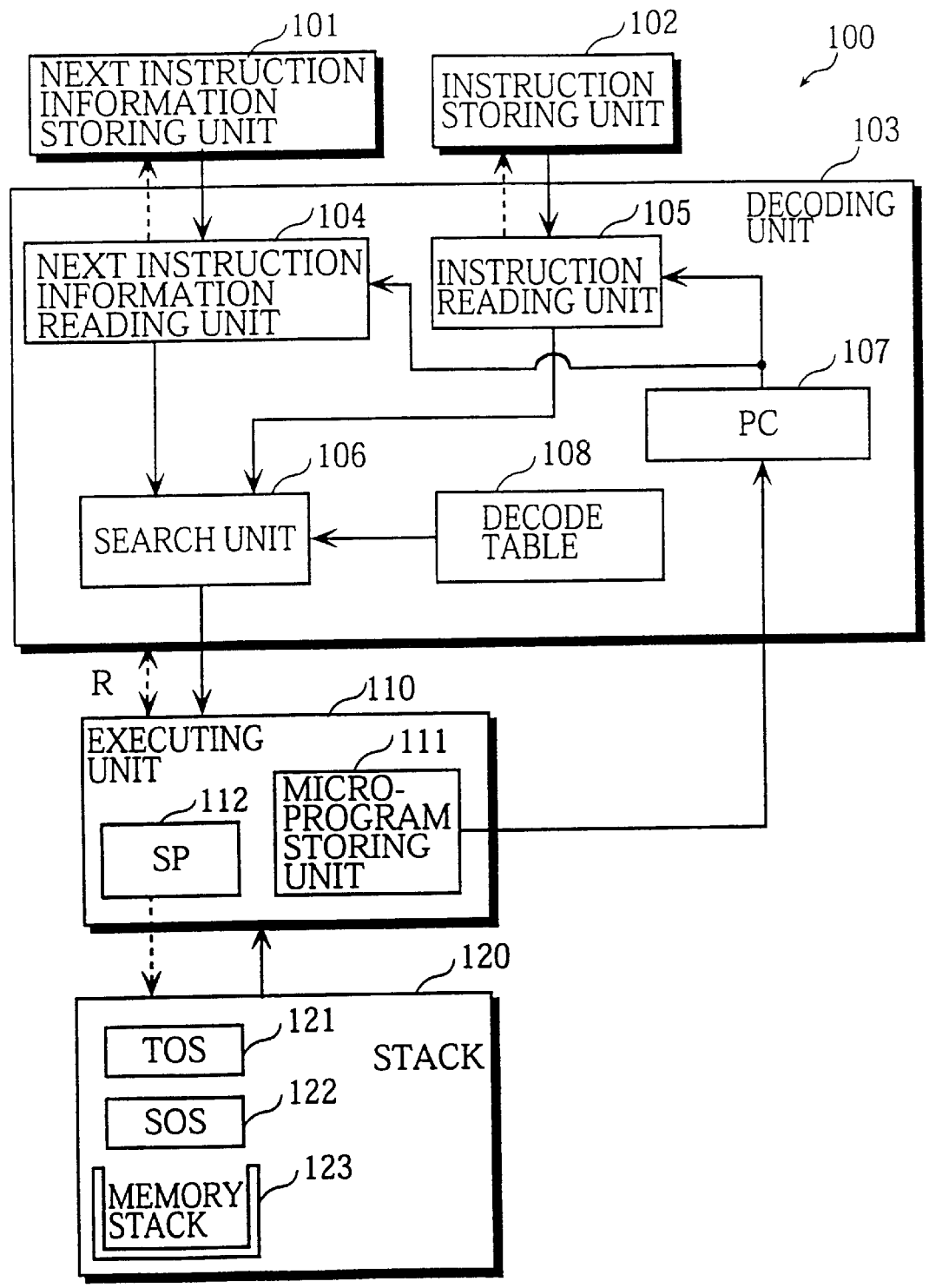
FIG. 35 is a block diagram showing the construction of the virtual machine in the first embodiment.

FIG. 35 is a block diagram showing the construction of a virtual machine 100 of the present embodiment. This figure corresponds to FIG. 1 in the explanation of the prior art. This virtual machine 100 includes a next instruction information storing unit 101, an instruction storing unit 102, a decoding unit 103, an executing unit 110 and a stack 120.

The instruction storing unit 102 is a storage area to store a virtual machine program to be processed, and the next instruction information storage unit 101 is an area to store sets of next instruction information that correspond to virtual machine instructions constituting the virtual machine program. A set of next instruction information refers to one-bit information indicating whether a virtual machine instruction that immediately follows a currently executed instruction is an instruction whose execution results in the level of the stack 120 being increased or decreased. Next instruction information indicating the former is written as "U" and the latter as "D". This information is generated together with the virtual machine program from a source program using a virtual machine compiler of the present embodiment, which will be described later.

FIGS. 36A and 36B respectively show examples of next instruction information stored in the next instruction information storing unit 101 and virtual machine codes stored in the instruction storing unit 102. These virtual machine codes and next instruction information correspond to a virtual machine program with the same contents as the virtual machine program shown in FIG. 10A, i.e. a calculation of "2*(3+4)". For example, next instruction information "U" is stored in locations specified by addresses "1" and "2" in the next instruction storing unit 101, since the corresponding virtual machine instruction "Push 2" in addresses "1" and "2" in the instruction storing unit 102 precedes an instruction "Push 3", that raises the level of the stack 120.

The decoding unit 103 reads virtual machine instructions successively from the instruction storing unit 102, decodes the virtual machine instruction referring to a corresponding set of next instruction information stored in the instruction storing unit 102, and outputs the result of the decoding to the executing unit 110. The decoding unit 103 includes a next instruction information reading unit 104, an instruction reading unit 105, a search unit 106, a program counter (PC) 107, and a decode table 108.

The PC 107 is a storage area to hold the address of a virtual machine instruction to be read next from the instruction storing unit 102 and the address of the corresponding next instruction information in the next instruction information storing unit 101. In the present embodiment, these addresses are assigned the same address number and are updated by the executing unit 110. The PC 107 is allocated physically to register #2 (r2) of the real machine 201.

The instruction reading unit 105 reads a virtual machine instruction from the instruction storing unit 102 according to the address indicated by the PC 107 and outputs the read virtual machine instruction to the search unit 106. In the same way, the next instruction information reading unit 104 reads a set of next instruction information from the next instruction information storing unit 101 specified by the address in the PC 107 and outputs the read information to the search unit 106. This processing by the next instruction unit 104 is synchronized with the instruction reading unit 105.

The decode table 108 stores the combinations of the next instruction information and opcodes corresponding to all the virtual machine instructions shown in FIG. 2 to be decoded and executed by the virtual machine 100, a jump address of a microprogram in the microprogram storing unit 111 to which each combination jumps, and a number of operands that accompany each opcode. Each opcode has one combination with the next instruction information "U", and one with the next instruction "D". As in the prior art, opcodes are 1-byte long, and operands are counted in units of one byte.

FIG. 37 shows the stored contents of the decode table 108, which corresponds to the decode table 4406 shown in FIG. 3 in the description of the prior art. Unlike the conventional decode table 4406, the jump address 108C and the number of operands 108D in this decode table 108 correspond to two cases when the opcode 108A is associated with next instruction information 108B "U" and "D". As one example, for the opcode "Push", a jump address to a microprogram that processes "Push" assigned "U" is provided for cases when the opcode "Push" is associated with the next instruction information "U", and a jump address to a microprogram that processes "Push" assigned "D" is provided for cases when the opcode "Push" is associated with the next instruction information "D".

The search unit 106 receives an opcode of a virtual machine instruction from the instruction reading unit 105 and the next instruction information from the next instruction reading unit 104 as a combination, specifies an entry corresponding to the combination out of the decode table 108, reads a jump address stored in the specified entry to output it as the decoded data to the executing unit 101.

The executing unit 110 executes a microprogram corresponding to a virtual machine instruction using the decoded data sent from the search unit 106. This executing unit 110 includes a microprogram storing unit 111 and a stack pointer (SP) 112.

The microprogram storing unit 111 stores microprograms corresponding to the combinations of the virtual machine instructions to be decoded and executed by the virtual machine 100 and the next instruction information. These microprograms will be explained later in detail.

The SP 112 is a storage area to store an address of the top of the stack 120 as described in the prior art, and is allocated physically to a register #3 (r3) of the real machine 201.

The stack 120 is a temporary LIFO storage area used by the executing unit 110 to execute microprograms for the decoded virtual machine program. This stack 120 includes the TOS variable 121, the SOS (Second Of Stack) 122 and the memory stack 123. The TOS variable 121 is a storage area for a value at the top of the stack 120 and is physically allocated to register #0 (r0) of the real machine 201. The SOS variable 122 is a storage area for a value on the second level of the stack 120 and is physically allocated to register #4 (r4) of the real machine 201. The memory stack 123 is a storage area for values on the third and lower levels and is allocated physically to the memory 202.

Contents of the Microprogram Storing Unit 111

FIGS. 38A and 38B respectively show microprograms in the microprogram storing unit 111 that correspond to the virtual machine instructions "Push" assigned "U" and "Push" assigned "D". FIGS. 39A, 39B, 40A, and 40B show microprograms corresponding to virtual machine instructions "Push" assigned "U" and "D", and virtual machine instructions "Mult" assigned "U" and "D". The instruction sequence shown in FIG. 41A forms the common latter part of the microprograms shown in FIGS. 39A and 40A that correspond to virtual machine instructions assigned "U". In the same way, the instruction sequence shown in FIG. 41B forms the common latter part of the microprograms shown in FIGS. 39B and 40B that correspond to virtual machine instructions assigned "D". The operation content of each real machine instruction in these microprograms are shown in FIG. 5.

By comparing these microprograms with the conventional microprograms shown in FIGS. 4A–4D and 12A–12D, it can be seen that the microprograms in the microprogram storing unit 111 of the virtual machine 100 in the present embodiment have the following characteristic. That is, with the present embodiment, different microprograms are prepared for a same type of virtual machine instruction and are selectively used depending on the next instruction information assigned to the virtual machine instruction. By considering how stack handling will be performed during the execution of the next virtual machine instruction, needless stack operations and pipeline disturbances due to true data dependency can be avoided. For instance, while the microprogram shown in FIG. 38B is for the virtual machine instruction "Push", it does not include an instruction to push a value stored in the SOS variable 122 to the memory stack 123 because the next instruction information assigned to this virtual machine instruction is "D", meaning that the execution of the next instruction will result in a pop. In this way, needless pushes to the memory are avoided in advance.

The virtual machine 100 has also another characteristic in that not only the storage area at the top of the stack 120 (the TOS variable 121), but also the storage area on the second level of the stack 120 (the SOS variable 122) are allocated to registers, not the memory. By doing so, both values used by an operation such as an addition can be held in registers, so that data transfer between the real machine 201 and the memory 202 can be performed less frequently. For instance, when an addition is performed, no data transfer between the registers and the memory 202 is necessary.

Figure 42:
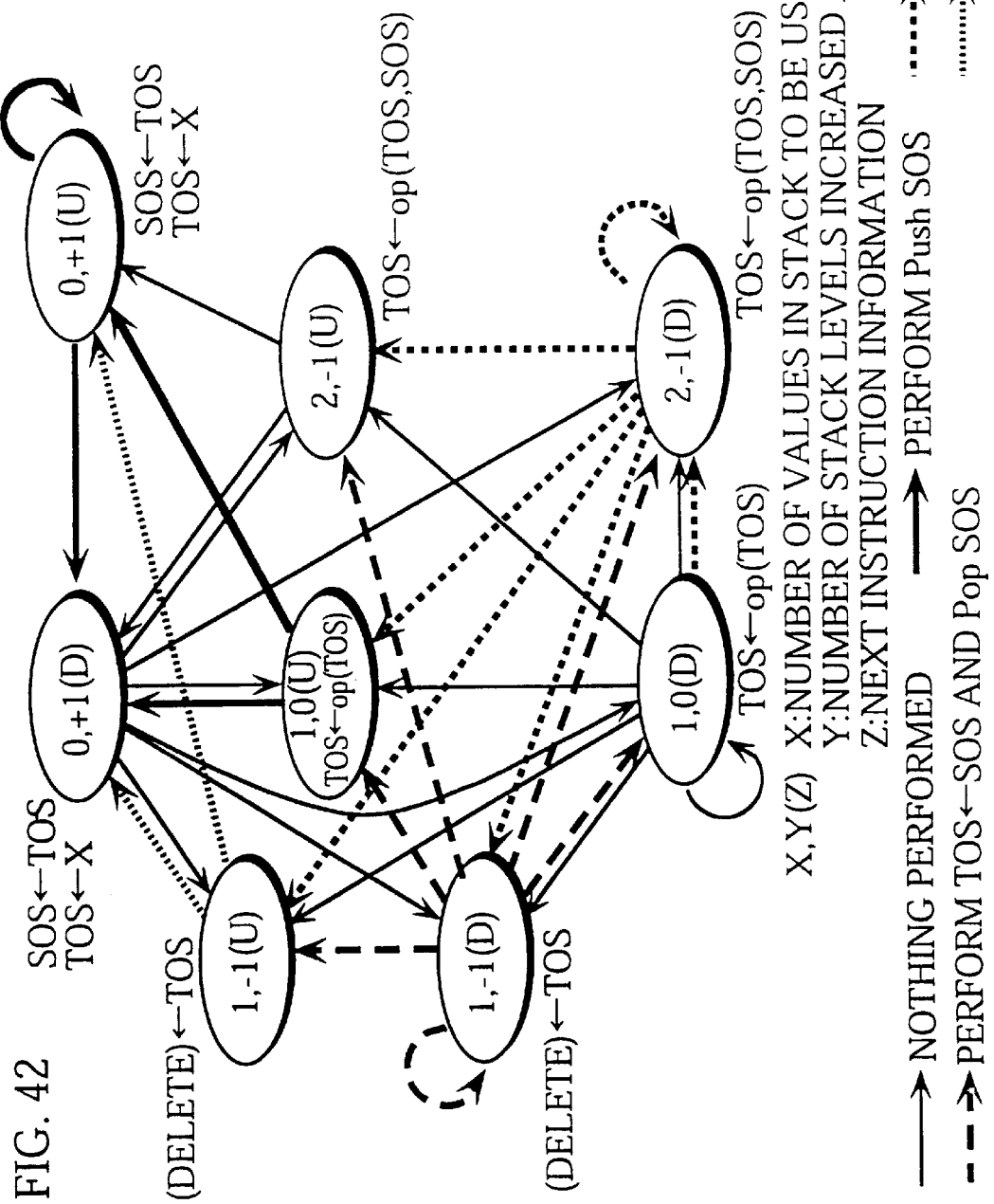
FIG. 42 is a state transition diagram showing changes in virtual machine instruction types to be executed by the virtual machine of the first embodiment.

FIG. 42 is a state transition diagram showing changes in virtual machine instruction types. Here, each state in the state transition corresponds to an instruction type for each virtual machine instruction to be executed by the virtual machine 100 of the present embodiment. These instruction types are obtained by classifying all the combinations of virtual machine instructions to be decoded and executed by the virtual machine 100 and next instruction information, into the groups or instruction types, as indicated in the ovals in the figure, according to operations performed in the stack 120. Three numbers "X,Y(Z)" enclosed by each circle respectively denote a number of values used out of the stack by an operation, an increase in the number of stack levels due to the execution of the operation, and the next instruction information. For example, the "2, -1(U)" instruction type represents all virtual machine instructions that require two values for their operation, whose execution reduces the stack by one level, and that are assigned the next instruction information "U". An example of such is the virtual machine instruction "Add" that is assigned the next instruction information "U". The equation next to each oval of instruction type shows changes in the TOS variable 1221 and the SOS variable 122 resulting from the execution of the virtual machine instruction type in the oval, with "X" denoting an operand.

In this figure, any instruction belonging to an instruction type from which an arrow starts can be executed prior to the execution of any instruction belonging to the other instruction type indicated by the arrow. Different operations that can be executed prior to the execution of a next instruction are distinguished by arrows. Hereafter, these operations, which can be performed prior to the execution of the nest instruction, are called preceding operations. In FIG. 42, all arrows that start at a same instruction type are the same type. After the execution of an instruction belonging to the instruction type "2, -1(D)", for instance, a preceding operation shown by the arrow indicating "Pop SOS" can be executed before a next instruction which belongs to one of the following six instruction types: "2, -1(U)", "2, -1(D)", "1,0(U)", "1,0(D)2, "1, -1(U)", and "1, -1(D)". These operations "Pop SOS" pops the value at the top of the memory stack 123 onto the SOS variable 122. Note that the unconditional branch instruction "Br" and the end instruction "Stop" are represented by "1,0(U)" or "1,0(D)", which indicate that an empty operation is performed for a value stored in the TOS variable 121.

In this way, this state transition diagram can be thought of as showing analyzing results which indicate the preceding operations for each virtual machine instruction of the virtual machine 100. These analysis results are reflected in the microprograms stored in the microprogram storing unit 111, so that preceding operations (shown by the different types of arrows) are included in the corresponding microprograms.

Operation of Virtual Machine

The following explains the processing of the virtual machine 100 whose construction has been explained above.

Figure 6:
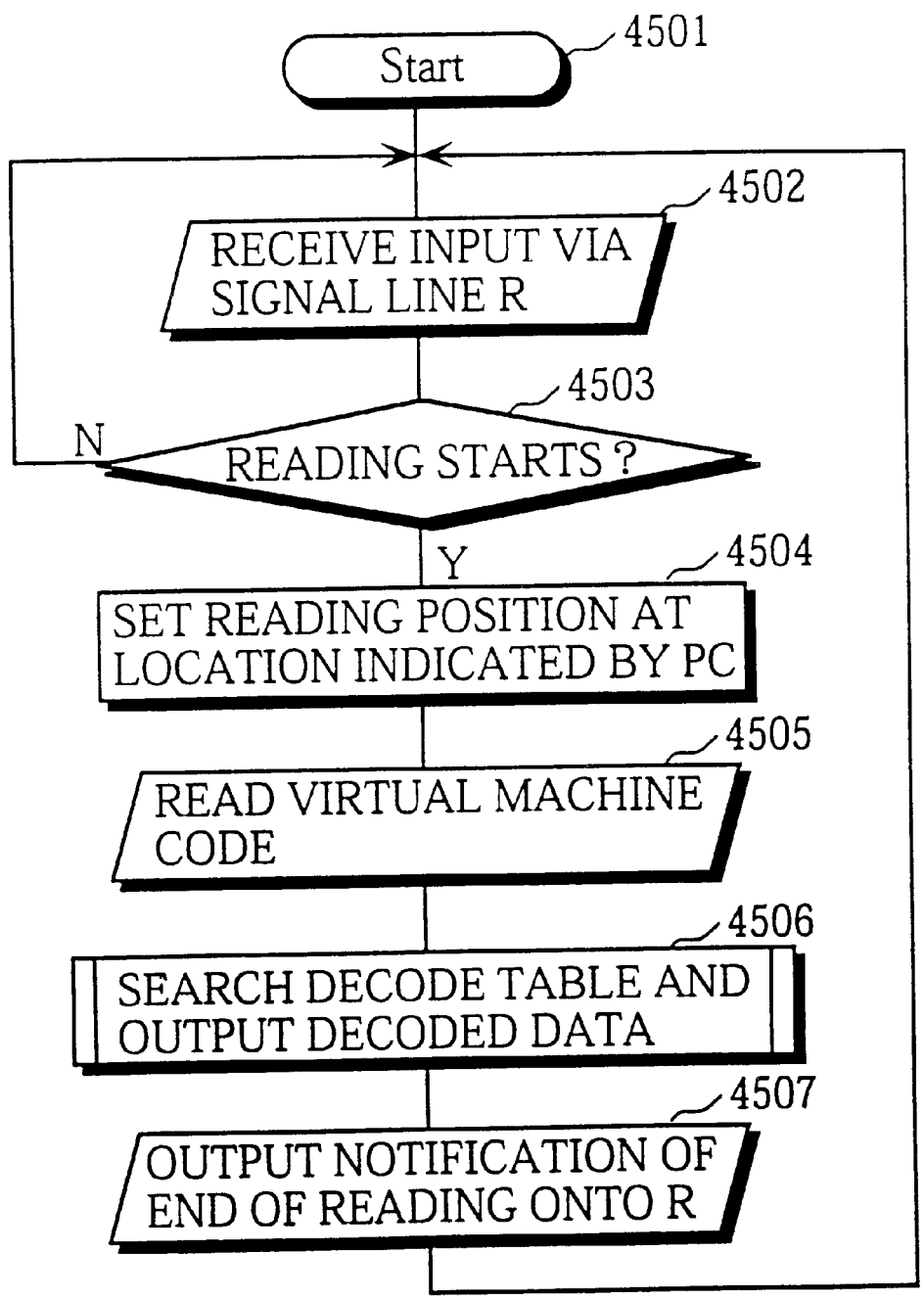
FIG. 6 is a flowchart showing the processing of the decoding unit shown in FIG. 1.
Figure 43:
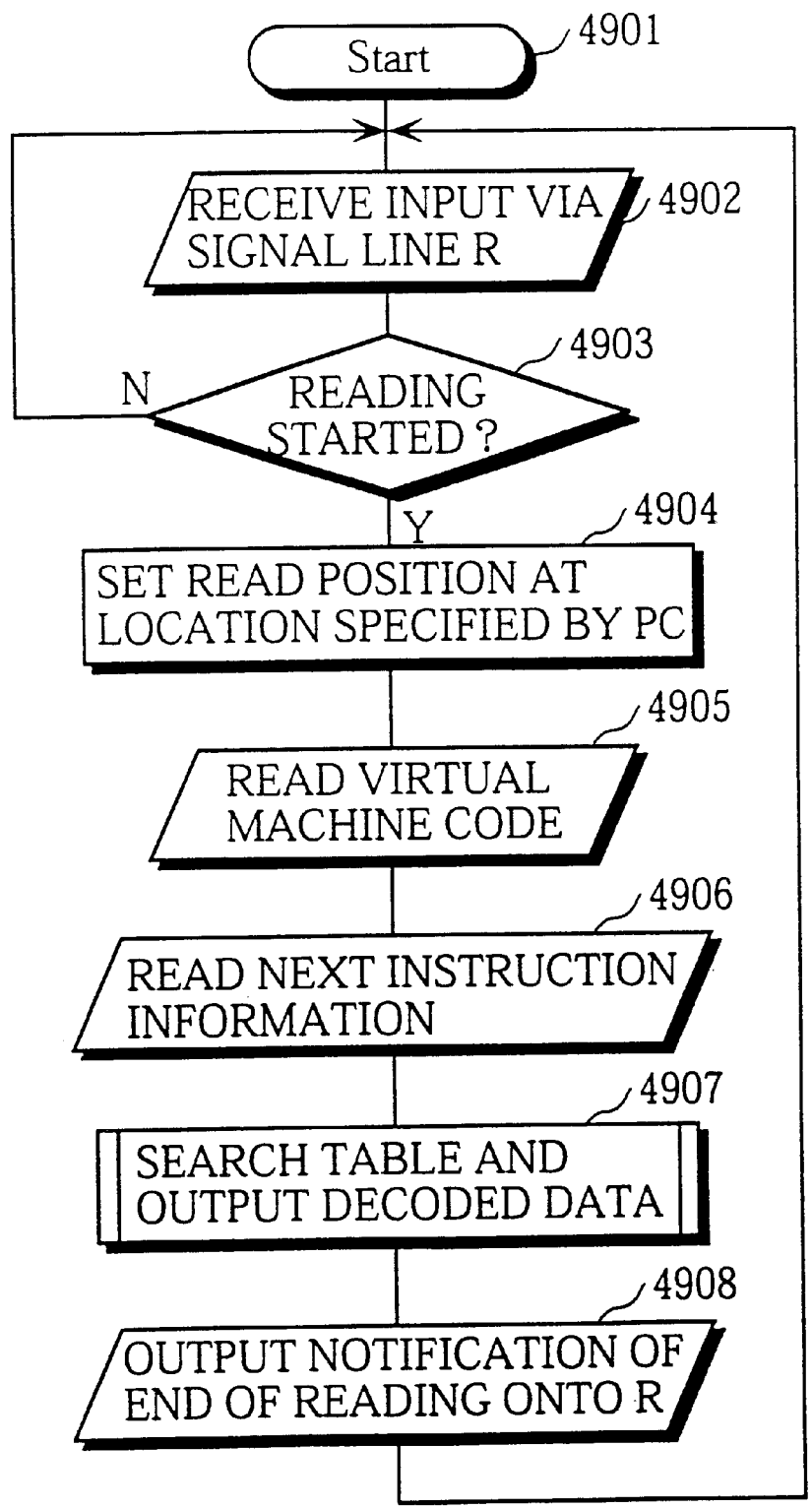
FIG. 43 is a flowchart showing the processing of the decoding unit of the virtual machine of the first embodiment.

FIG. 43 is a flowchart showing the processing of the decoding unit 103 of this virtual machine. This figure corresponds to FIG. 6 in the description of the prior art. By comparing FIGS. 43 and 6, it can be observed that the processing flow of this decoding unit 103 is basically the same as that of the conventional decoding unit 4402, except that a new step (step 4906) has been added and that specific contents of the processing to search the decode table (step 4907) are different. In the new step, the next instruction information storing unit 101 reads next instruction information from the next instruction storing unit 101 in synchronization with the instruction reading unit 105.

Figure 7:
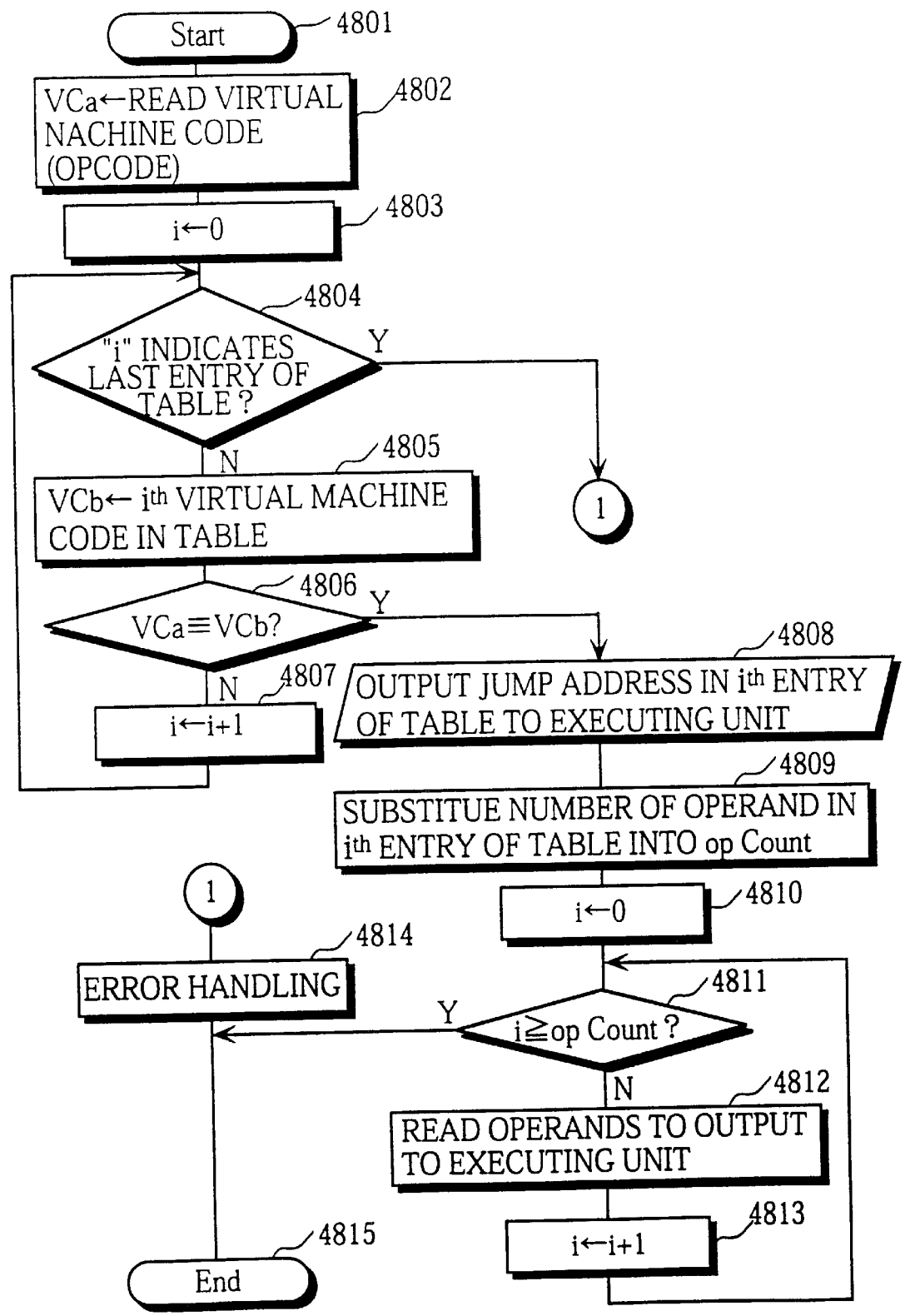
FIG. 7 is a flowchart showing the specific processing of step 4506 in FIG. 6.
Figure 8:
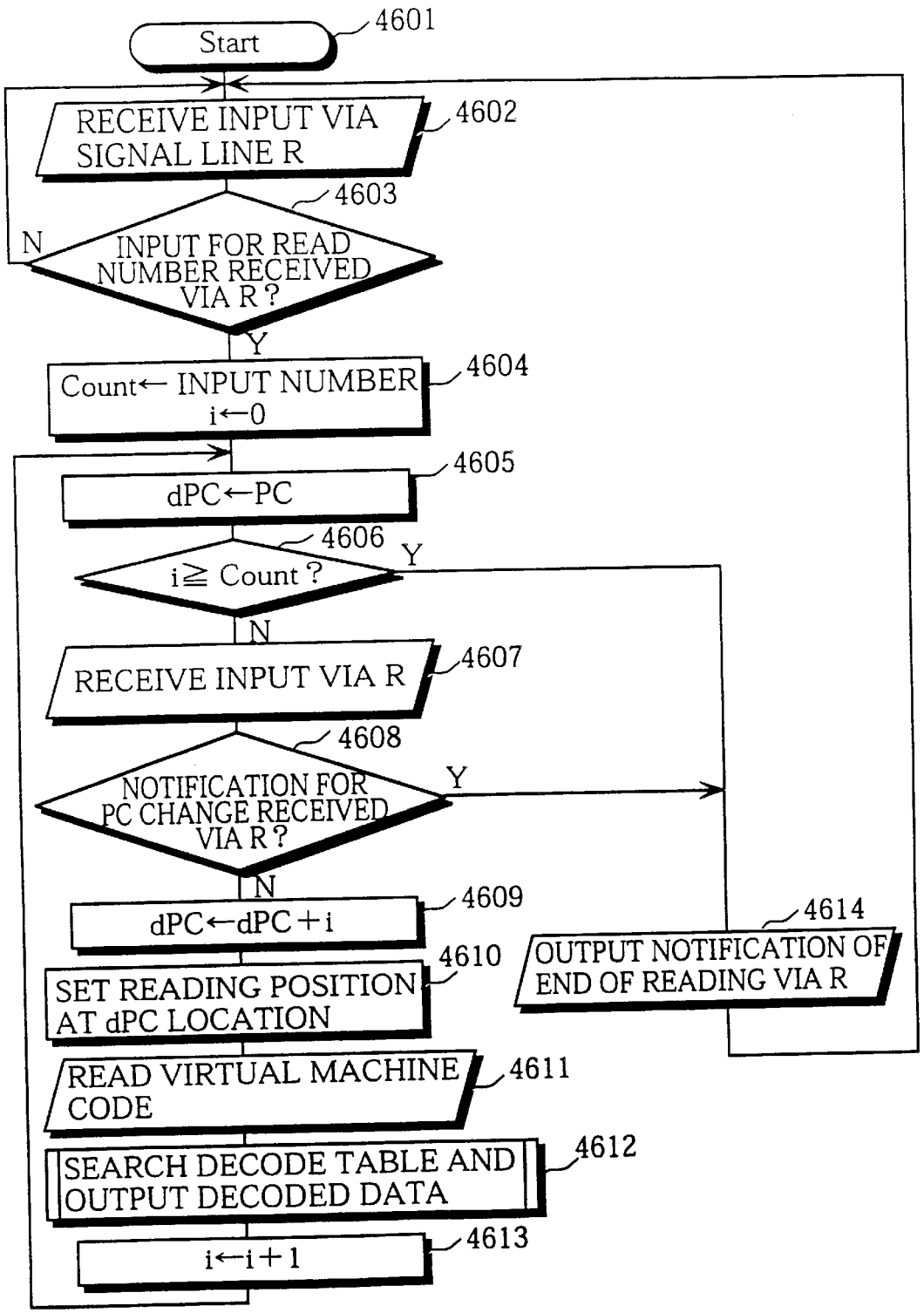
FIG. 8 is a flowchart showing the processing of decoding unit 4402 in a case where decoded data transmitted from the decoding unit is transferred to the executing unit via a buffer.
Figure 44:
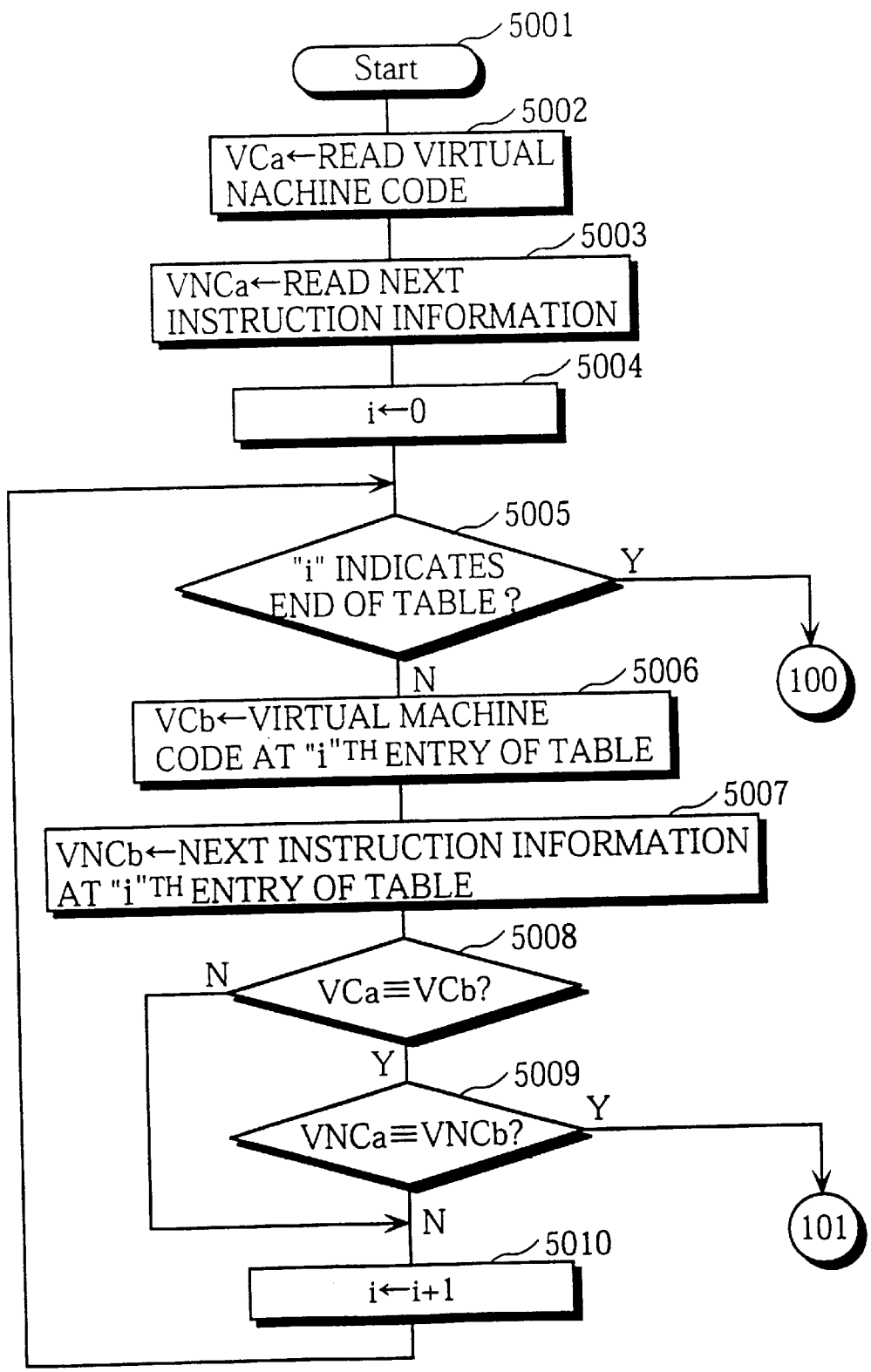
FIG. 44 is a flowchart showing the initial half of the detailed processing of step 4907 for table searching in FIG. 43.
Figure 45:
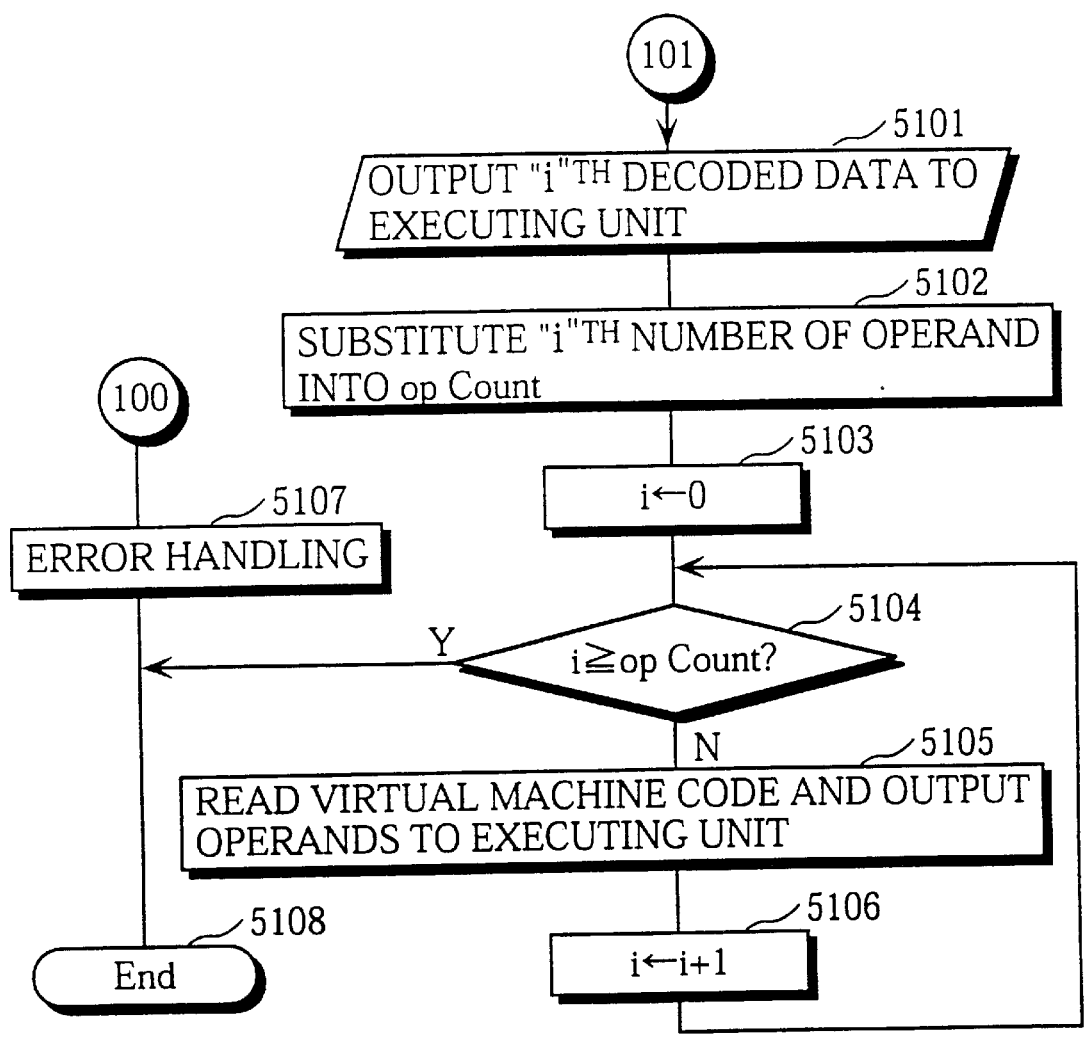
FIG. 45 is a flowchart showing the latter half of the detailed processing of step 4907 for table searching in FIG. 43.

FIGS. 44 and 45 are flowcharts respectively showing former and latter halves of the detailed processing for searching the decode table 108 shown in step 4907 in FIG. 43. This figure corresponds to FIG. 7 in the description of the prior art. As can be seen by comparing FIG. 7 with FIGS. 44 and 45, the processing for searching tables in the present embodiment differs from the conventional art in that the following steps are newly added. The search unit 106 refers to not only an opcode of a virtual machine instruction outputted from the instruction reading unit 105 but also the next instruction information outputted from the next instruction information reading unit 104 (steps 5003 and 5007). The search unit 106 then finds an entry corresponding to the combination of the opcode and the next instruction information from the decode table 108 when "Yes" is given in steps 5008 and 5009, refers to a jump address 108C and a number of operands 108D, and outputs them as decoded data to the executing unit 110.

FIG. 46 shows decoded data to be outputted successively to the executing unit 110 when the next instruction information and the virtual machine instructions are stored in the next instruction information storing unit 101 and the instruction storing unit 102 as shown in FIGS. 36A and 36B, respectively. FIG. 46 corresponds to FIG. 10C in the description of the prior art. As shown in the figure, jump addresses to microprograms that correspond to combinations of the next instruction information and a virtual machine instruction are outputted.

Figure 9:
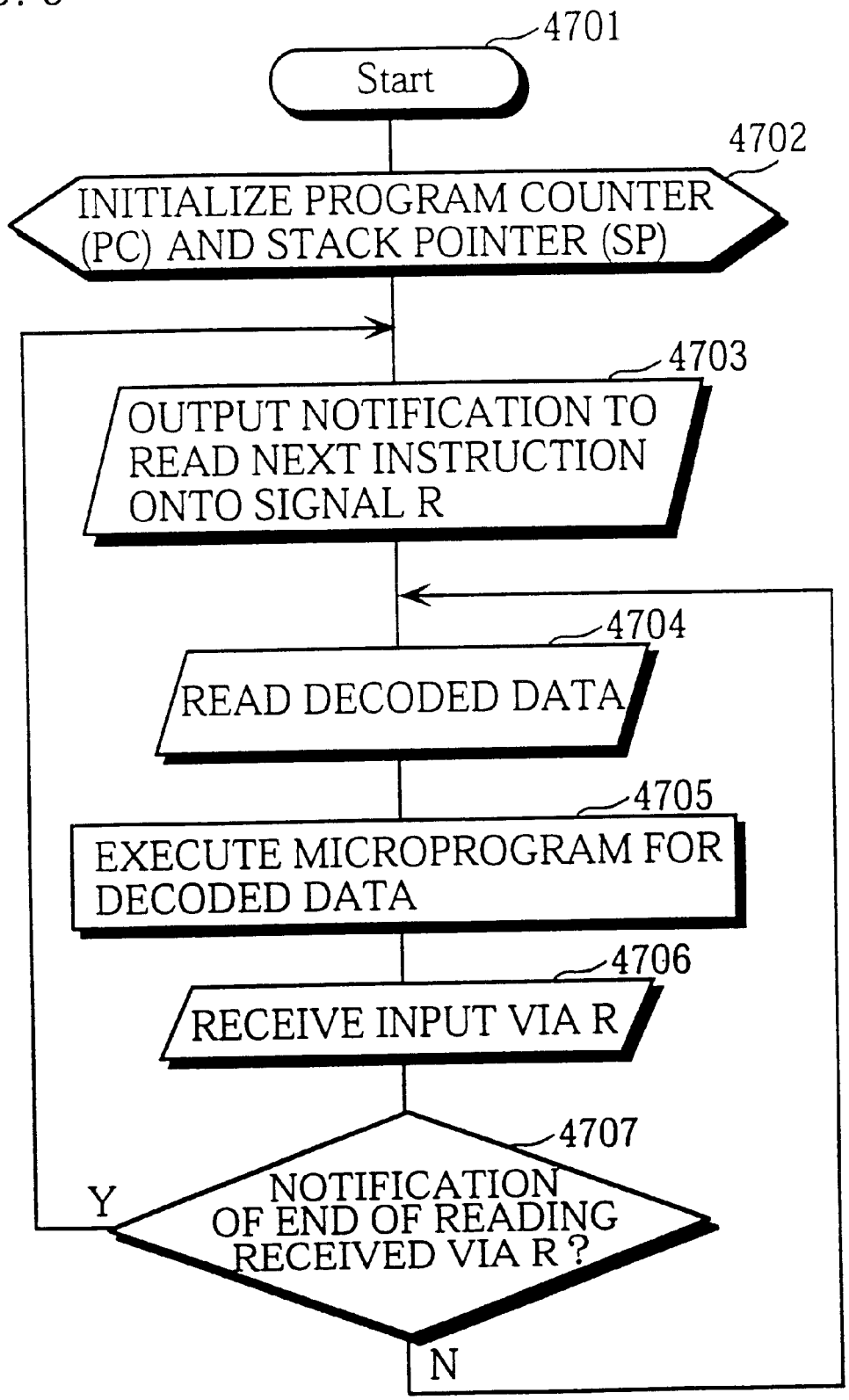
FIG. 9 is a flowchart showing the processing of the executing unit shown in FIG. 1.
Figure 13A:
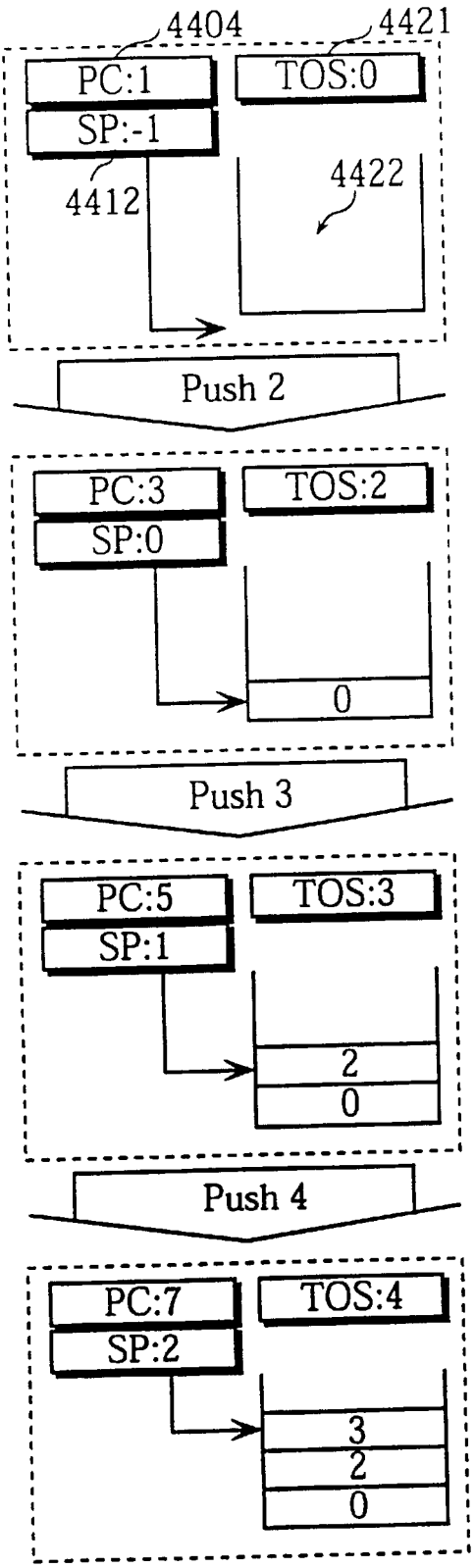
FIG. 13 shows changing internal states of the conventional virtual machine that stores microprograms shown in FIGS. 12A–12D when the virtual machine executes the virtual machine program shown in FIG. 10A.
Figure 13B:
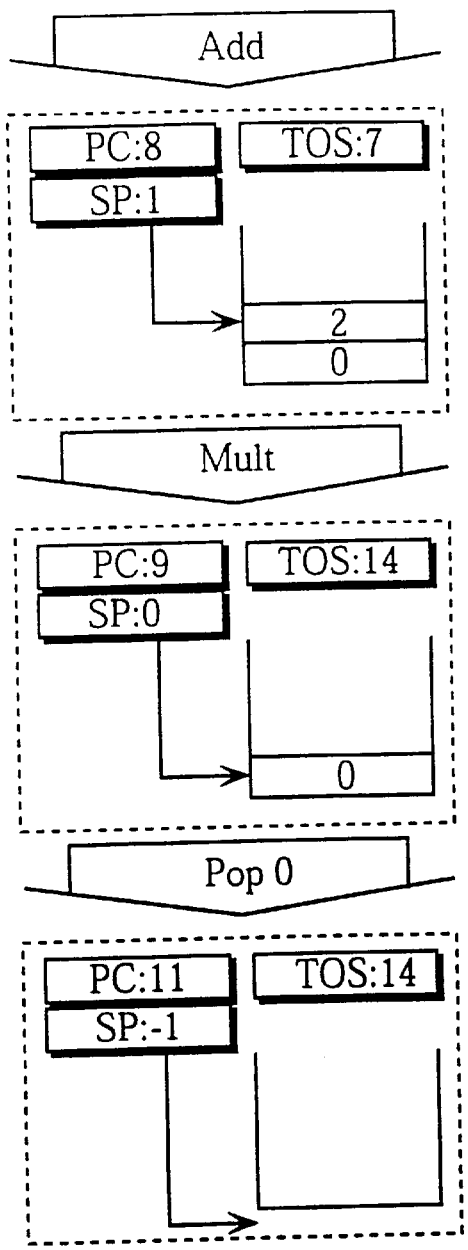
Figure 28:
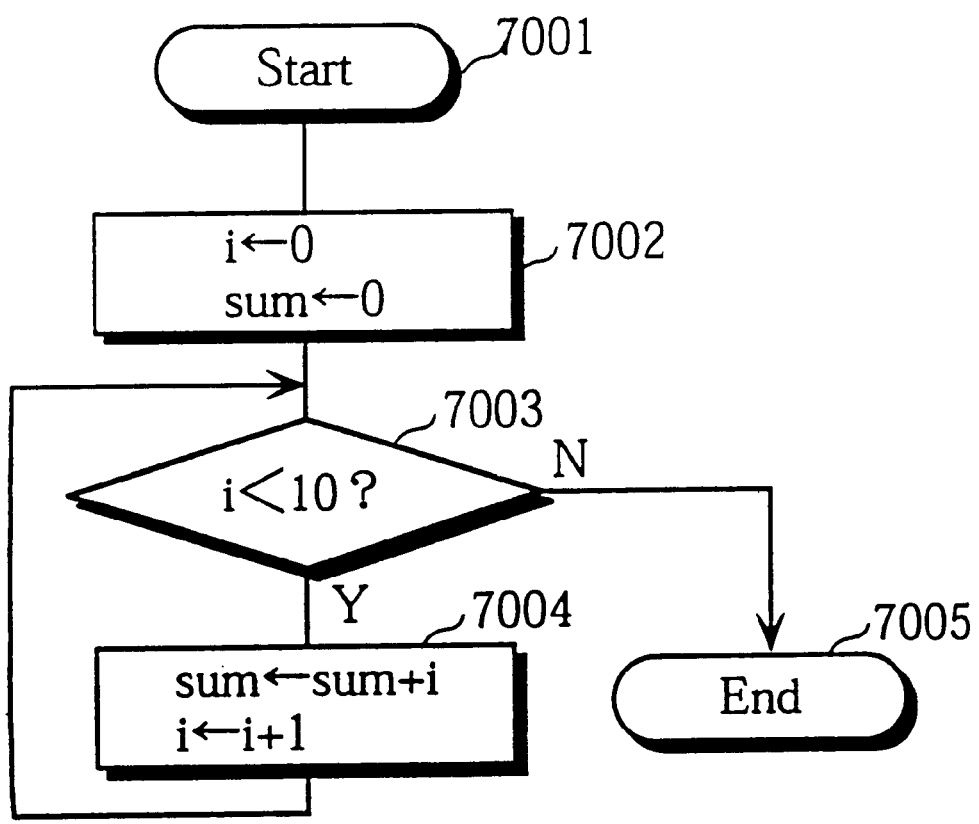
FIG. 28 is a flowchart for the sample program list shown in FIG. 27.
Figures 31A, 31B:
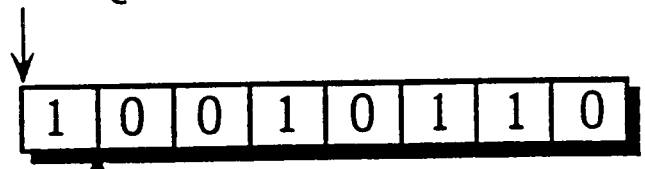
FIG. 31A shows an example of a compression table.
FIG. 31B shows an example code that is obtained using the compression table shown in FIG. 31A.

The processing of the executing unit 110 is basically the same as that of the prior art shown in FIG. 9. That is, the executing unit 110 initializes the PC 107 and the SP112 (step 4702) and repeats the following processing from steps 4703–4707, where the executing unit 110 reads decoded data transmitted from the decoding unit 103 (step 4704) and branches to a microprogram specified by a jump address included in the decoded data for its execution (step 4705).

Figure 47A:
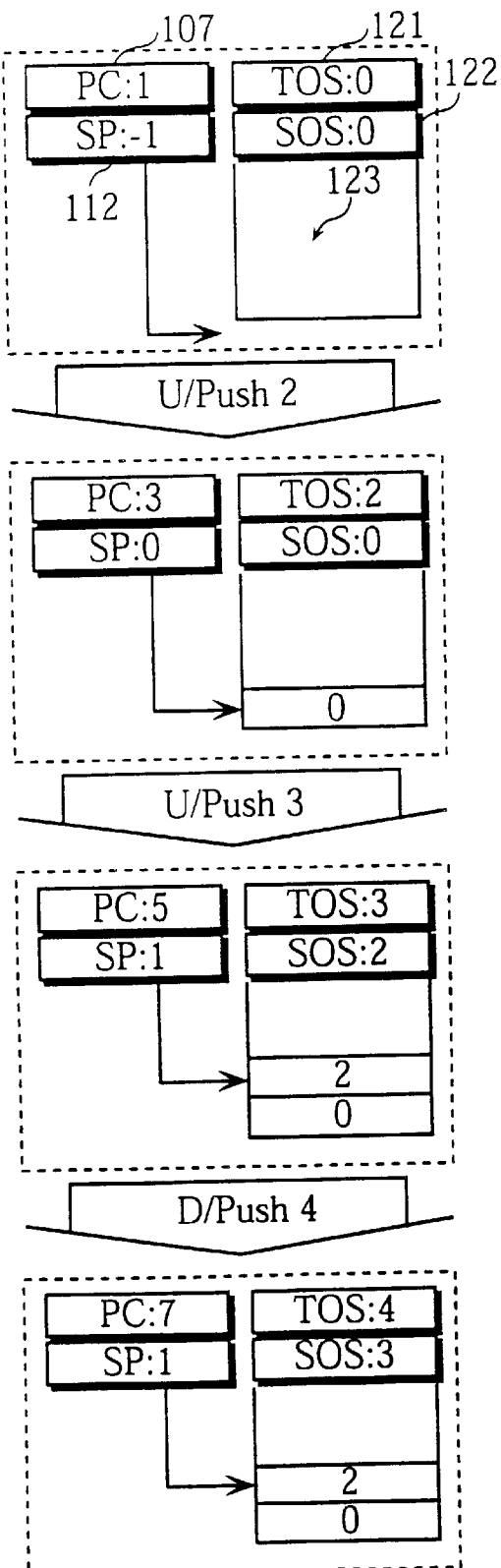
FIGS. 47A and 47B show changes in the internal states of the virtual machine when its executing unit operates according to the decoded data sequence shown in FIG. 46.
Figure 47B:
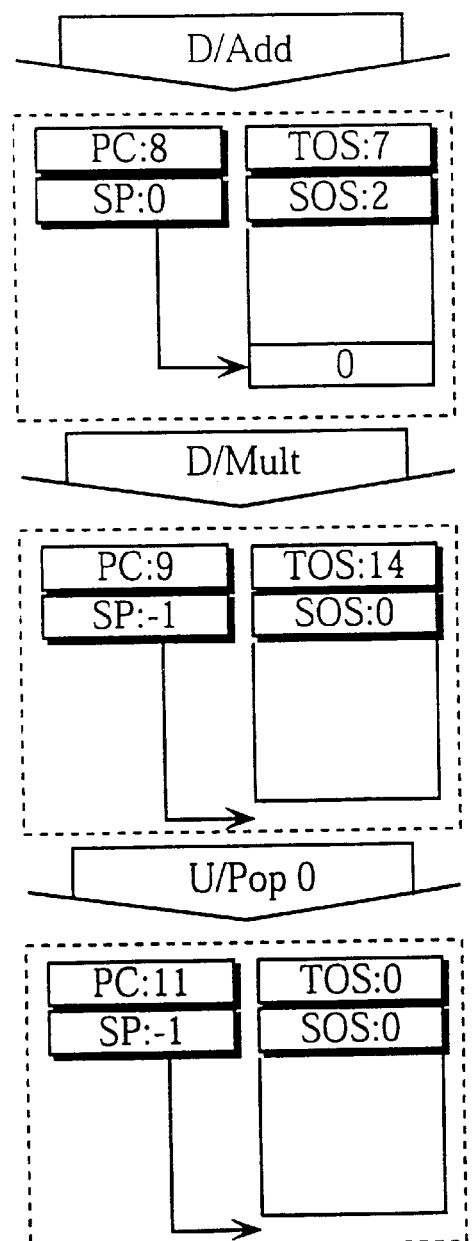

FIGS. 47A and 47B show the states of the PC 107, the SP 112, the TOS variable 121, the SOS variable 122, and the stack 4420 before and after the execution of the each virtual machine instruction when the executing unit 110 executes the virtual machine program shown in FIG. 36B. This figure corresponds to FIGS. 11A and 11B, or FIGS. 13A and 13B in the description of the prior art. A set of next instruction information and a virtual machine instruction to be executed is shown on the left and right of a slash "/", within a transition arrow pattern. The calculation of the arithmetic expression "2*(3+4)" is completed when PC 4404 indicates "9", as in the description of the prior art.

The characteristics observed in states shown in FIGS. 47A and 47B are, for instance, that after the execution of the virtual machine instruction "U/Push 3", the value in the SOS variable 122 has already been stored on the top of the memory stack 123, or that after the execution of the virtual machine instruction "D/Push 4", contents of the SP 112 and the memory stack 123 have not changed. These are the result of the execution of the preceding operations based on the analysis shown by the state transition diagram described above.

FIGS. 48–51 show pipeline flows of the real machine 201 when the virtual machine 100 of the present embodiment executes a part of the virtual machine program show in FIG. 36B, more specifically microprograms shown in FIGS. 41B and 40B, that respectively correspond to jump processing of the latter half of the virtual machine instruction "Add" assigned "D" with address "7" and multiplication processing of the first half of the instruction "Mult" assigned "D" with address "8". FIGS. 48 and 49 show the cases when one clock cycle is required before using a value obtained through memory reference (MEM) for a standard machine and a superscalar machine, respectively. FIGS. 50 and 51 show the cases requiring two clock cycles for a standard machine and a superscalar machine, respectively. These four figures correspond to FIGS. 23–26 for the first conventional technique.

This series of microprograms shown in FIGS. 12D and 12B contain two significant true dependencies between instructions. The first exists between instruction "Load" for reading a jump address and instruction "Jump" for jumping to that address. These instructions are included in the microprogram for jump processing shown in FIG. 12D corresponding to a virtual machine instruction "Add". The second true dependency exists between instruction "Load" for reading a variable from the memory stack and "Mult" for multiplication processing. These instructions are included in the microprogram shown in FIG. 12C corresponding to a virtual machine instruction "Mult" for multiplication processing.

In the pipeline flow shown in FIG. 48, the processing is only disturbed by one instruction cancellation caused in relation to the execution of the preceding real machine instruction "Jmp", so that the whole processing is completed in 11 cycle clocks. As can be seen by comparing this flow with that of FIG. 23, the execution speed of this virtual machine is the same as that of the conventional virtual machine described in the first conventional technique when the real machine 201 is a standard machine capable of using a memory reference value one clock cycle after a memory reference.

In the pipeline flow shown in FIG. 49, the first and the second data dependencies described in the first conventional technique are absorbed by the virtual machine 100 of the present embodiment. As a result, this pipeline flow is only disturbed by three instruction cancellations caused in relation to the execution of the preceding real machine instruction "Jmp r1", so that the whole processing is completed in 9 clock cycles. As can be seen by comparing this figure with that shown in FIG. 24, when the real machine 201 is a superscalar machine capable of using a memory reference value one clock cycle after a memory reference, the virtual machine 100 of the present embodiment has an execution speed 22% higher than that of the virtual machine described in the first conventional technique that requires 11 clock cycles.

In the microprogram corresponding to the virtual machine instruction "Add", instructions for the preceding operations, which are "Load r4, [r2]" and "Dec r3", for the next virtual machine instruction "Mult" are executed, and as a result, a sufficient time is secured between a memory reference (Load r1, [r2]) and a branch (Jmp r1) so that the disturbance in the pipeline flow is absorbed. Here, "Load r4, [r2]" and "Dec r3" for the preceding operations denote the popping from the memory stack 123 to the SOS variable 122 and a decrementing of the SP 112, respectively.

In the pipeline shown in FIG. 50, for the same reason described above, with the virtual machine 100 of the present embodiment, the first and the second data dependencies described in the first prior art are absorbed. As a result, the pipeline flow is only disturbed by the cancellation of one instruction necessitated by the execution of the preceding real machine instruction "Jmp r1", so that the whole processing is completed in 11 clock cycles. As can be seen by comparing this pipeline flow with that shown in FIG. 25, when the real machine 201 is a standard machine capable of using a memory reference value two clock cycles after a memory reference, the virtual machine 100 of the present embodiment has a performance speed 18% higher than that of the conventional virtual machine described in the first conventional technique that requires 13 clock cycles.

In the pipeline shown in FIG. 51, a number of hazards caused by the first data dependency decreases and the second data dependency is absorbed by the virtual machine 100 of the present embodiment. As a result, the pipeline flow is only disturbed by a hazard for one clock cycle resulting from the first data dependency and by the cancellation of five instructions due to the execution of the preceding real machine instruction "Jmp r1", so that the whole processing is completed in 10 clock cycles. As can be seen by comparing this pipeline flow with that shown in FIG. 26, when the real machine 201 is a standard machine capable of using a memory reference value two clock cycles after a memory reference, the virtual machine 100 of the present embodiment has a performance speed 30% higher than that of the virtual machine described as the first conventional technique that requires 13 clock cycles.

As has been described, the virtual machine 100 of the present embodiment executes a virtual machine instruction by referring to the corresponding next instruction information and performing stack handling, which is a preceding operation for the execution of the immediately following virtual machine instruction, between executions of two real machine instructions that have a true dependency with one another.

Construction of the Virtual Machine Compiler

The following explains a virtual machine compiler for the above virtual machine 100.

Figure 52:
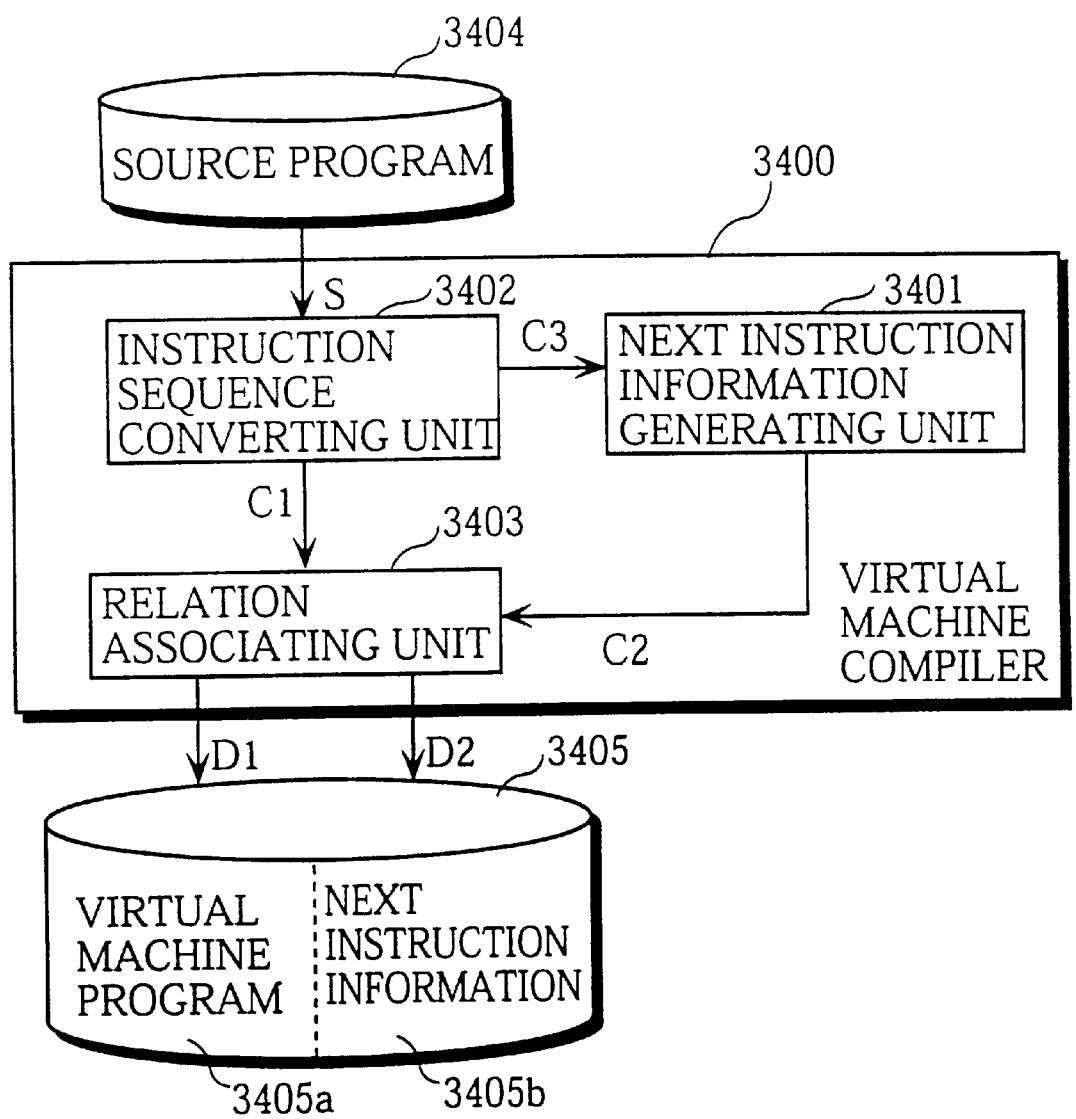
FIG. 52 is a block diagram showing the construction of the virtual machine compiler in the first embodiment.

FIG. 52 is a block diagram showing the construction of a virtual machine compiler 3400 for the above virtual machine 100. The input to this virtual machine compiler is a source program 3404 written in a high-level language. The virtual machine compiler 3400 is a cross compiler for generating a virtual machine program 3405A composed of the specific virtual machine instructions shown in FIG. 2 of the above virtual machine 100 and sets of next instruction information 3405B that correspond to the virtual machine instructions. This virtual machine compiler 3400 includes an instruction sequence converting unit 3402, a next instruction information generating unit 3401, and a relation associating unit 3403.

The instruction sequence converting unit 3402 receives the source program 3404 via a circuit S from the network card 208 or the hard disk 207, and performs syntactic analysis to convert the source program 3404 into a virtual machine instruction sequence containing virtual machine instructions specific to the above virtual machine 100. The instruction sequence converting unit 3402 successively outputs the converted virtual machine sequence to the next instruction information generating unit 3401 and the relation associating unit 3403 via circuits C1 and C3.

The next instruction information unit 3401 receives virtual machine instructions from the instruction sequence converting unit 3402, specifies a set of next instruction information for each virtual machine instruction, and outputs the specified sets of next instruction information to the relation associating unit 3403 in order via a circuit C2. The instruction sequence converting unit 3402 and the next instruction information generating unit 3401 adjust timing for outputting the virtual machine instructions and the next instruction information so that inputs of a virtual machine instruction and a corresponding set of next instruction information to the relation associating unit 3403 are synchronized.

The relation associating unit 3403 associates a virtual machine instruction outputted from the instruction sequence converting unit 3402 with a corresponding set of next instruction information outputted from the next instruction information generating unit 3401 as a pair, and outputs each virtual machine instruction and next instruction information to a storage area like the memory 202 or the hard disk 207 as a final output program 3405 via circuits D1 and D2.

Figure 53:
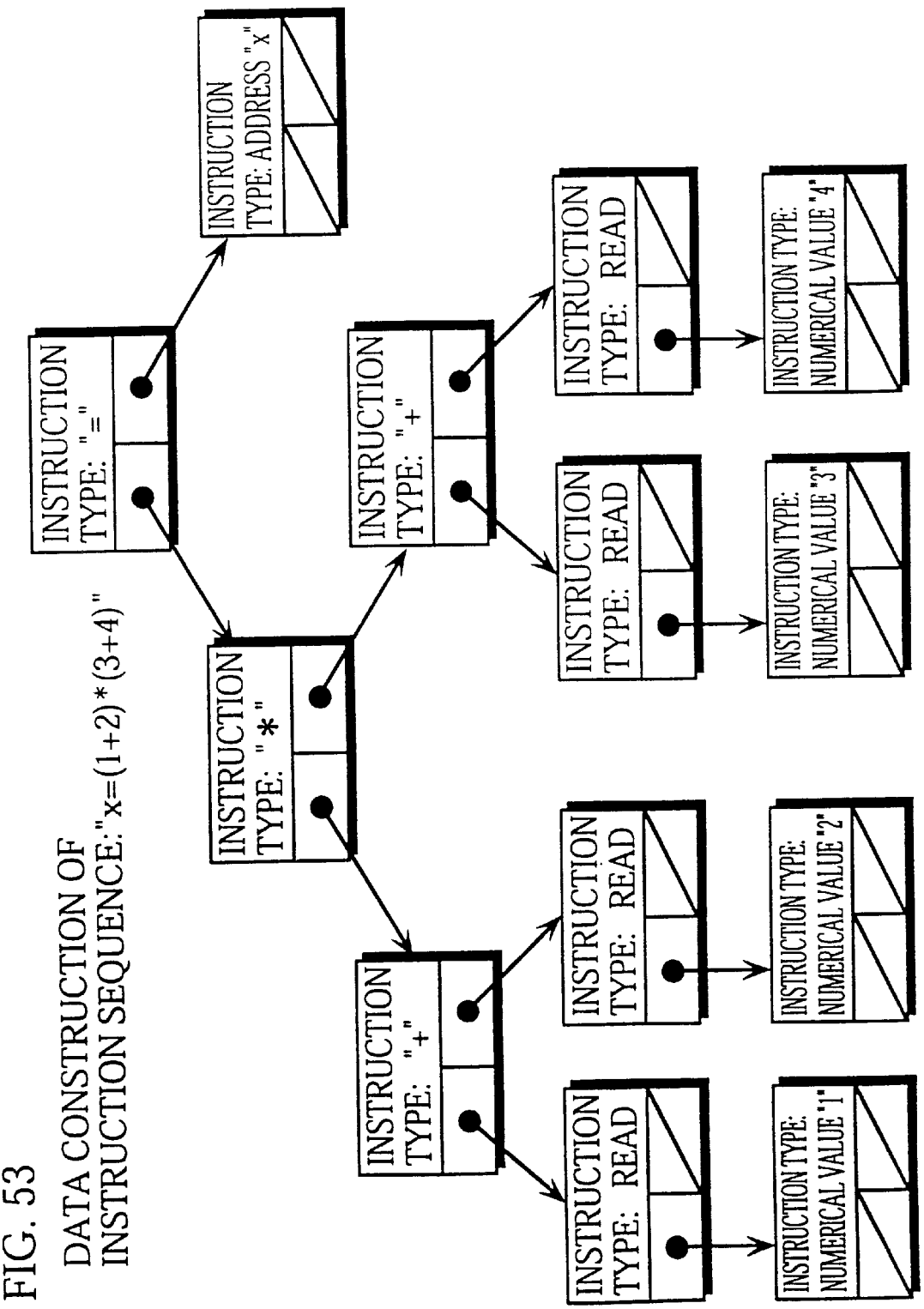
FIG. 53 shows the data construction of the source program to be inputted into the instruction sequence converting unit of the virtual machine compiler.
Figure 54:
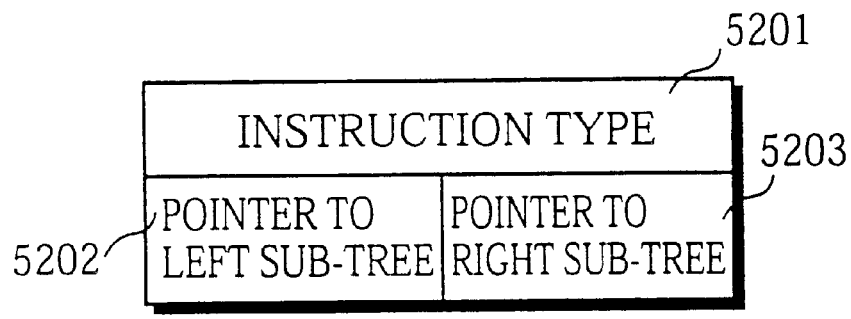
FIG. 54 shows the data construction of each node shown in FIG. 53.

FIGS. 53 and 54 shows data constructions of the source program 3404 to input to the instruction sequence converting unit 3402 via the circuit S. FIG. 53 shows a tree construction corresponding to an instruction sequence "x:= (1+2)*(3+4)" of the source program 3404, and FIG. 54 shows a data construction of each node constituting the tree. A node corresponds to each instruction making up the instruction sequence in the source program 3404, and contains an instruction type 5201, a pointer to left sub-tree 5202, and a pointer to right sub-tree 5203.

Operation of Virtual Machine Compiler

The following describes the processing of the virtual machine compiler 3400 that processes the source program 3404 that has the data construction described above.

Figure 55:
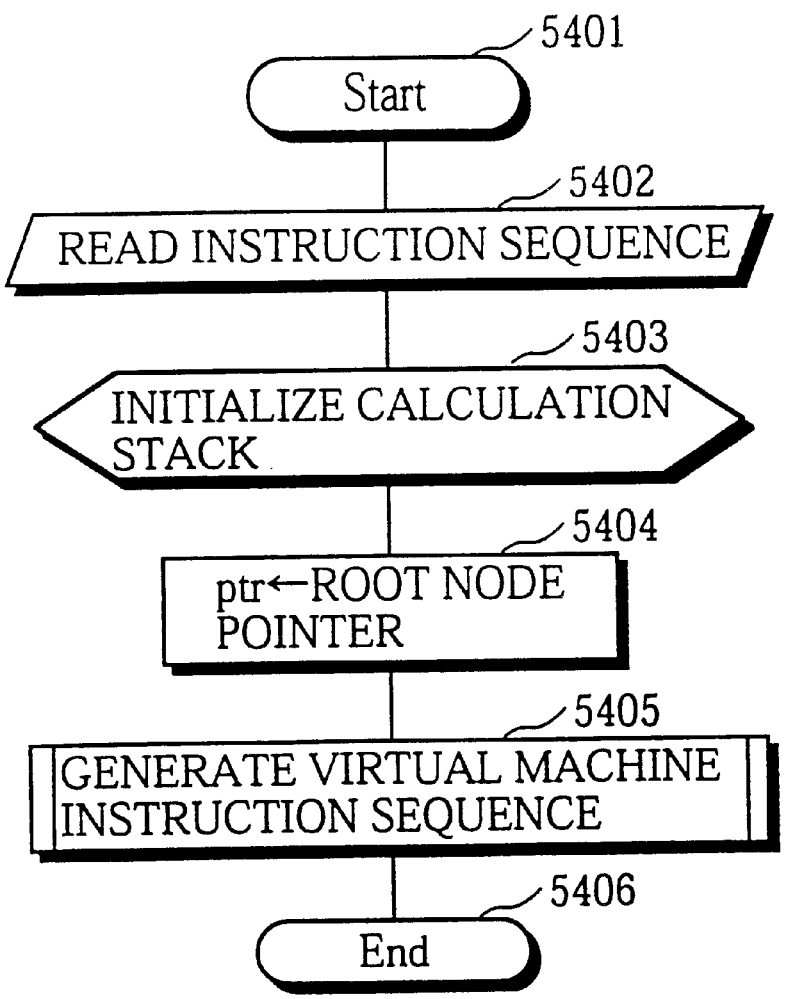
FIG. 55 is a flowchart showing a general procedure of the instruction sequence converting unit of the virtual machine compiler.

FIG. 55 is a flowchart showing the procedure of the instruction sequence converting unit 3402. The instruction sequence converting unit 3402 reads an instruction sequence of the source program 3404 represented by the tree structure (step 5402) and initializes a calculation stack used to track each branch of the tree construction (step 5403). The instruction sequence converting unit 3402 then sets a pointer to a root node in the variable ptr (step 5404), generates a virtual machine instruction sequence, i.e. virtual machine code corresponding to the instruction sequence represented in the tree construction (step 5405), and outputs it in units of bytes to the next instruction information generating unit 3401 and the relation associating unit 3403.

Figure 56:
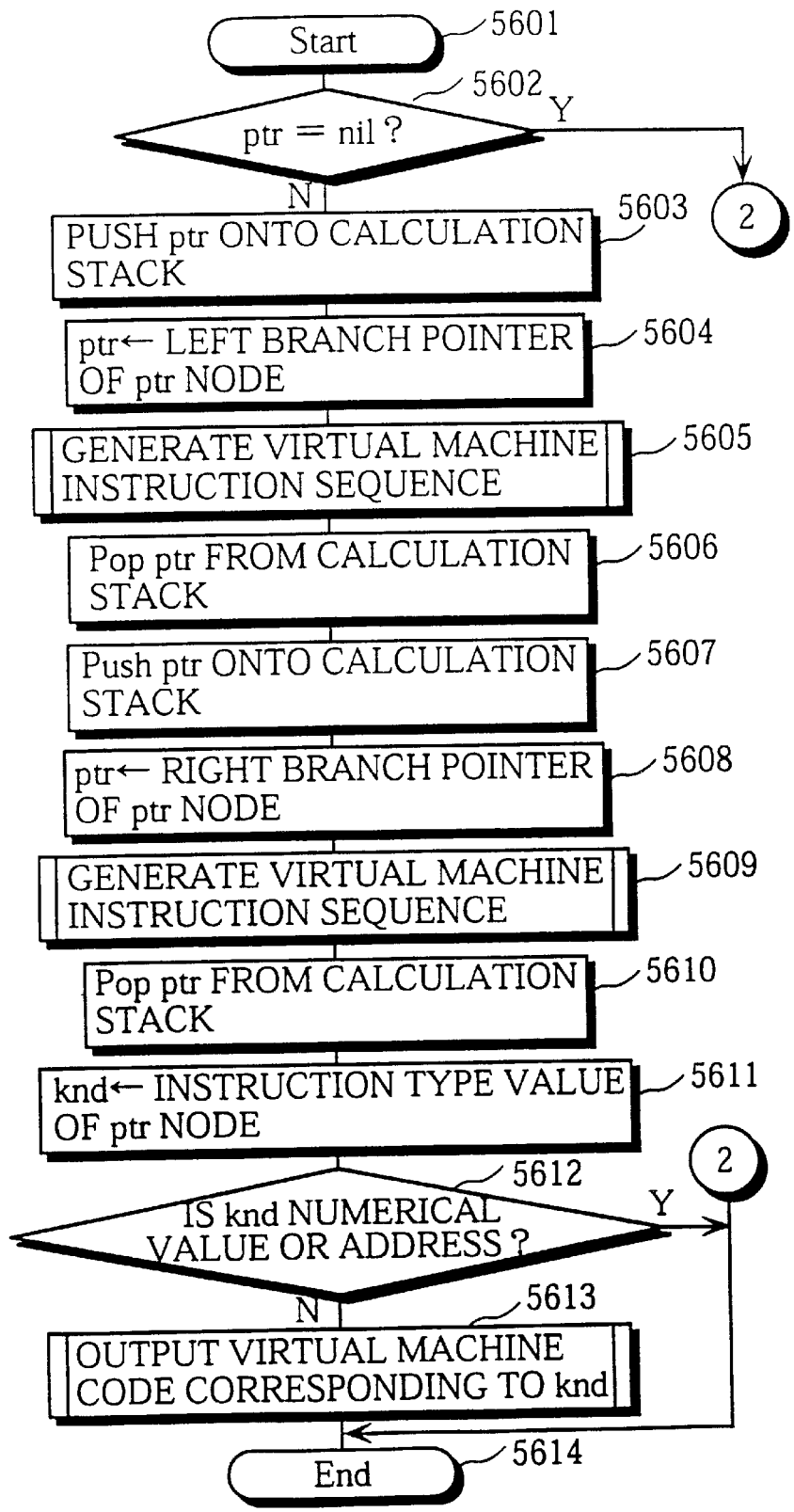
FIG. 56 is a flowchart showing the detailed processing of step 5405 in FIG. 55.
Figure 57:
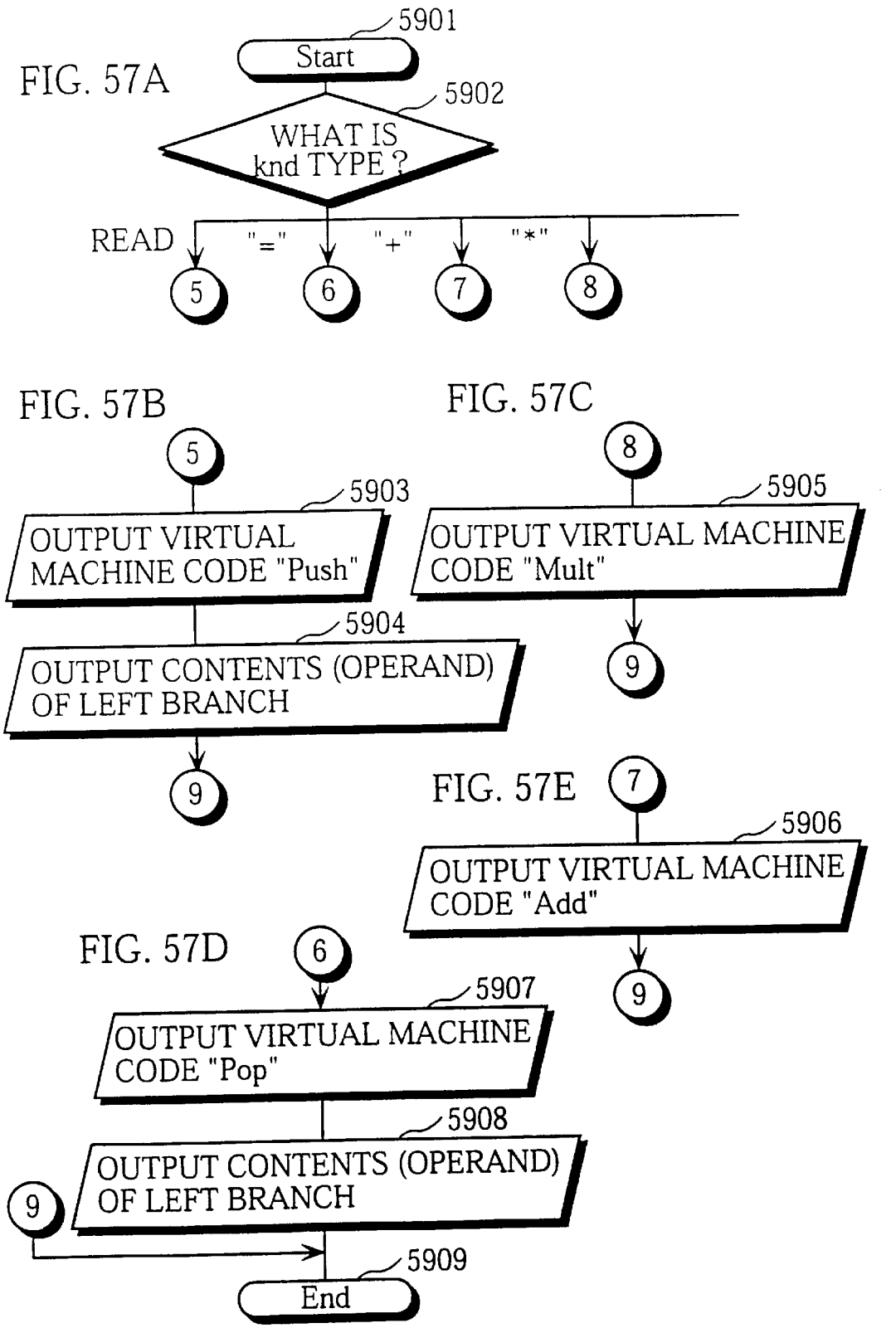
FIG. 57 is a flowchart showing the detailed processing of step 5613 in FIG. 56.

FIG. 56 shows the detailed processing of step 5405 in FIG. 55. The instruction converting unit 3402 repeats the following processing, where a node placed on the left branch is processed (steps 5603–5606) before a node on the right branch (steps 5607–5610). Numerical values and addresses included in instruction types 5201 are outputted as they are, and other codes are outputted after being converted to a corresponding virtual machine code (steps 5611–5613). Note that the processing from steps 5601–5614 is invoked on a recursive call in steps 5605 and 5609 so that this processing is repeated for all the nodes contained in the tree construction.

FIGS. 57A–57D are flowcharts showing the detailed processing of step 5613 in FIG. 56. These flowcharts correspond to the source program shown in FIG. 53. The instruction sequence converting unit 3402 generates either "Push", "Mult", "Pop", or "Add" opcode of a virtual machine instruction according to a stored value in the variable knd of each instruction type 5201 of a node (steps 5901–5909).

Figure 58:
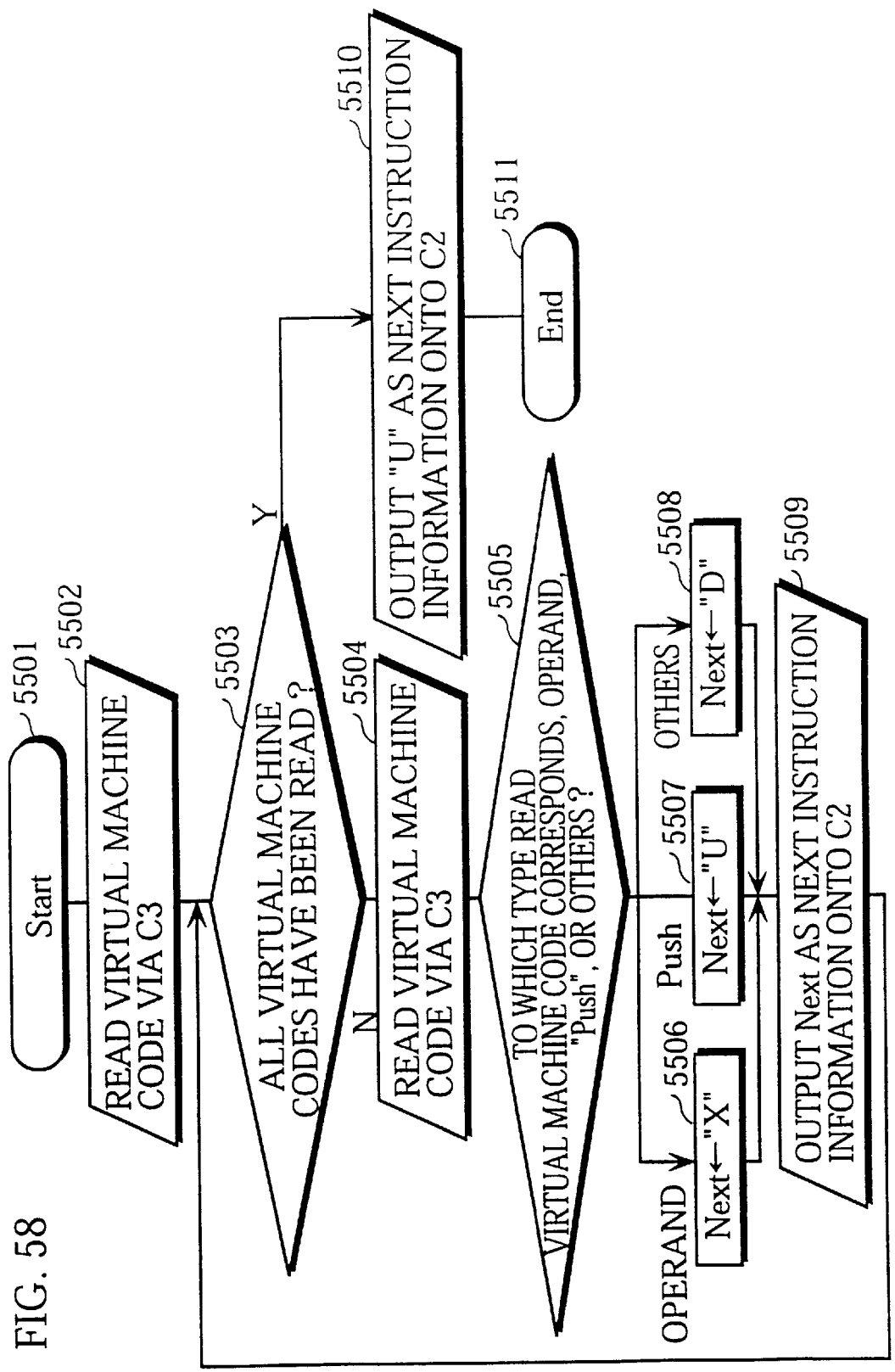
FIG. 58 is a flowchart showing the processing of the next instruction information generating unit of the virtual machine compiler.

FIG. 58 is a flowchart showing the processing of the next instruction information generating unit 3401. The next instruction information generating unit 3401 receives virtual machine codes, which are successively outputted from the instruction sequence converting unit 3402, in units of bytes (step 5502), and judges whether each virtual machine code except for the virtual machine code sent using the first one byte is an operand, "Push" opcode of a virtual machine instruction, or an other opcode. The next instruction information generating unit 3401 then specifies a set of next instruction information Next corresponding to the virtual machine code and outputs the information Next to the relation associating unit 3403 (steps 5503–5509). Here, a set of next instruction information to be output last is fixed as "U" (step 5510).

Figure 59:
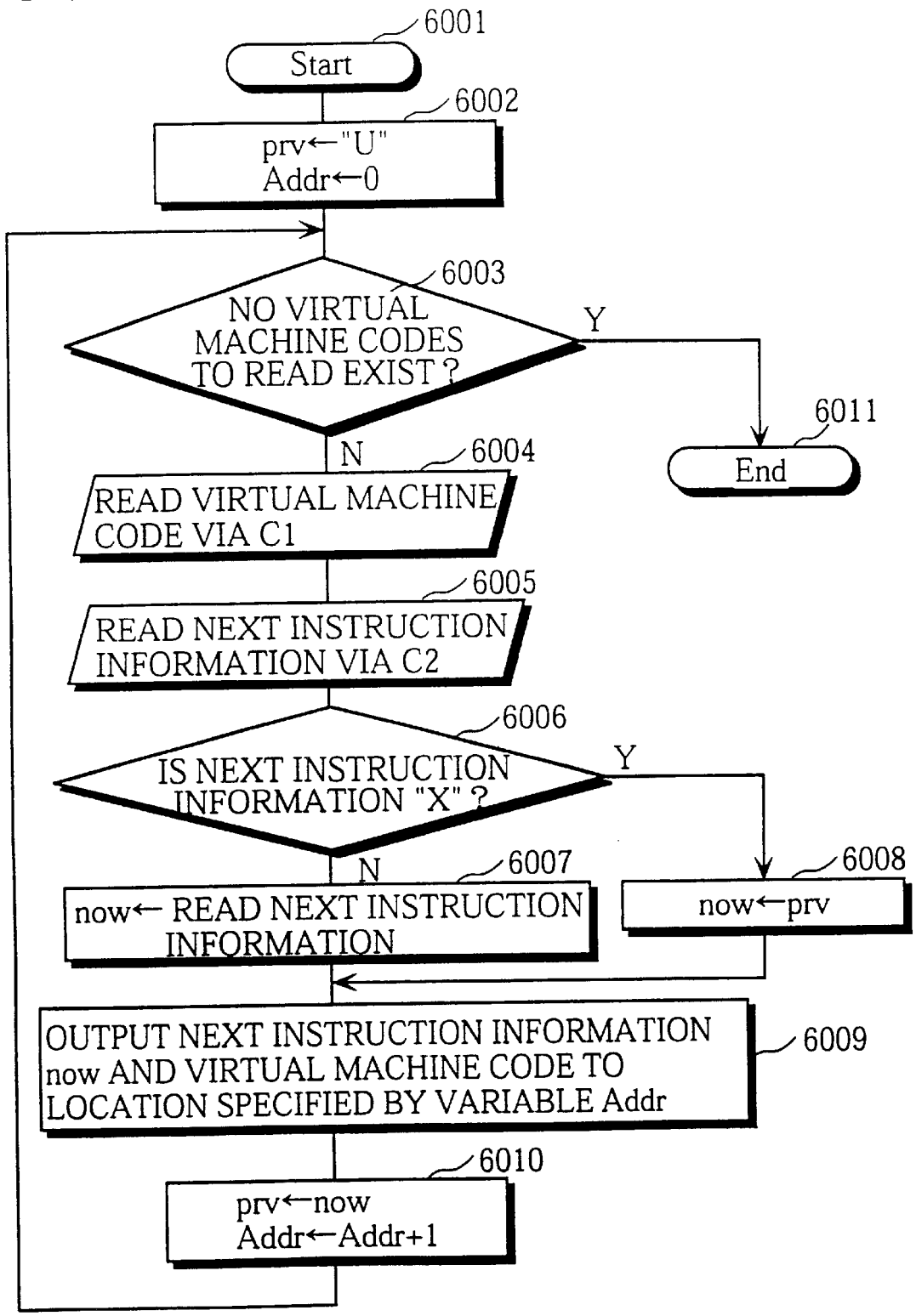
FIG. 59 is a flowchart showing the processing of the relation associating unit of the virtual machine compiler.

FIG. 59 shows the processing of the relation associating unit 3403. The relation associating unit 3403 initializes a variable prv that stores a set of next instruction information of a virtual machine instruction processed immediately before and an address Addr of a virtual machine code and associated next instruction information to be generated (step 6002). The relation associating unit 3403 then repeats the following processing (steps 6004–6010) until it judges that there are no virtual machine code to be read from the instruction sequence converting unit 3402 (step 6003).

The relation associating unit 3403 receives a 1-byte virtual machine code and the corresponding next instruction information Next from the instruction sequence converting unit 3402 and the next instruction information generating unit 3401 via the circuits C1 and C2, respectively (steps 6004 and 6005). The relation associating unit 3403 then judges whether the next instruction information Next is "X" indicating that the present next instruction information is the same as the immediately preceding information (step 6006), and determines the next instruction information now of the virtual machine code (steps 6007 and 6008). Following this, the relation associating unit 3403 outputs the determined next instruction information now and the virtual machine code as a pair to a location specified by the address Addr in a storage area, such as the memory 202, (step 6009) and prepares for the processing of the next virtual machine code (step 6010).

In this way, the virtual machine compiler 3400 of the present embodiment generates a virtual machine program used for the virtual machine 100 of the present embodiment from the source program 3404 written in high-level language. This generated virtual machine program contains a virtual machine instruction sequence and sets of next instruction information, to be respectively stored in the instruction storing unit 102 and the next instruction information storing unit 101 of the virtual machine 100 shown in FIG. 35.

Here, note that input to the virtual machine compiler 3400 of the present embodiment is not limited to a source program represented with a tree construction such as the source program 3403, but may be text written in a programming language such as C. In such a case, the instruction sequence converting unit 3402 may perform a preceding operation to convert the text to intermediate code using a tree construction or a three-operand method.

Second Embodiment

The following describes the virtual machine of the second embodiment, which execution rate is not affected by an interrupt processing.

Construction of the Virtual Machine

Figure 60:
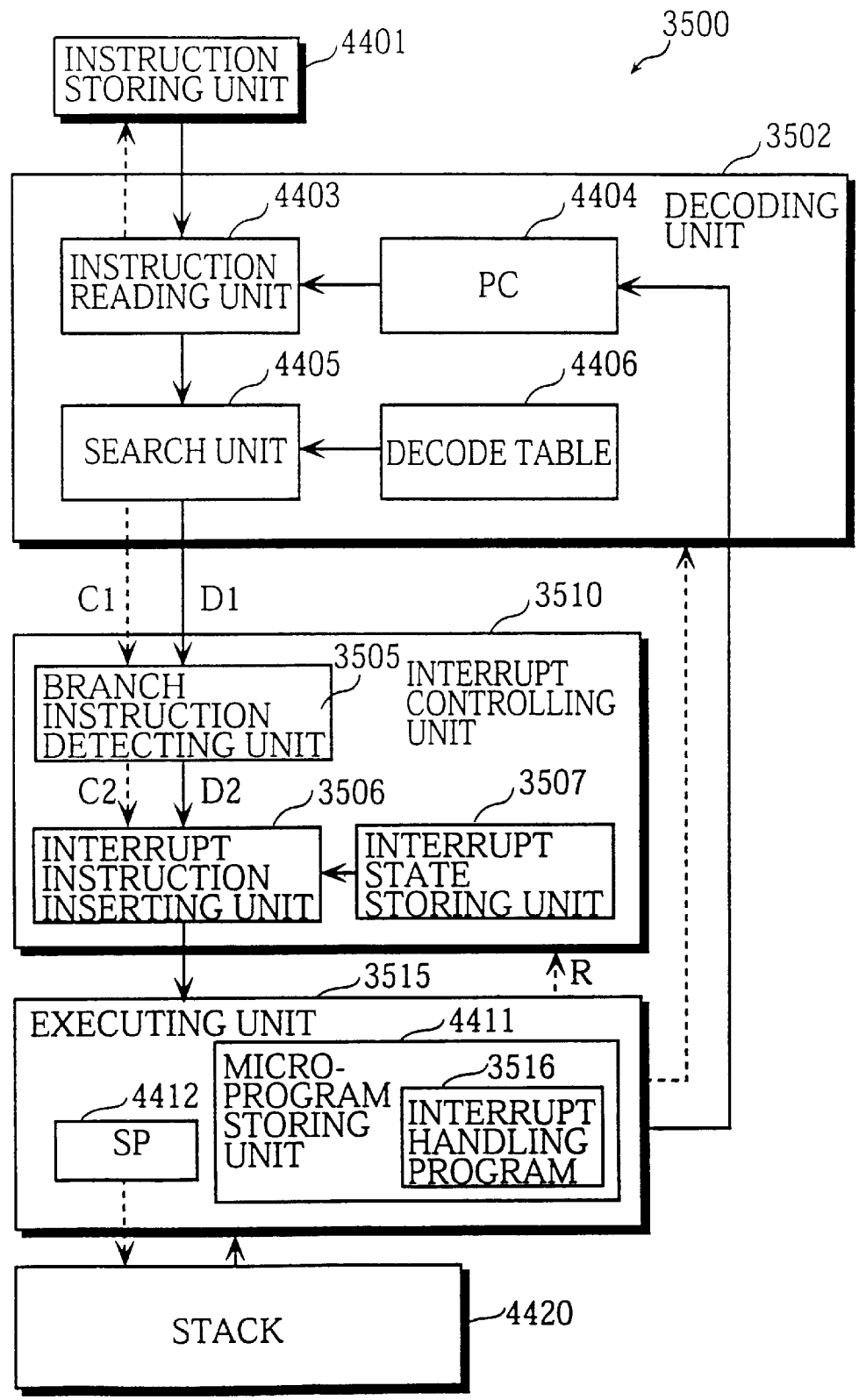
FIG. 60 is a block diagram showing the construction of the virtual machine in the second embodiment.

FIG. 60 is a block diagram showing the construction of the virtual machine 3500 of the present embodiment. This virtual machine 3500 includes an instruction storing unit 4401, a decoding unit 3502, an interrupt controlling unit 3510, an executing unit 4410, and a stack 4420.

As can be seen by comparing. FIG. 60 with FIG. 1, this virtual machine 3500 includes basically the same elements as the conventional virtual machine 4400. These elements in the two figures are assigned common numbers, and explanation of these elements will be omitted here.

The differences between the conventional virtual machine 4400 and this virtual machine 3500 are as follows. First, in addition to the elements included in the conventional machine 4400, this virtual machine 4400 includes an interrupt controlling unit 3510 for controlling and executing processing that corresponds to an interrupt request to this virtual machine 3500. Secondly, the decoding unit 3502 outputs a control signal and decoded data to the branch instruction detecting unit 3505. Finally, the microprogram storing unit 4411 of the executing unit 3515 newly stores an interrupt handling program 3516 which is a real machine program for interrupt handling. The following explanation focuses on these new aspects of the virtual machine 3500 that are not included in the conventional virtual machine 4400.

The interrupt controlling unit 3510 detects if there is an interrupt request every time the virtual machine 3500 decodes and executes a branch instruction, and controls the processing to have the executing unit 4410 perform necessary interrupt handling. The interrupt controlling unit 3510 includes a branch instruction detecting unit 3505, an interrupt instruction inserting unit 3506, and an interrupt state storing unit 3507.

The branch instruction detecting unit 3505 receives decoded data from the search unit 4405 via a signal line D1, and judges if the received decoded data is a jump address of a microprogram corresponding to one of the following branch instructions of "Br", "Brz", "Brnz", "Call", and "Ret". If so, the branch instruction detecting unit 3505 turns on the signal line C2 and outputs the decoded data to the interrupt instruction inserting unit 3506, and if not, outputs the data with the signal line C2 left off.

The interrupt state storing unit 3507 is a storage area to store a state variable ID for specifying if an interrupt request to the virtual machine 3500 exists and, if so, a type of the interrupt. This interrupt state storing unit 3507 is physically allocated to a register of the memory 202 or the network card 208, for instance.

The interrupt instruction inserting unit 3506 is notified via the signal line C2 that the branch instruction detecting unit 3505 has detected a branch instruction. The interrupt instruction inserting unit 3506 then checks if there is an interrupt request by referring to the state variable ID stored at that point in the interrupt state storing unit 3507. If there is an interrupt request, the interrupt instruction inserting unit 3506 outputs the state variable ID and the decoded data for having an interrupt handling performed which is a jump address of the interrupt handling program 3516 of the microprogram storing unit 4410. This output is performed preceding the output of another decoded data for the detected branch instruction.

The interrupt handling program 3516 is a real machine program that reads an interrupt vector stored in the address on the memory 202 based on the state variable ID outputted from the interrupt instruction inserting unit 3506, and processes a subroutine in a location indicated by the interrupt vector.

Operation of Virtual Machine

The following describes the processing of the virtual machine 3500 that has the above construction.

Figure 61:
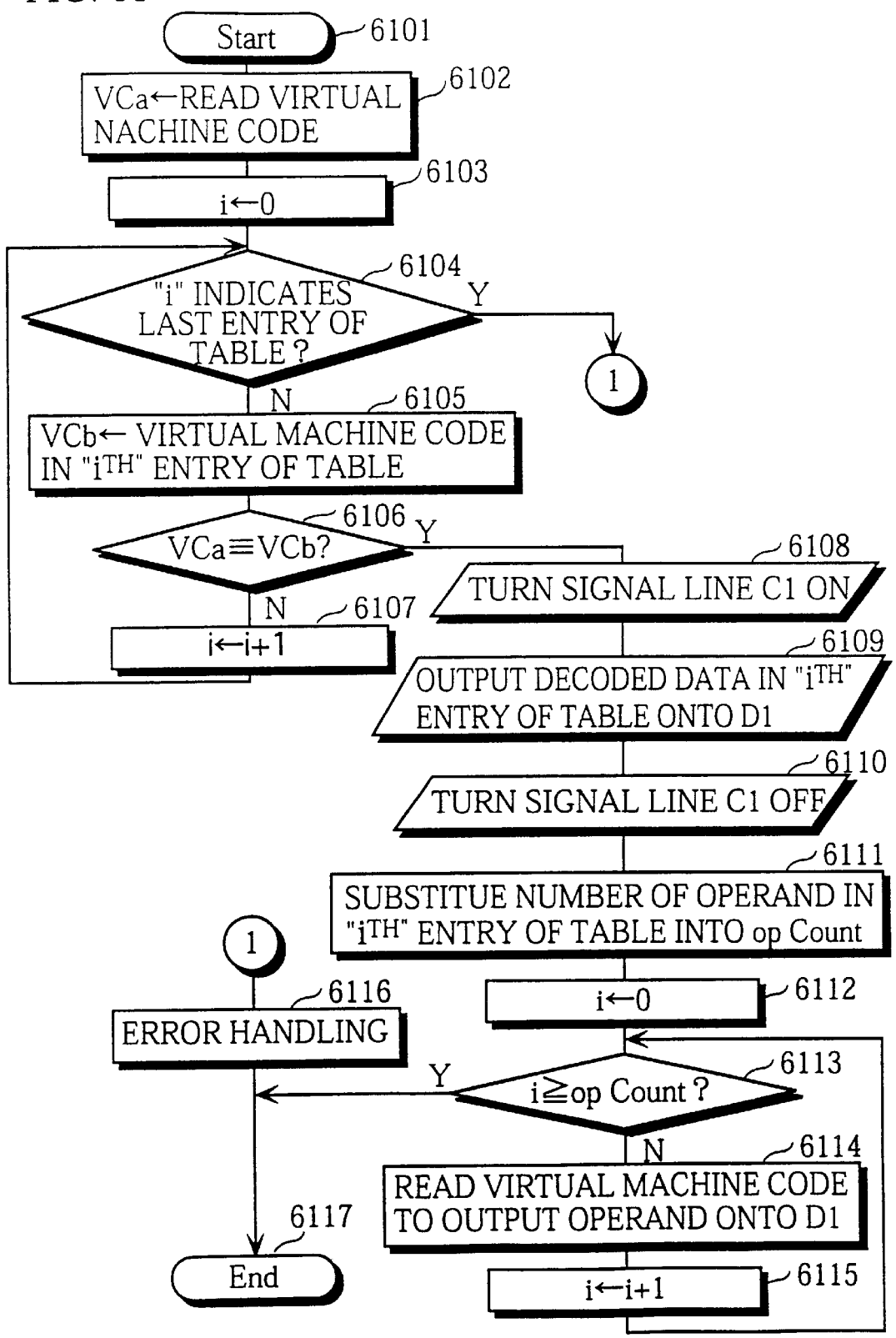
FIG. 61 is a flowchart showing the detailed processing for table search and decoded data output by the decoding unit of the virtual machine.

FIG. 61 is a flowchart showing the detailed processing for outputting decoded data and searching the table by the decoding unit 3502. This figure corresponds to FIG. 7 in the description of the prior art.

The difference between these flowcharts lies in the processing for outputting decoded data (steps 6108–6111). That is, the search unit 4405 reads a jump address corresponding to an opcode of a virtual machine instruction outputted from the instruction reading unit 4403 (step 6106), and outputs the read jump address as decoded data to the branch instruction detecting unit 3505 via a signal line D1 with a signal line C1 on (steps 6108–6110).

Figure 62:
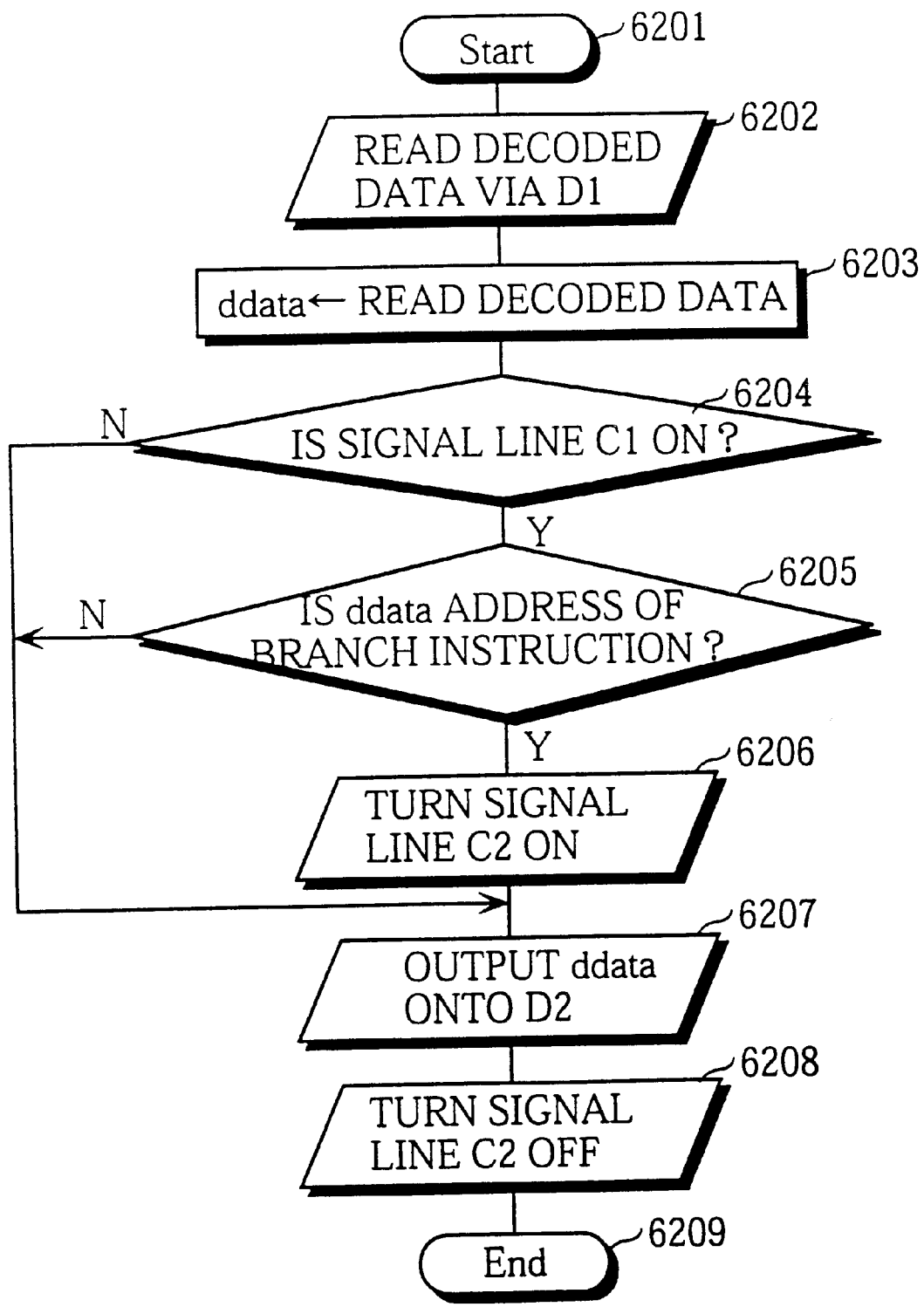
FIG. 62 is a flowchart showing the processing of the branch instruction detecting unit of the virtual machine.

FIG. 62 is a flowchart showing the processing of the branch instruction detecting unit 3505. The branch instruction detecting unit 3505 reads decoded data via a signal line D1, stores it temporarily as ddata (steps 6202–6203), and judges if the decoded data ddata is a jump address of a microprogram by referring to a state of the signal line C1 (step 6204). If so, the branch instruction detecting unit 3505 also judges if the jump address is for a microprogram corresponding to one of the branch instructions "Br", "Brz", "Brnz", "Call", and "Ret" that are stored in the branch instruction detecting unit 3505 in advance (step 6205). If so, the branch instruction detecting unit 3505 turns the signal line C2 on (step 6206) and outputs the decoded data ddata, which has been temporarily stored (steps 6206–6208). If not, the decoded data ddata is outputted with the signal line C2 turned off (steps 6207–6208).

Figure 63:
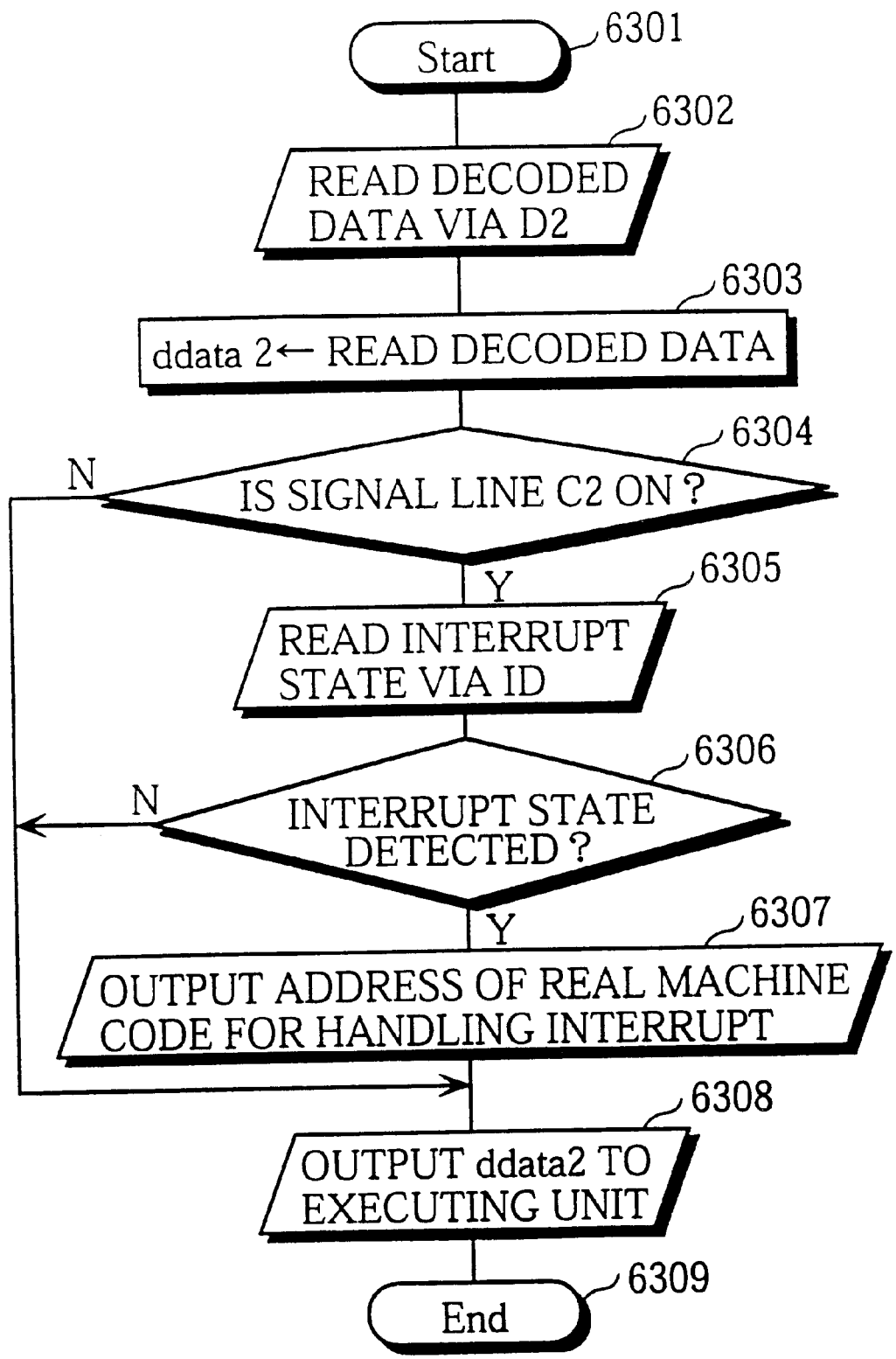
FIG. 63 is a flowchart showing the processing of the instruction inserting unit of the virtual machine.

FIG. 63 is a flowchart showing the processing of the interrupt instruction inserting unit 3506. The interrupt instruction inserting unit 3506 reads decoded data via the signal line D2, stores it as ddata2 temporarily (steps 6302–6303), and judges if the read decoded data ddata2 is a jump address of a microprogram corresponding to one of the above branch instructions referring to a state of the signal line C2 (step 6304). If so, the interrupt instruction inserting unit 3506 reads a state variable ID from the interrupt state storing unit 3507 (step 6305), and judges if an interrupt has been generated by referring to the state variable ID (step 6303). If so, the interrupt instruction inserting unit 3506 outputs the state variable ID and the jump address of the interrupt handling program 3516 to the executing unit 4410 as decoded data for having a predetermined interrupt handling performed (step 6307). Following this, the interrupt instruction inserting unit 3506 outputs other decoded data ddata2 for the branch instruction that has been temporarily stored to the executing unit 4410 (step 6308). As a result, the executing unit 3515 executes the interrupt handling program 3516 based on the state variable ID prior to the execution of the branch instruction.

On the other hand, if the interrupt instruction inserting unit 3506 judges that the decoded data inputted via the signal line D2 is not a jump address of a microprogram for a branch instruction (step 6304), or that no interrupt has been generated (step 6306), then the temporarily stored decoded data ddata2 is simply outputted to the executing unit 4410 (step 6308).

In this way, the virtual machine 3500 of the present embodiment checks whether an interrupt has occurred to the virtual machine 3500 each time it decodes and executes a branch virtual machine instruction, and if so, interrupt handling is additionally performed.

Compared with a conventional virtual machine 4400, the virtual machine 3500 of the present embodiment needs to execute one extra branch instruction for interrupt handling each time a virtual machine branch instruction is executed. As a result, the number of accesses to memory increases by one for each virtual machine branch instruction. However, in a normal machine program, an average of six non-branch instructions exist between branch instructions, so that the increased number of accesses to the memory for one instruction becomes less than 0.2. Accordingly, by using the above interrupt handling function of the present embodiment for the virtual machine 100 of the first embodiment, the number of accesses to the memory can be reduced as a whole, and a virtual machine with an interrupt handling function and improved performance speed can be achieved without overriding the effect of the TOS variable.

As has been described, the virtual machine 3500 of the present embodiment includes the interrupt controlling unit 3510 between the decoding unit 3502 and the executing unit 4410, and interrupt detection and handling are carried out only when the branch instruction detecting unit 3505 decodes and executes a virtual machine branch instruction. Accordingly, an interrupt detection is only performed at a more suitable frequency, and decreases in performance efficiency can be suppressed more than when interrupt detecting and handling are performed for every instruction execution.

Note that, for the present embodiment, a virtual machine instruction is detected by monitoring decoded data transmitted from the decoding unit 3502, although this detection may be achieved by monitoring each opcode of a virtual machine instruction inputted to the decoding unit 3502.

Instead of monitoring decoded data sent from the decoding unit 3502 to find a virtual machine branch instruction, the procedure of the interrupt instruction inserting unit 3506 may be provided to microprograms in the microprogram storing unit 4411 that correspond to branch instructions. This provides the same effect as described above to the virtual machine of the present embodiment.

Third Embodiment

The following describes a virtual machine of the third embodiment that can perform an interrupt handling while minimizing decreases in performance efficiency.

Construction of the Virtual Machine

Figure 64:
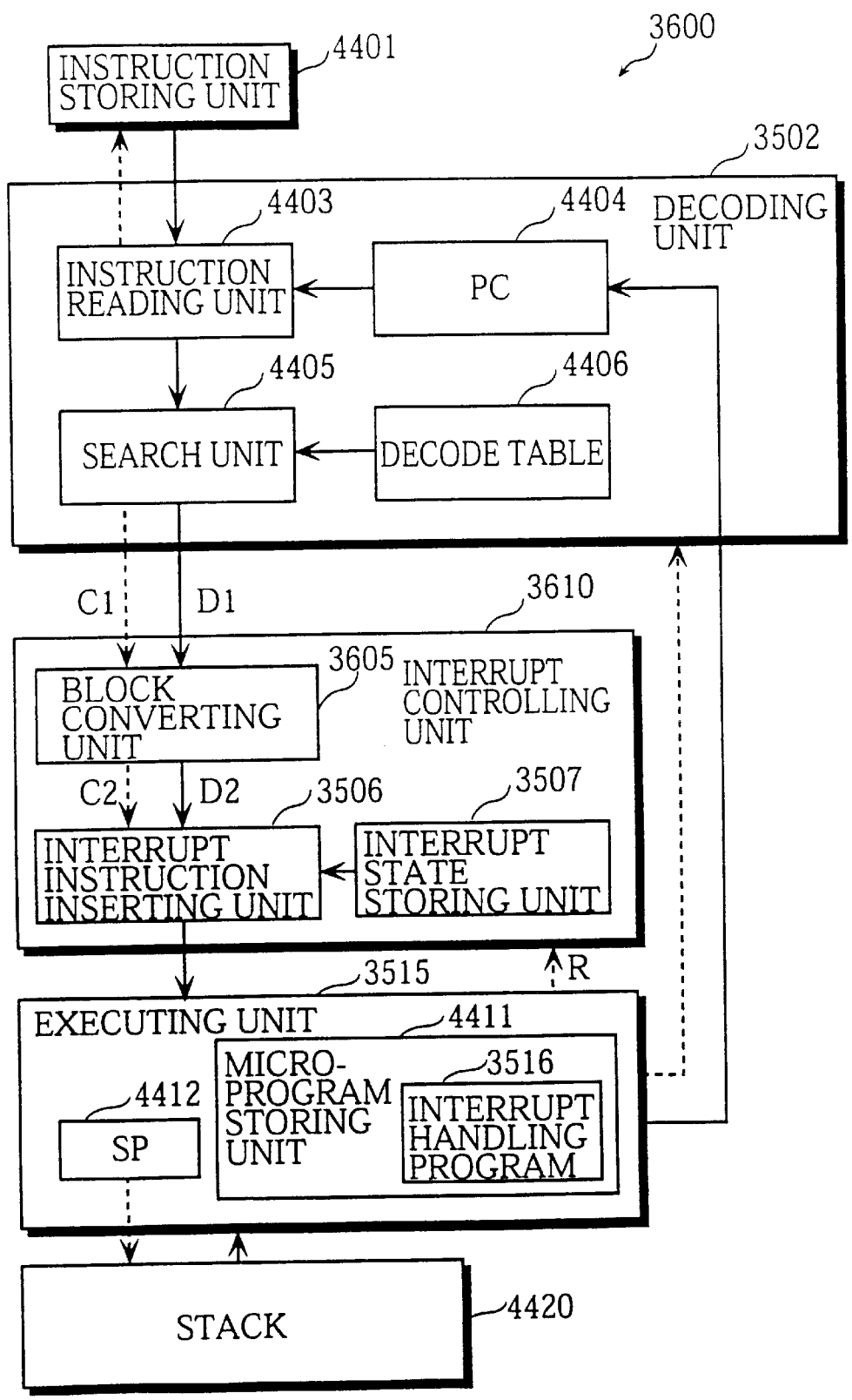
FIG. 64 is a block diagram showing the construction of the virtual machine in the third embodiment.

FIG. 64 is a block diagram showing the construction of the virtual machine 3600 of the present embodiment. This virtual machine 3600 includes an instruction storing unit 4401, a decoding unit 3502, an interrupt controlling unit 3610, an executing unit 4410, and a stack 4420.

As can be seen by comparing FIG. 64 with FIG. 60, the present virtual machine 3600 has almost the same construction as the virtual machine 3500 of the second embodiment. The differences between the two lie in a block converting unit 3605 replacing the branch instruction detecting unit 3505 of the second embodiment and in connections of the block converting unit 3605. The following explanation focuses on these differences between the present virtual machine 3600 and the virtual machine 3500 of the second embodiment. The block converting unit 3605 converts the virtual machine codes decoded by the virtual machine 3600 into blocks, which is to say, detects if a predetermined number of virtual machine codes 10 byte, for instance, have been decoded and notifies the result of the detection to the interrupt instruction inserting unit 3506.

Operation of Virtual Machine

The following describes the processing of the virtual machine 3600 that have the above construction.

Figure 65:
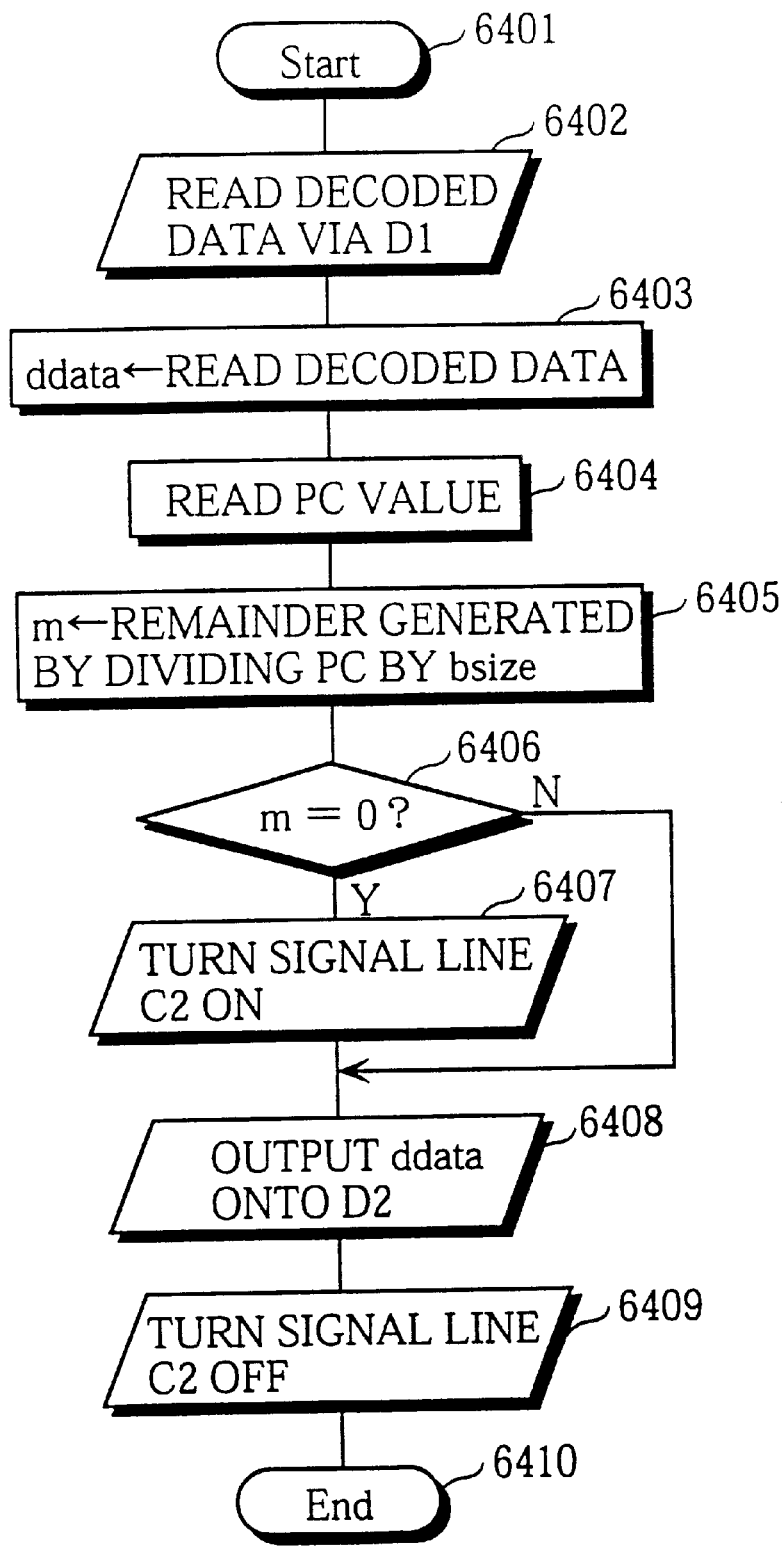
FIG. 65 is a flowchart showing the processing of the block converting unit of the virtual machine.

FIG. 65 is a flowchart showing the processing of the block converting unit 3605. The block converting unit 3605 reads a set of decoded data inputted via a signal line D1, temporarily stores it as ddata (steps 6402–6403), and reads a value of PC 4404 at that point (step 6404), or other words, checks an address of a virtual machine code corresponding to the decoded data outputted from the decoding unit 3502.

Following this, the block converting unit 3605 divides the read PC value by a stored constant bsize to generate a remainder m (step 6405), and judges if the remainder m is zero (step 6404). If so, the block converting unit 3605 turns a signal line C2 on (step 6407) and outputs the ddata that has been temporarily stored (steps 6407–6409). If judged not (step 6406), the block converting unit 3605 outputs the stored ddata with the signal line C2 being left off (steps 6407–6409).

As in the second embodiment, the interrupt instruction inserting unit 3506 only checks if an interrupt has occurred only when the signal line C2 is on. If so, the interrupt instruction inserting unit 3506 outputs another set of decoded data for an interrupt handling to the executing unit 4410, the decoded data containing a jump address of an interrupt handling program stored in the microprogram storing unit 4411 and a state variable ID.

In this way, an interrupt occurring to this virtual machine 3600 is checked every time the virtual machine 3600 has decoded a predetermined number bsize of virtual machine codes, and if an interrupt has occurred, interrupt handling is additionally performed. Accordingly, an interrupt detection is performed only once for a block of virtual machine codes whose number is specified by a constant bsize.

Accordingly, by setting a value higher than a certain value in the constant bsize and using the above interrupt handling function of the present embodiment for the virtual machine 100 of the first embodiment, the number of accesses to the memory can be reduced as a whole, and a virtual machine with an interrupt handling function and improved performance speed can be achieved without overriding the effect of the TOS variable whereby a reduced number of memory accesses can be made.

Although the block converting unit 3605 of the present virtual machine 3600 refers to the PC 4404, this reference does not increase the number of memory accesses since the PC 4404 is associated to register #2 (r2) of the real machine 201.

Also, with the present virtual machine 3600, the number of memory accesses can be flexibly controlled by changing a value of the constant bsize.

The decoding unit of the present embodiment compares the constant bsize with a value of PC 4404 corresponding to decoded data sent from the decoding unit 3502, although the constant bsize may be compared with a value of an internal counter that is provided in the decoding unit 3502 and counts a number of "on" signals on the signal line C1. In this case, an interrupt detection processing is performed for a group of virtual machine codes corresponding to not a predetermined number of bytes but a predetermined number of instructions.

With the present embodiment, the interrupt controlling unit 3610 independently performs blocking, although the blocking may be performed by the executing unit 4410 referring to the PC 4404, if the procedure of the interrupt controlling unit 3610 is additionally stored in the microprogram storing unit 4411.

Fourth Embodiment

The following describes the virtual machine of the fourth embodiment. This virtual machine is highly independent of the architecture of a real machine.

Construction of the Virtual Machine

Figure 66:
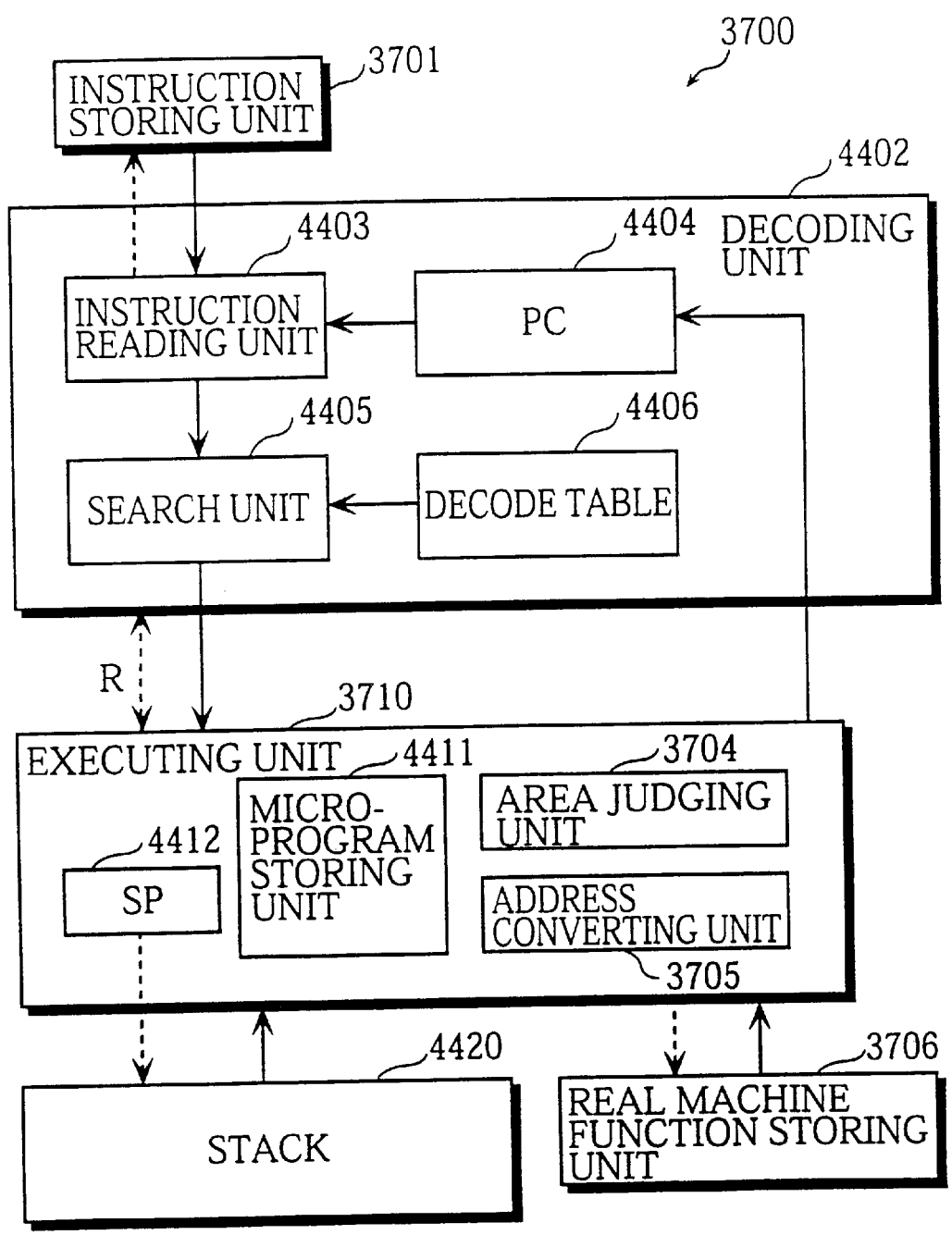
FIG. 66 is a block diagram showing the construction of the virtual machine of the fourth embodiment.

FIG. 66 is a block diagram showing the construction of the virtual machine 3700 in this fourth embodiment. This virtual machine 3700 includes an instruction storing unit 3701, a decoding unit 4402, an executing unit 3710, and a stack 4420.

Figure 1:
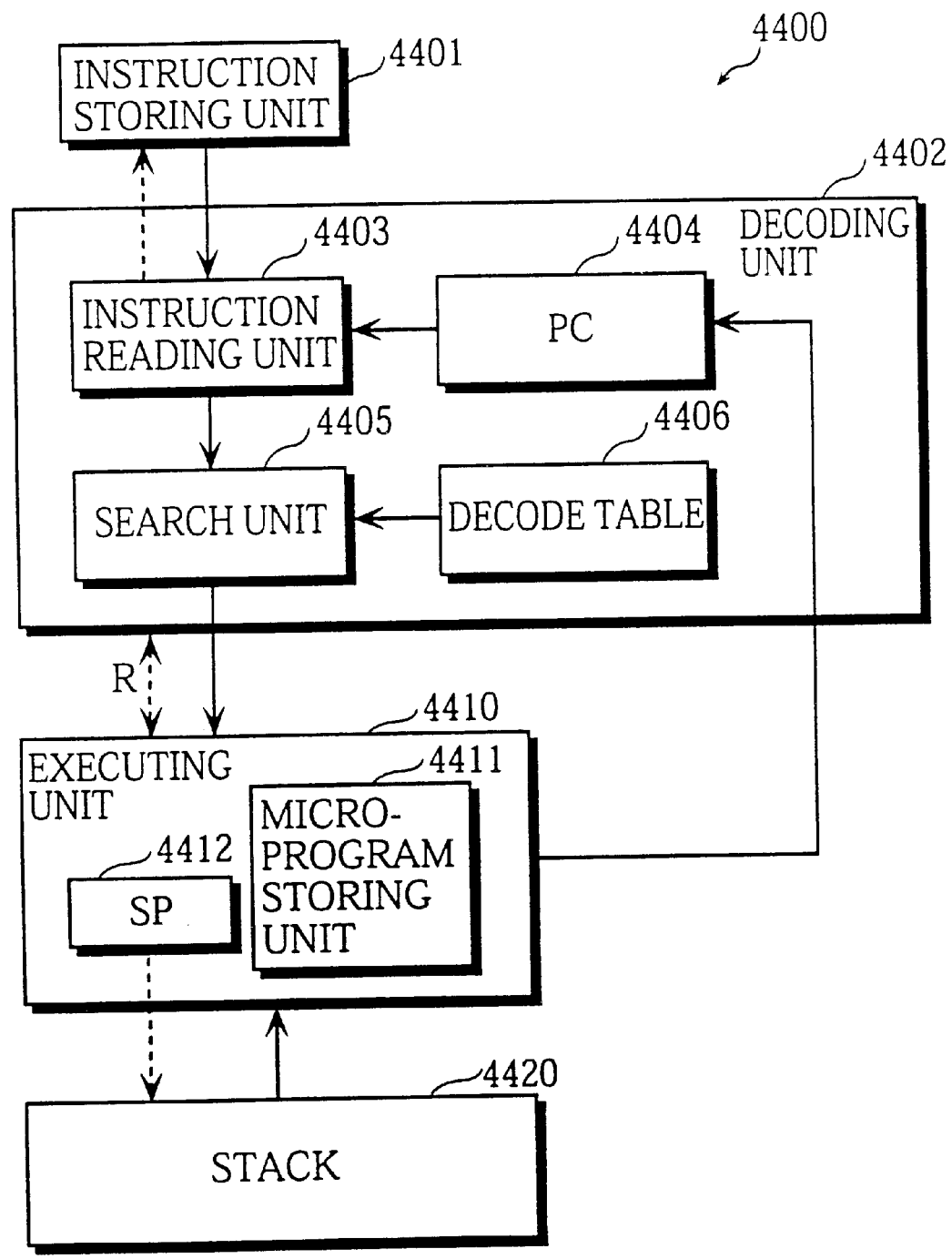
FIG. 1 is a block diagram showing a conventional virtual machine with a stack architecture.

As can be seen by comparing FIG. 66 with FIG. 1, the present virtual machine 3700 has almost the same construction as the conventional virtual machine 4400. The differences between the two lie in the content of the executing unit 3710, in the executing unit 3710 being provided with the area judging unit 3704 and the address converting unit 3705, and in the provision of the real machine function storing unit 3706. The following explanation focuses on these differences between the present virtual machine 3700 and the conventional virtual machine 4400.

The real machine function storing unit 3706 stores a set of the functions (called "real machine functions") that are included in real machine instructions beforehand. In other words, the real machine function storing unit 3706 stores a set of the functions that execute the routine processing required by virtual machine programs as an execution library. This real machine function storing unit 3706 is physically assigned to an area in the memory 202. As one specific example, a total of $(RM_{max}-RM_{min}+1)$ machine functions numbered from the $0^{th}$ to the $(RM_{max}-RM_{min})^{th}$ are stored.

The instruction storing unit 3701 stores not just the virtual machine program to be executed, but also a real machine function table beforehand. This real machine function table is a set of pointers (start addresses) for the different real machine pointers stored in the real machine function storing unit 3706.

Figures 67, 68:
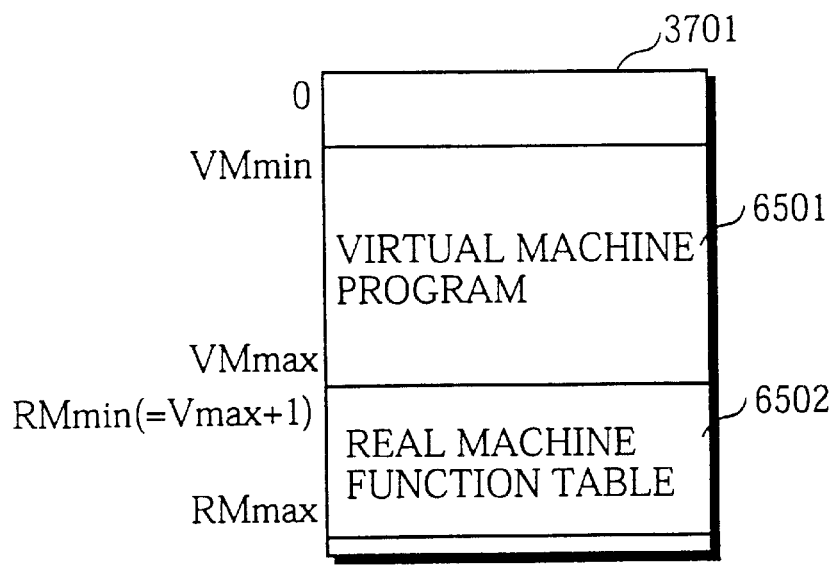
FIG. 67 shows a memory map of the instruction storing unit of the virtual machine.
FIG. 68 shows the construction of the real machine function table shown in FIG. 67.

FIG. 67 shows a memory map of the instruction storing unit 3701, which is to say how different memory areas in the instruction storing unit 3701 are used when seen from the virtual machine 3700. The area between the addresses $VM_{min}$ and $VM_{max}$ is assigned to the virtual machine program 6501, which is to say, to an area where a set of the functions given in virtual machine instructions are arranged. In the following area between the addresses $RM_{min}$ and $RM_{max}$ is assigned to an area that stores the real machine function table 6502. Note that this area of the real machine function table 6502 is located directly after the virtual machine program 6501. This means that the address $RM_{min}$ is equal to the address $VM_{max}+1$.

FIG. 68 shows the construction of the real machine function table 6502 shown in FIG. 67. In the area of the instruction storing unit 3701 with the addresses $RM_{min} \sim RM_{max}$, pointer to the real machine functions numbered $0 \sim (RM_{max}-RM_{min})$ are given. However, these pointers are stored in reverse order to the assignment of addresses. As one example, the $0^{th}$ real machine function is the function executed when the virtual machine function located at the address $RM_{max}$ is called. Similarly, the $(RM_{max}-RM_{min})^{th}$ real machine function is the function executed when the virtual machine function located at the address $RM_{min}$ is called.

The area judging unit 3704 oversees the decoded data outputted by the decoding unit 4402 and, when a function call instruction "Call" is to be executed by the executing unit 3710, judges before the function call is performed whether the called function is in the virtual machine program 6501 or in the area where the real machine function table 6502 is located.

The address converting unit 3705 operates as follows. When the area judging unit 3704 judges that the virtual instruction to be executed is a function call instruction "Call" that calls a function in the real machine function table 6502, the address converting unit 3705 directly has the real machine 201 execute a real machine function in the real machine function storing unit 3706 that is indicated by the function pointer in the real machine function table 6502 that corresponds to the call address.

Operation of Virtual Machine

The following describes the operation of the virtual machine 3700.

Figure 69:
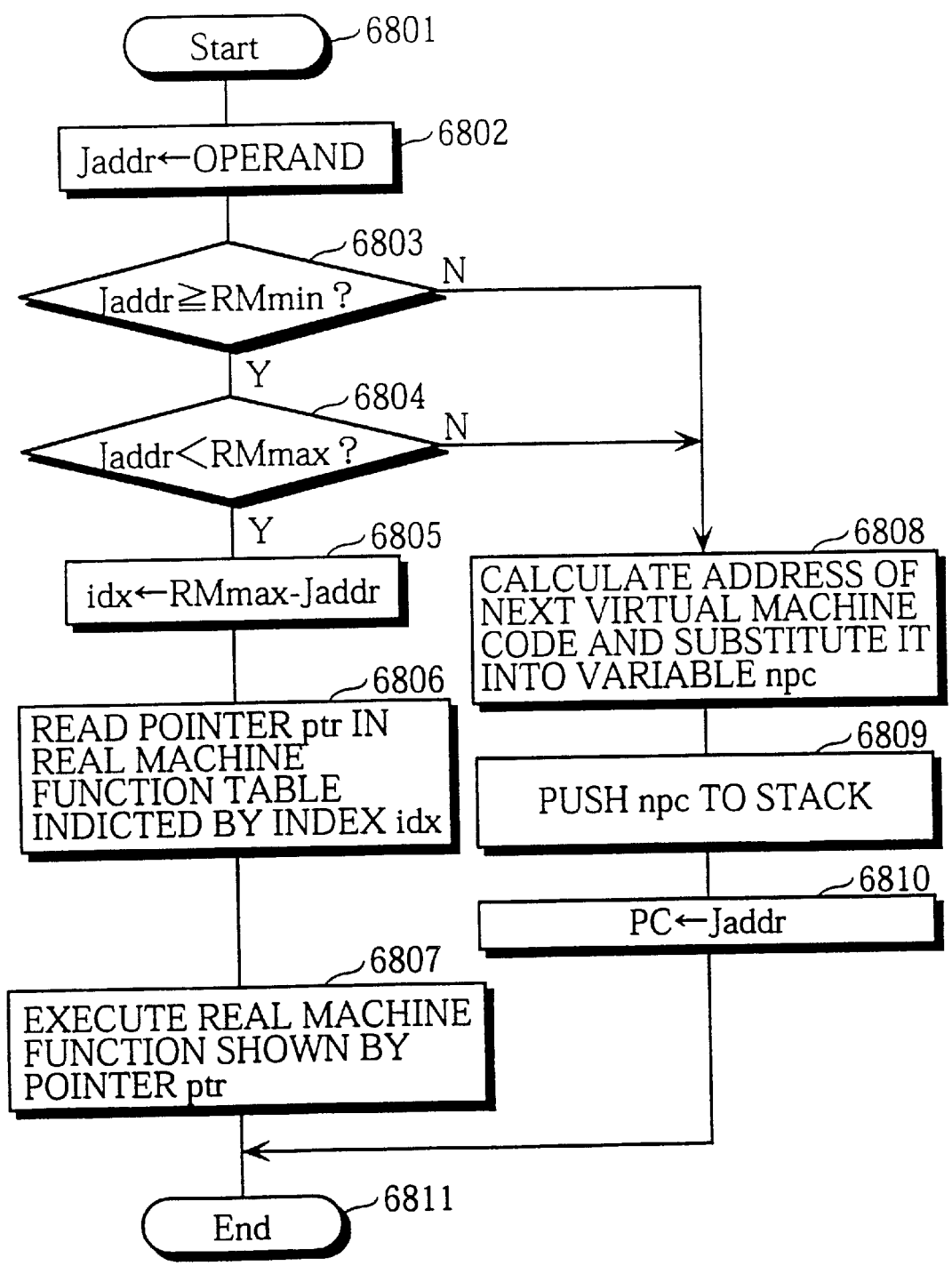
FIG. 69 is a flowchart showing the processing of the execution unit of the virtual machine.

FIG. 69 is a flowchart that shows the operation of the executing unit 3710 in the virtual machine 3700. This drawing focuses in particular on the operation of the area judging unit 3704 and the address converting unit 3705 when decoded data for a function call operation "Call" has been sent from the decoding unit 4402.

The area judging unit 3704 oversees the decoded data sent from the search unit 4405 and the state of the signal line R. On discovering that the operand of the function call instruction "Call" has been sent from the decoding unit 4402, the area judging unit 3704 judges, before the function call instruction is executed, whether the call address Jaddr indicated by the operand is within a range given as the addresses $RM_{min} \sim RM_{max}$, and by doing so judges whether the call address is located in the area that stores the real machine function table 6502 (steps 6802~6804).

When the call address Jaddr is judged as being in this area, the address converting unit 3705 calculates an index idx for the real machine function table 6502 corresponding to the call address Jaddr, based on the reverse order described above (step 6805). The address converting unit 3705 then reads the pointer ptr stored in the entry of the real machine function table 6502 indicated by the index idx (step 6806). The executing unit 3710 then directly executes the real machine function in the real machine function storing unit 3706 shown by the pointer ptr in place of the original virtual machine instruction "Call" (step 6807).

On the other hand, when the area judging unit 3704 judges that the call address Jaddr of the function call instruction "Call" is not in the same area as the real machine function table 6502, the executing unit 3710 proceeds with the execution of a standard function call (steps 6808~6810). This means that the executing unit 3710 stores the return address (steps 6808, 6809), and then executes the virtual machine function located at the call address Jaddr (step 6810).

In this way, when the call address Jaddr of the virtual machine instruction "Call" belongs to the area of the virtual machine program 6501, the virtual machine function is called as it is. However, when the call address Jaddr belongs to the real machine function table 6502, the corresponding real machine function is executed.

As can be seen from the memory map shown in FIG. 67, switches between executing a virtual machine function or a real machine function in response to a function call instruction "Call" can be easily achieved by shifting the boundary line between the areas 6501 and 6502. As one example, when the address $VM_{max}$ that marks the boundary is lowered, the address $RM_{min}$ is also lowered, so that for a function call instruction "Call" with the same call address, a switch can be made from having a virtual machine function executed to having a real machine function executed. In the same way, when the address $VM_{max}$ that marks the boundary is raised, a switch can be made from having a real machine function executed to having a virtual machine function executed.

As described above, the virtual machine 3700 of the present embodiment achieves control that calls virtual machine functions as they are or has real machine functions performed in place of virtual machine functions based on the setting of just one parameter $VM_{max}$. This means that the virtual machine 3700 has a favorable architecture for a virtual machine that is enacted on a variety of real machines and computer environments. This is because before execution a virtual machine program can be partially converted into real machine functions in keeping with a variety of real machines and computers that have different architectures. Here, the division into parts executed as virtual machine functions and into parts executed as real machine functions can be separately determined for each different architecture.

In this way, no deterioration in processing speed is observed, and a virtual machine that is highly independent of the architecture of real machines can be realized.

Figure 70:
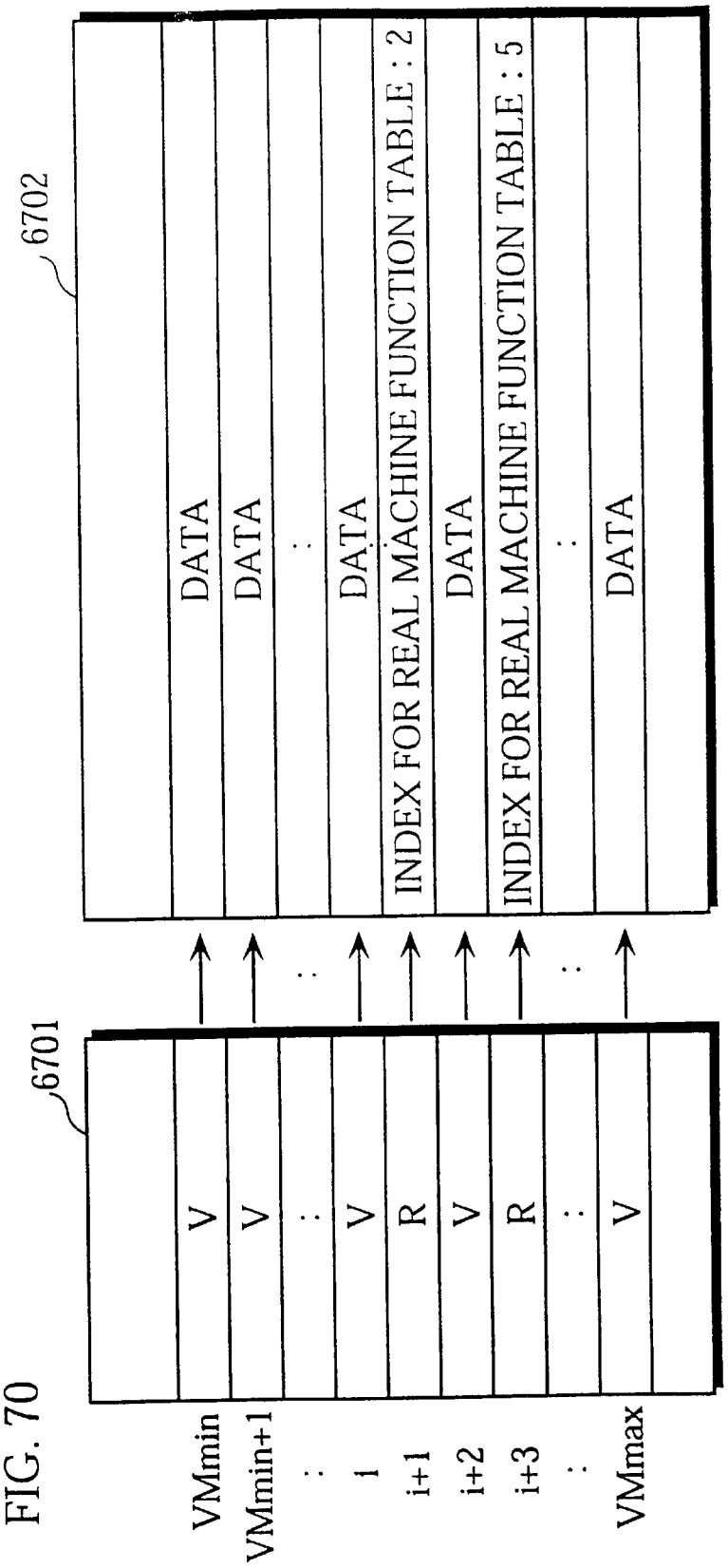
FIG. 70 shows a modification example of a memory map of the instruction storing unit of the virtual machine.

Note that while the present embodiment states that only the virtual machine program 6501 is located in the area between the addresses $VM_{min}$ and $VM_{max}$ in the instruction storing unit 3701, this is not a limitation for the present invention. As one example, FIG. 70 shows that memory attributes for each address ("V" or "R"), and, corresponding to these attributes, data (a virtual machine program) or an index for the real machine function table may be stored. By doing so, it is possible to switch between executing a virtual machine function as it is and executing a real machine function in response to virtual machine functions that call the same address, without shifting the boundary line $VM_{max}$.

Fifth Embodiment

The following describes the virtual machine system of the fifth embodiment of the present invention. This embodiment reduces the processing load for converting virtual machine programs into cache blocks and the time required by a JIT compiler to compile the virtual machine program.

Construction of Virtual Machine

Figure 71:
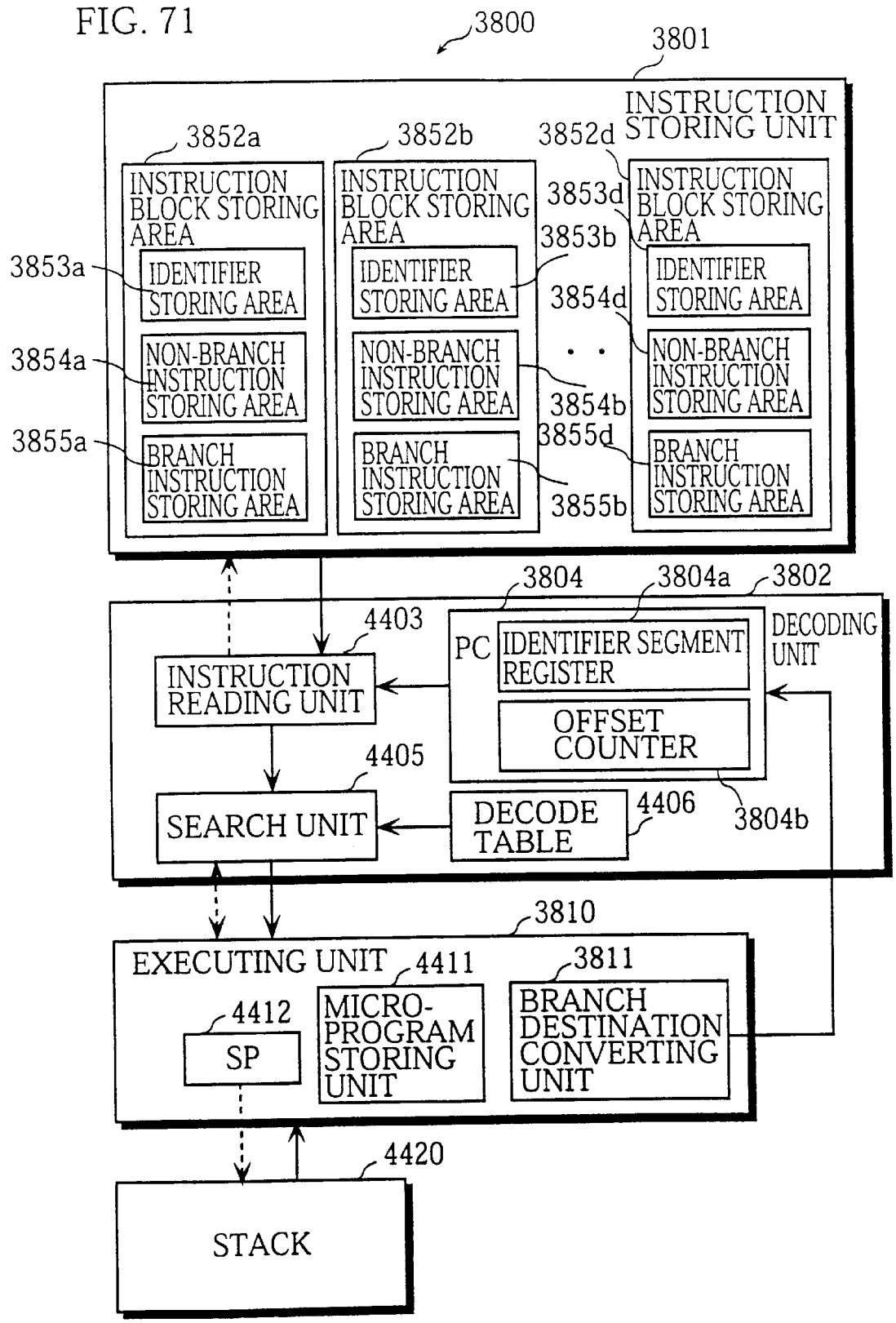
FIG. 71 is a block diagram showing the construction of the virtual machine in the fifth embodiment.

FIG. 71 is a block diagram showing the construction of the virtual machine 3800 in this fifth embodiment. This virtual machine 3800 includes an instruction storing unit 3801, a decoding unit 3802, an executing unit 3810, and a stack 4420.

As can be seen by comparing FIG. 71 with FIG. 1, the present virtual machine 3800 has almost the same construction as the conventional virtual machine 4400. The differences between the two lie in the content of the executing unit 3810, in the construction of the PC 3804, and in the branch destination converting unit 3811 being added to the executing unit 3810. The following explanation focuses on these differences between the present virtual machine 3800 and the conventional virtual machine 4400.

The instruction storing unit 3801 stores the virtual machine program to be executed split into units called instruction blocks. The instruction storing unit 3801 is composed of a plurality of instruction block storing areas 3852a~3852d that each store an instruction block.

In this embodiment, an instruction block refers to a basic block in the virtual machine program to which a unique identifier has been assigned and to which a branch instruction for continuing the logical flow of the virtual machine program has been appended. These instruction blocks are created by a special compiler for the virtual machine 3800 that is described later in this embodiment. Note that a basic block is an instruction sequence that starts with an instruction that is the sole entry point into the basic block and ends with an instruction that is the sole exit point from the basic block. In this embodiment, the identifier of an instruction block is composed of address information that specifies the start of the instruction block in an instruction block storing area.

The instruction block storing areas 3852a~3852d each include an identifier storing area 3853a, a non-branch instruction storing area 3854a~3854d that stores instructions, out of the virtual machine instructions that belong to the corresponding instruction block, that are not branch instructions (such instructions hereafter being called "non-branch instructions"), and a branch instruction storing area 3855a~3855d that stores only the branch instructions in the corresponding instruction block.

Figure 72:
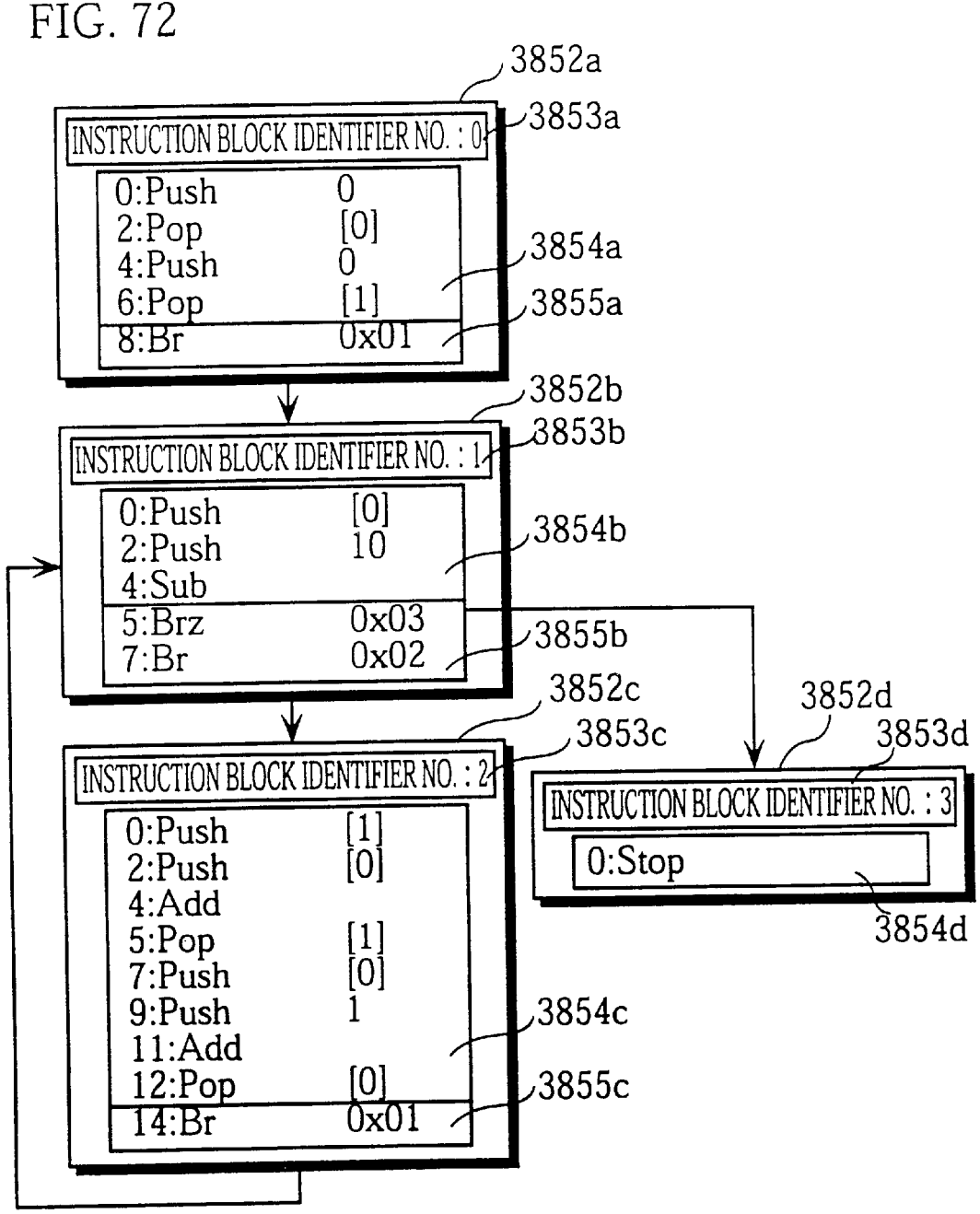
FIG. 72 shows an example of states of virtual machine programs stored in the instruction storing unit of the virtual machine.

FIG. 72 shows an example of the stored state of a virtual machine program that has been stored in the instruction storing unit 3801. This shows the case when the sample virtual machine program shown in FIG. 27 is stored.

As shown in FIG. 72, the virtual machine program is divided into four instruction blocks 3852a~3852d. These instruction blocks 3852a~3852d are composed of the instruction block identifiers 3853a~3853d, the non-branch parts 3854a~3854d that include all parts of the instruction block aside from the branch instructions, and the branch parts 3855a~3855d that include the branch instructions located at the end of basic blocks and the branch instructions used for linking instruction blocks to the following basic block.

Figure 73:
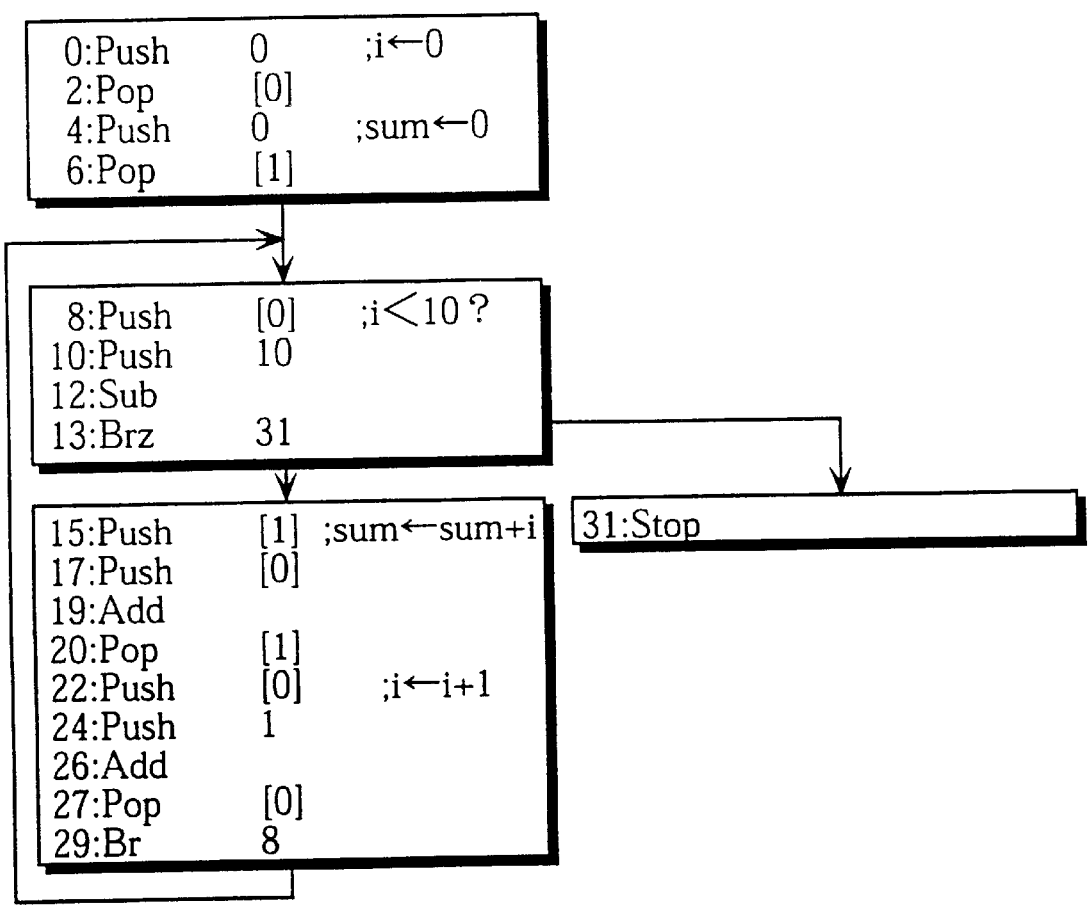
FIG. 73 shows a control flow of the virtual machine programs shown in FIG. 72.

Note that the virtual machine programs shown in FIG. 72 and in FIG. 27 have the control flow shown in FIG. 73 and so have effectively the same processing content. This should be clear from the meanings of the virtual machine instructions shown in FIG. 2.

PC 3804 includes the identifier segment register 3804a and the offset counter 3804b. The identifier segment register 3804a stores a segment address that is equivalent to the identifier of the instruction block that includes the virtual machine code in the instruction storing unit 3801 which should be read next. This segment address is hereafter called the "identifier segment". The offset counter 3804b stores an offset for the instruction block including that virtual machine code.

Figure 74:
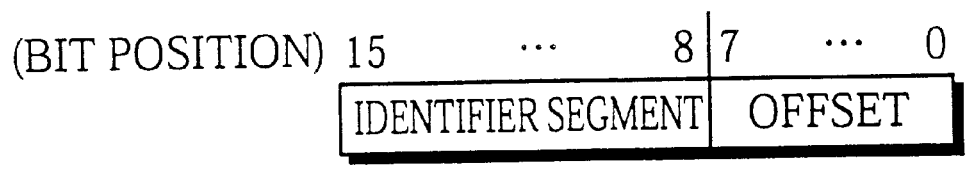
FIG. 74 shows a data format obtained by the addressing by the PC of the virtual machine.

Note that the present virtual machine 3800 performs 16-bit addressing, as shown in FIG. 74, with the upper 8 bits being the identifier segment and the lower 8 bits being the offset. This is to say, an 8-bit identifier segment is stored in the identifier segment register 3804a and an 8-bit offset is stored in the offset counter 3804b. The 16-bit address given by linking these together specifies one virtual machine code in the instruction storing unit 3801.

The branch destination converting unit 3811 operates as follows. When a branch instruction is executed by the executing unit 3810, the branch destination converting unit 3811 updates the instruction block identifier that is the branch destination using the combination of the identifier segment and offset, and stores the converted result in the PC 3804.

Operation of Virtual Machine

The following describes the operation of the virtual machine 3800.

The decoding unit 3802 and the executing unit 3810 operate in almost the same way as the corresponding components in the conventional virtual machine 4400. The differences between the two are that during normal operation, only the offset counter 3804b of the PC 3804 is updated by the executing unit 3810, and that when a branch is executed, the identifier segment register 3804a and the offset counter 3804b of the PC 3804 are updated by the branch destination converting unit 3811.

Figure 75:
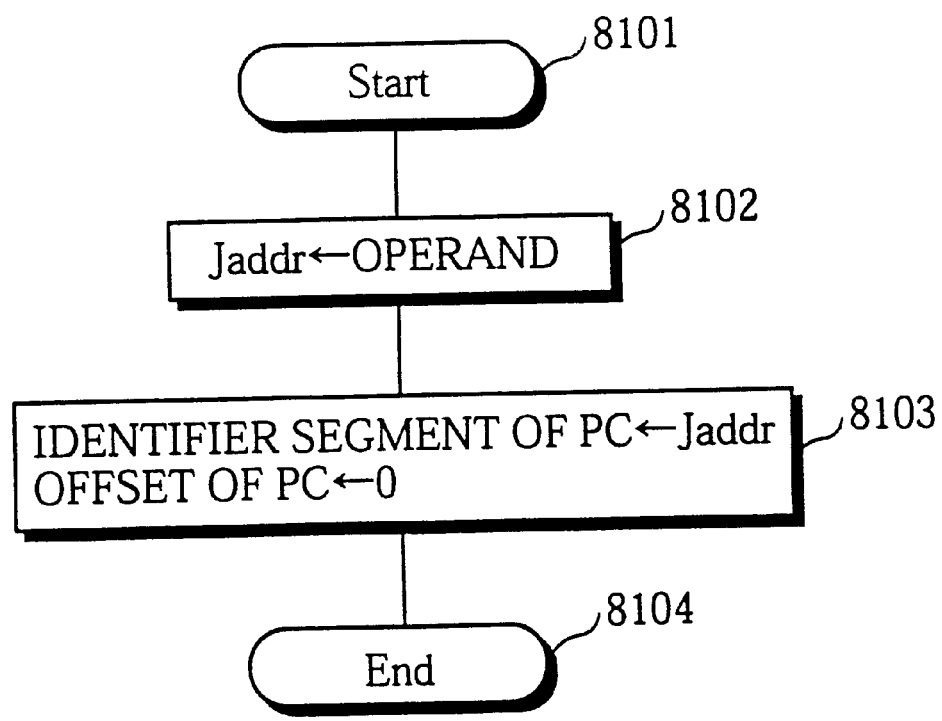
FIG. 75 is a flowchart showing the processing of the branch destination converting unit of the executing unit of the virtual machine.

FIG. 75 is a flowchart showing the operation of the branch destination converting unit 3811 in the executing unit 3810. This branch destination converting unit 3811 first obtains the operand of a branch instruction, which is to say the 8-bit instruction block identifier Jaddr, from the decoding unit 3802 (step 8102). The branch destination converting unit 3811 sets this as the identifier segment of the branch destination, sets the offset as zero, and generates a 16-bit physical address which it uses to update the identifier segment register 3804a and the offset counter 3804b of the PC 3804 (step 8103).

Figure 76:
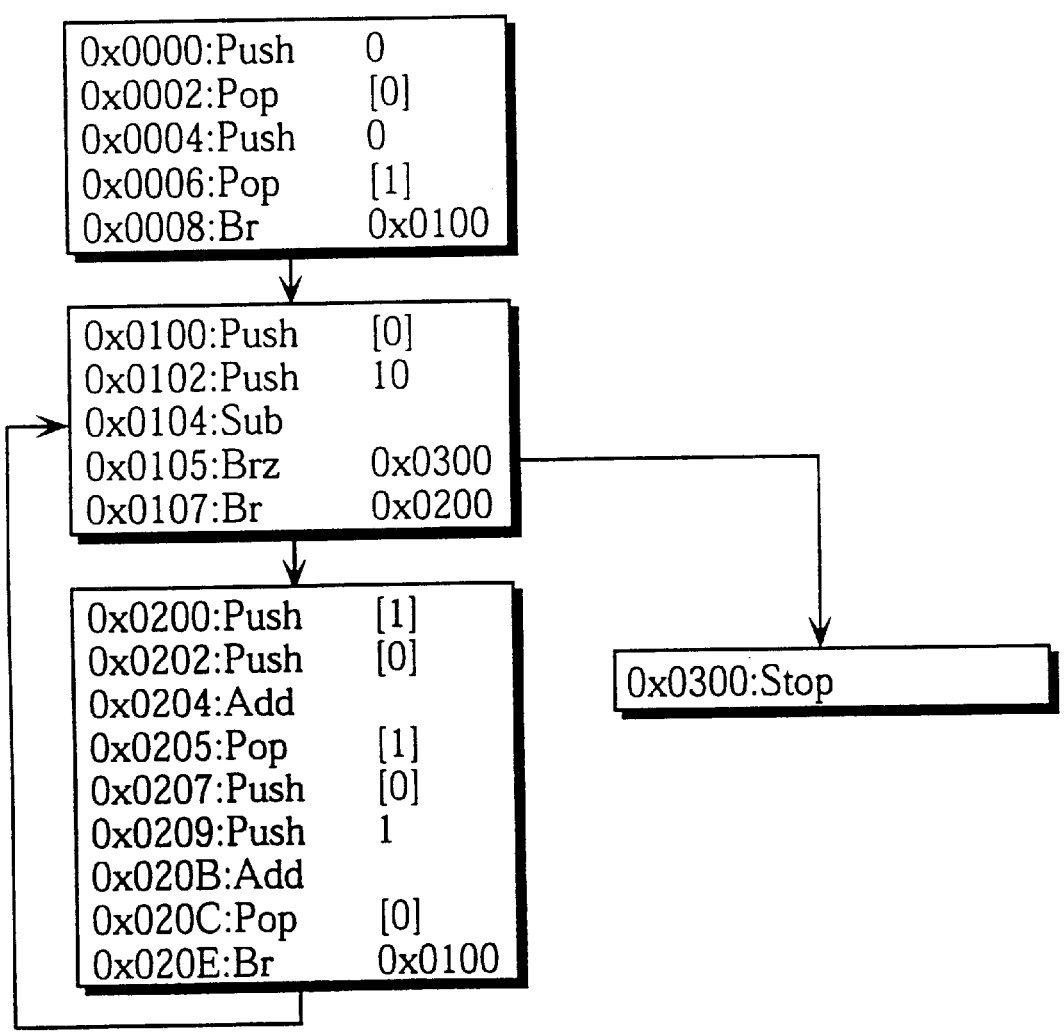
FIG. 76 shows the address conversion by the branch destination converting unit, where logical addresses and identifiers in the virtual machine program shown in FIG. 72 are replaced with physical addresses.

FIG. 76 shows this address conversion by the branch destination converting unit 3811, where a logical address and identifier in the virtual machine program shown in FIG. 72 are replaced with a physical address. As one example, the operand "x03" of the branch instruction "Brz" in the instruction block with the identifier number 1 in FIG. 72 is converted by the branch destination converting unit 3811 into the physical address "x0300" at the start of the instruction block with the identifier number 3.

In this way, whenever the executing unit 3810 executes a branch instruction, the executing unit 3810 performs control so that processing branches to the start of the instruction block indicated by the operand of the branch instruction. By doing so, the virtual machine 3800 decodes and executes virtual machine programs that have been stored divided into instruction blocks using effectively the same procedure that is used for programs that are not divided into instruction blocks.

Construction of the Virtual Machine Compiler

The following describes a virtual machine compiler for the virtual machine 3800.

Figure 77:
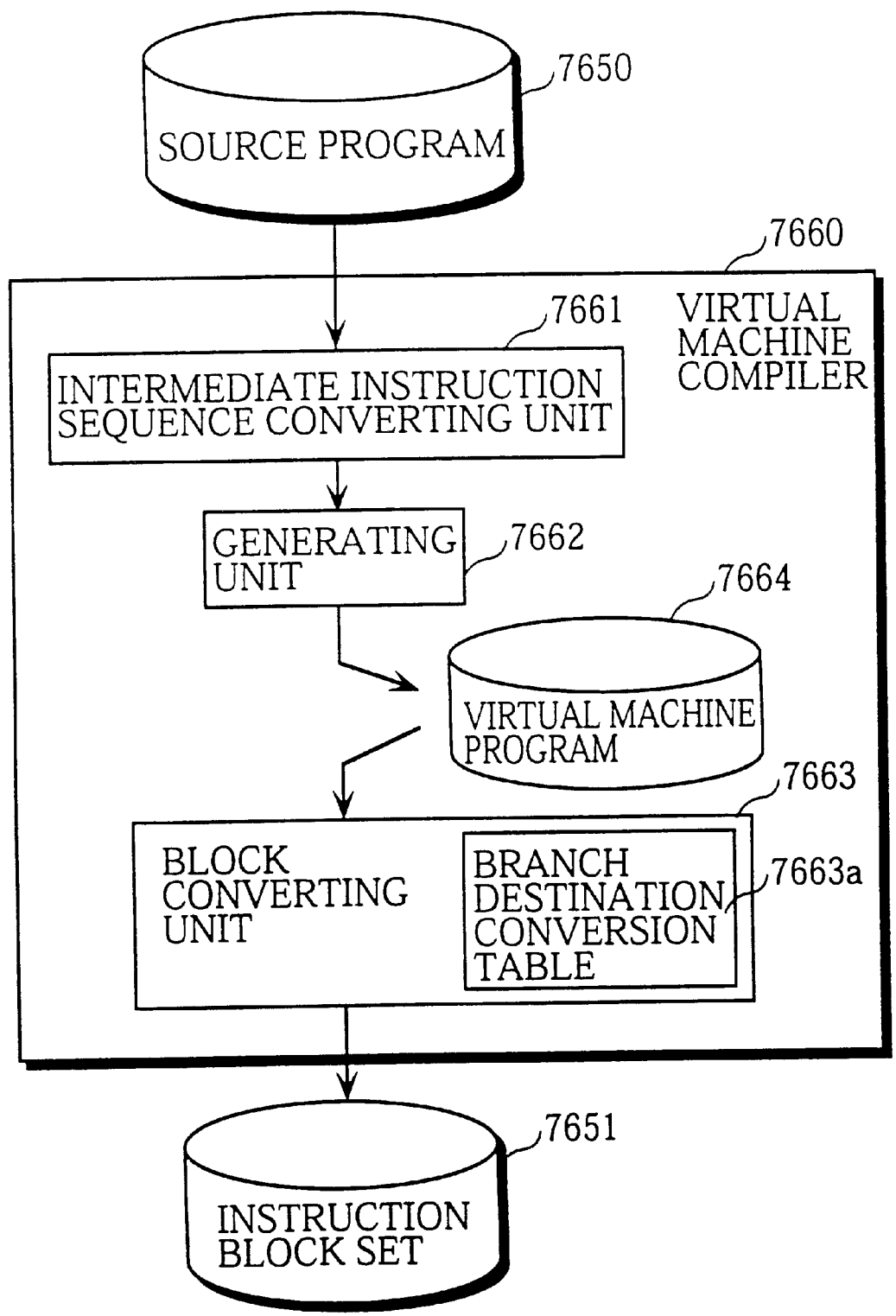
FIG. 77 is a block diagram showing the virtual machine compiler in the fifth embodiment.

FIG. 77 is a block diagram showing the construction of the virtual machine compiler 7660 in this fifth embodiment. This virtual machine compiler 7660 receives an input of a source program 7650 that is written in a high-level language such as C, and converts the source program 7650 into a suitable form for storage into the instruction storing unit 3801 of the virtual machine 3800, this suitable form being the instruction block set 7651. The virtual machine compiler 7660 includes an intermediate instruction sequence converting unit 7661, a generating unit 7662, and a block converting unit 7663.

The intermediate instruction sequence converting unit 7661 performs syntactic analysis on an inputted source program and develops temporary intermediate code that is used for optimization. The generating unit 7662 converts the intermediate code developed by the intermediate instruction sequence converting unit 7661 into the code of a virtual machine program 7664, such as that shown in FIG. 27. This intermediate instruction sequence converting unit 7661 and generating unit 7662 have the same functions as the equivalent components in a standard conventional virtual (or real) machine compiler.

The block converting unit 7663 converts the virtual machine program generated by the generating unit 7662 into a set of instruction blocks that can be stored in the instruction storing unit 3801. When doing so, the main processes are the division into basic blocks and the setting of addresses in accordance with the division. This setting of addresses is a process whereby the branch destinations used by branch instructions in the virtual machine program 7664 are replaced with instruction block identifiers ID.

Next, the block converting unit 7663 generates and uses a branch address conversion table 7663a as a temporary variable table for setting the addresses. The construction of the branch address conversion table 7663a is shown in FIG. 78.

Each row (entry) in the branch address conversion table 7663a is generated corresponding to either a different branch instruction in the virtual machine program 7664 that is inputted into the block converting unit 7663 or one of the generated instruction blocks. In each entry:

"code position" shows the first address in the instruction block or an address of the branch instruction in the virtual machine program 7664.

"registration flag" is a flag showing whether the address setting has been completed for the branch instruction.

"reference position identifier" and "reference position offset" show the instruction block identifier and offset where the branch instruction is located or where the branch instruction that branches to the instruction block is located.

Operation of the Virtual Machine Compiler

Figure 79:
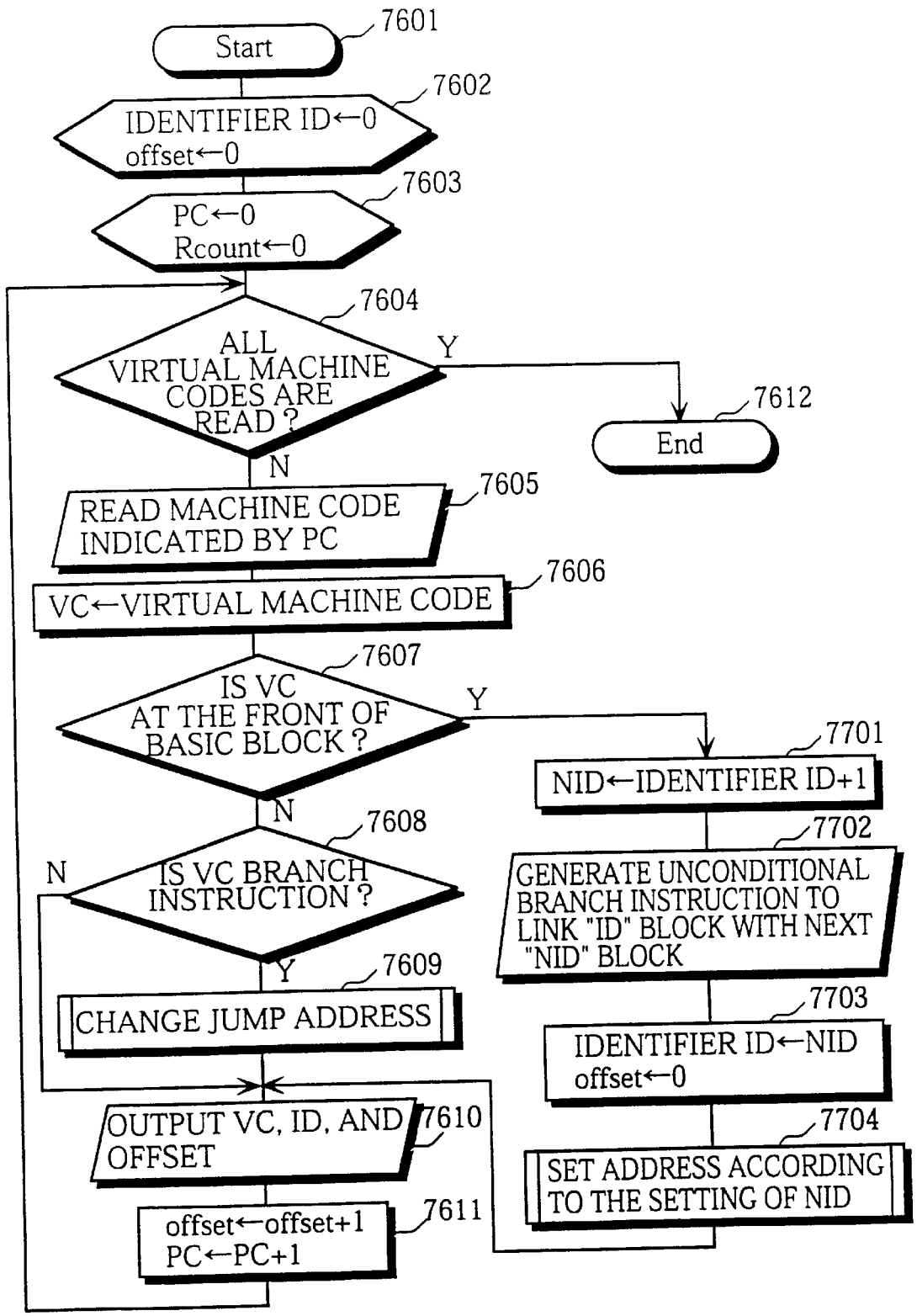
FIG. 79 is a flowchart showing the processing of the block converting unit of the virtual machine compiler.

FIG. 79 is a flowchart showing the characteristic operation of the virtual machine compiler 7660, which is to say the operation of the block converting unit 7663. First, the block converting unit 7663 resets the instruction block identifier ID of the instruction block generated as part of the instruction block set 7651, the pointer offset that shows the relative instruction storage position in the instruction block, the counter PC that shows the position of a one-byte virtual machine code VC that has been read in order from the virtual machine program 7664, and the counter Rcount that shows the number of branch destinations whose branch addresses need to be updated (steps 7602~7603).

As its fundamental operation, the block converting unit 7663 reads the virtual machine codes VC one byte at a time from the virtual machine program 7664 while updating the counter PC. The block converting unit 7663 outputs a read virtual machine code VC together with the identifier ID of the instruction block to which the virtual machine code VC should belong and the pointer offset that is a relative position in this instruction blocks as one element in the instruction block set 7651 (steps 7604~7611).

When doing so, the block converting unit 7663 judges whether the virtual machine code VC is located at the start of a basic block (step 7607), and judges whether the virtual machine code VC is a branch instruction (step 7608). If either of these judgments is affirmative, the block converting unit 7663 executes a special procedure (steps 7701~7704 or step 7609).

Figure 80:
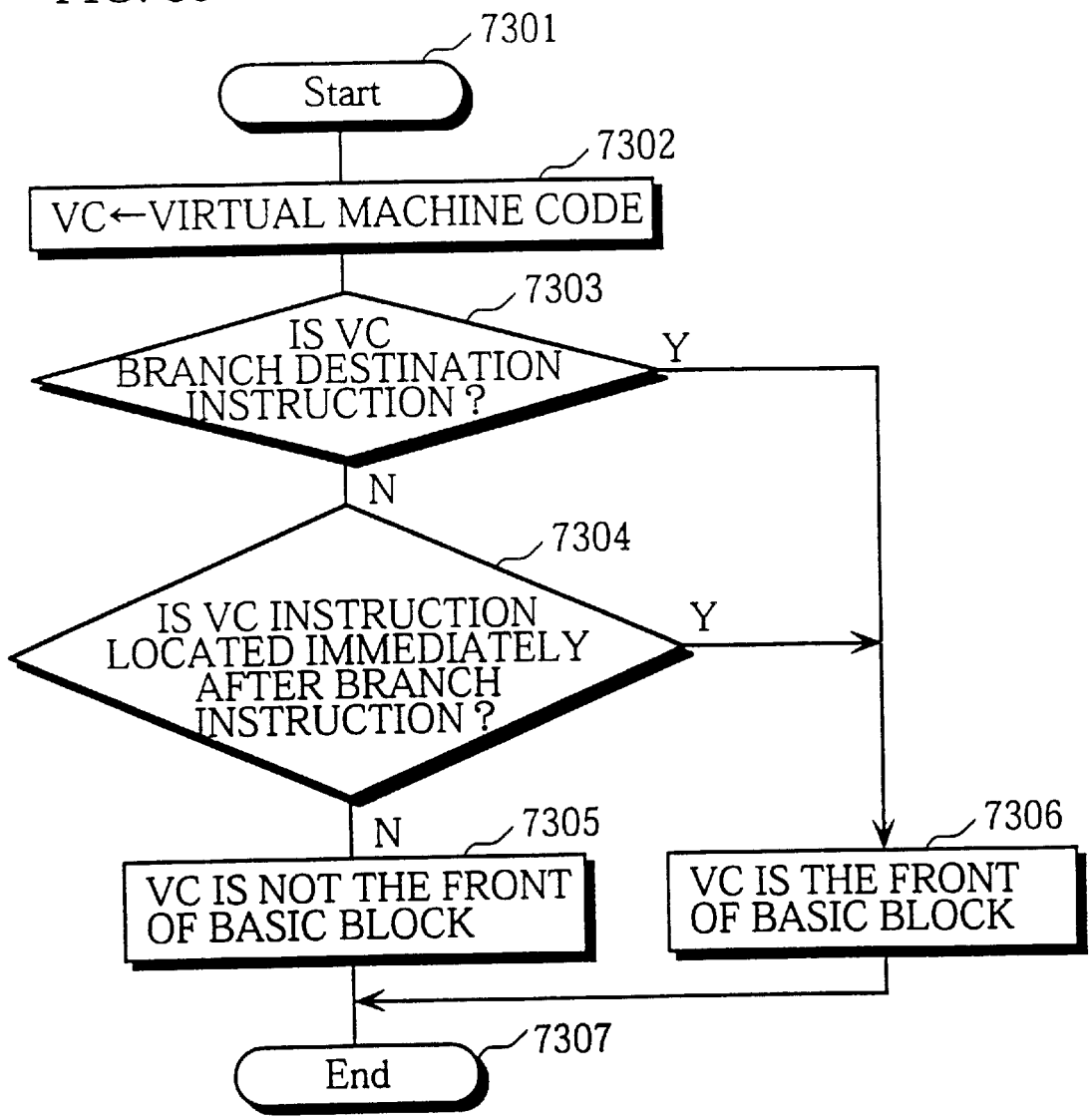
FIG. 80 is a flowchart showing the detailed processing of step 7607 in FIG. 79.

FIG. 80 shows the details of the judgment in step 7607 of FIG. 79, which is to say, the judgment as to whether the virtual machine code VC should be made the start of a basic block. If the virtual machine code VC corresponds to either a branch destination instruction or an instruction located immediately after a branch instruction, the block converting unit 7663 judges that the virtual machine code VC corresponds to the start of a basic block (step 7302~7306).

As shown in FIG. 79, when the virtual machine code VC is judged as being the start of a basic block, the block converting unit 7663 updates the identifier ID to generate a new instruction block (step 7701) and generates an unconditional branch instruction to link the end of the immediately preceding instruction block (identifier ID) with the next instruction block (identifier NID) (step 7702). The block converting unit 7663 then prepares for the generation of virtual machine codes in the new instruction block (step 7703), and sets addresses in accordance with the setting of the identifier NID (step 7704).

On determining in step 7608 that the virtual machine code VC is a branch instruction, the block converting unit 7663 performs address setting to convert the branch destination of the branch instruction to a suitable address (step 7609). This address setting is performed because the processing of branch instructions and addition of new branch instructions by the block converting unit 7663 results in a rearrangement of the virtual machine instructions in the original virtual machine program 7664.

Figure 81:
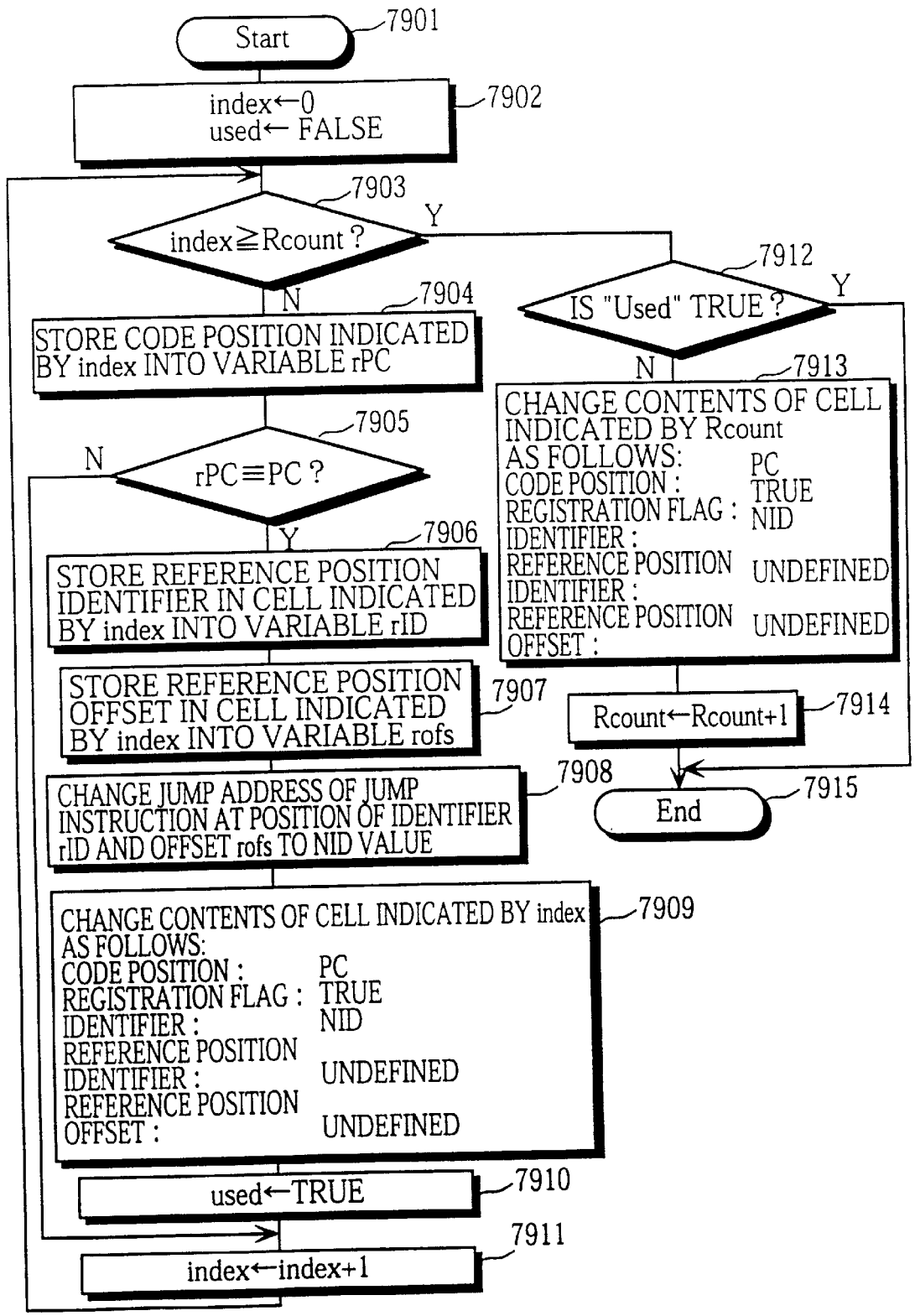
FIG. 81 is a flowchart showing the detailed processing of step 7704 in FIG. 79.

FIG. 81 shows the details of step 7704 in FIG. 79, which is to say the setting of addresses in accordance with the allocation of the identifier NID of a new instruction block. Here, on discovering that the branch address of a branch instruction may now be set in accordance with the allocation of the identifier NID to a new instruction block, the block converting unit 7663 sets the branch address for the branch instruction (steps 7905~7910). When this is not the case, the block converting unit 7663 additionally registers information into the branch address conversion table 7663a so that the address of a branch instruction that branches to this instruction block can be set in a later process (steps 7913, 7914).

Figure 82:
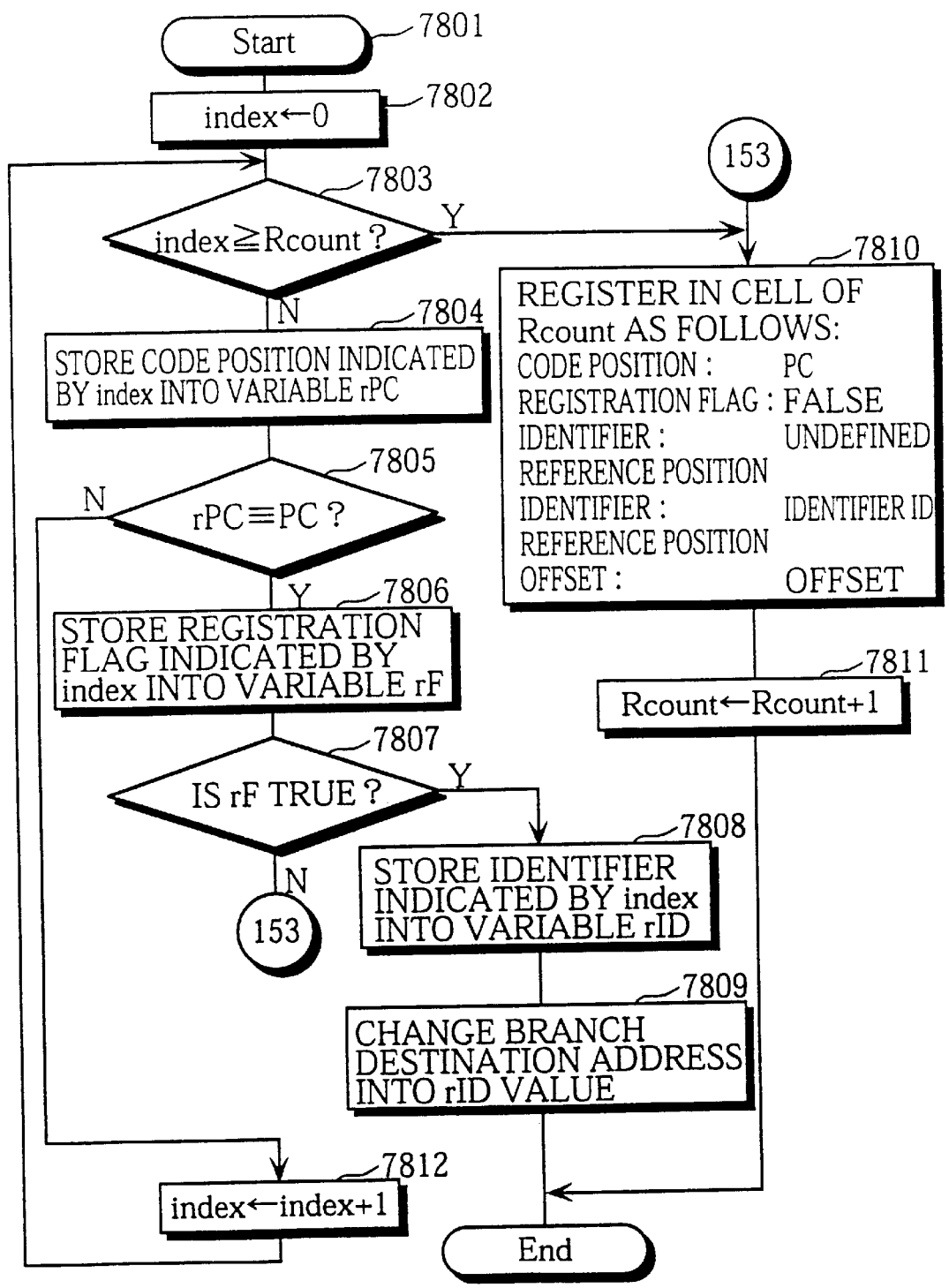
FIG. 82 is a flowchart showing the detailed processing of step 7609 in FIG. 79.

FIG. 82 shows the details of step 7609 in FIG. 79, which is to say the setting of an address of a branch destination that is indicated by a branch instruction in the virtual machine program 7664. Here, when the branch instruction is a branch to a preceding position, which is to say, a branch to an instruction block that has already been registered in the branch address conversion table 7663a, the block converting unit 7663 sets the address by replacing the branch destination of the branch instruction with the instruction block identifier rID (steps 7802~7809, 7812). When this is not the case, the block converting unit 7663 registers a new entry in the branch address conversion table 7663a to show that the address has not been set (steps 7810, 7811).

As described above, the virtual machine compiler 7660 converts a source program written in a high-level language into a standard virtual machine program 7664 like that shown in FIG. 27, divides the virtual machine program 7664 into basic blocks, and allocates identifiers to the basic blocks. The virtual machine compiler 7660 then adds branch instructions for linking the basic blocks and sets addresses in accordance with the allocation of identifiers so as to convert the virtual machine program 7664 into an instruction block set 7651 that can be executed by the virtual machine 3800 of the present embodiment.

Considerations

With the virtual machine 3800 and the virtual machine compiler 7660 of the present embodiment, the virtual machine program to be executed will not be stored in the instruction storing unit 3801 and executed in the conventional state shown in FIG. 27. Instead, the virtual machine program executed having been stored in the instruction storing unit 3801 divided into basic blocks. This has the technical consequences described below.

First, let us examine the time taken by compiling by a JIT compiler.

As described above, a conventional JIT compiler needs to analyze whether any branch destination in the virtual machine program violates certain restrictions. If such a branch destination is present, a JIT compiler needs to perform a process, such as moving the branch destination. However, with the present virtual machine system, it is guaranteed that each branch destination will be the start of an instruction block. As a result, such conventional processing of branch destinations is largely unnecessary if the present invention is used.

A conventional JIT compiler also needs to perform processes due to the presence of instructions like delayed branches. An example of such a process for a delayed branch is the specifying of instructions that are unaffected by the delayed branch and so can be located immediately after the branch instruction. However, with the present virtual machine system, the virtual machine program is stored in the instruction storing unit 3801 so that each instruction block is divided into a non-branch instruction storing area and a branch instruction storing area. It is also guaranteed that in one branch instruction storing area, one branch instruction can only be followed by one more branch instruction at most. As a result, most of such processes that are required due to the presence of delayed branches and the like do not need to be performed with the present invention.

The following describes the impact of the present invention with regard to the compatibility of programs to the cache construction of a virtual machine.

When making programs compatible with a conventional cache construction, it is necessary when dividing the virtual machine program into cache blocks to check that none of the virtual machine instructions that change the program counter change it to a value that crosses a boundary with another cache block. However, with the present virtual machine system, if the virtual machine program stored in the instruction storing unit 3801 is cached in instruction block units, all virtual machine instructions that change the program counter to a value that crosses a cache boundary will belong to a branch instruction storing area 3855a~3855d.

Figure 32:
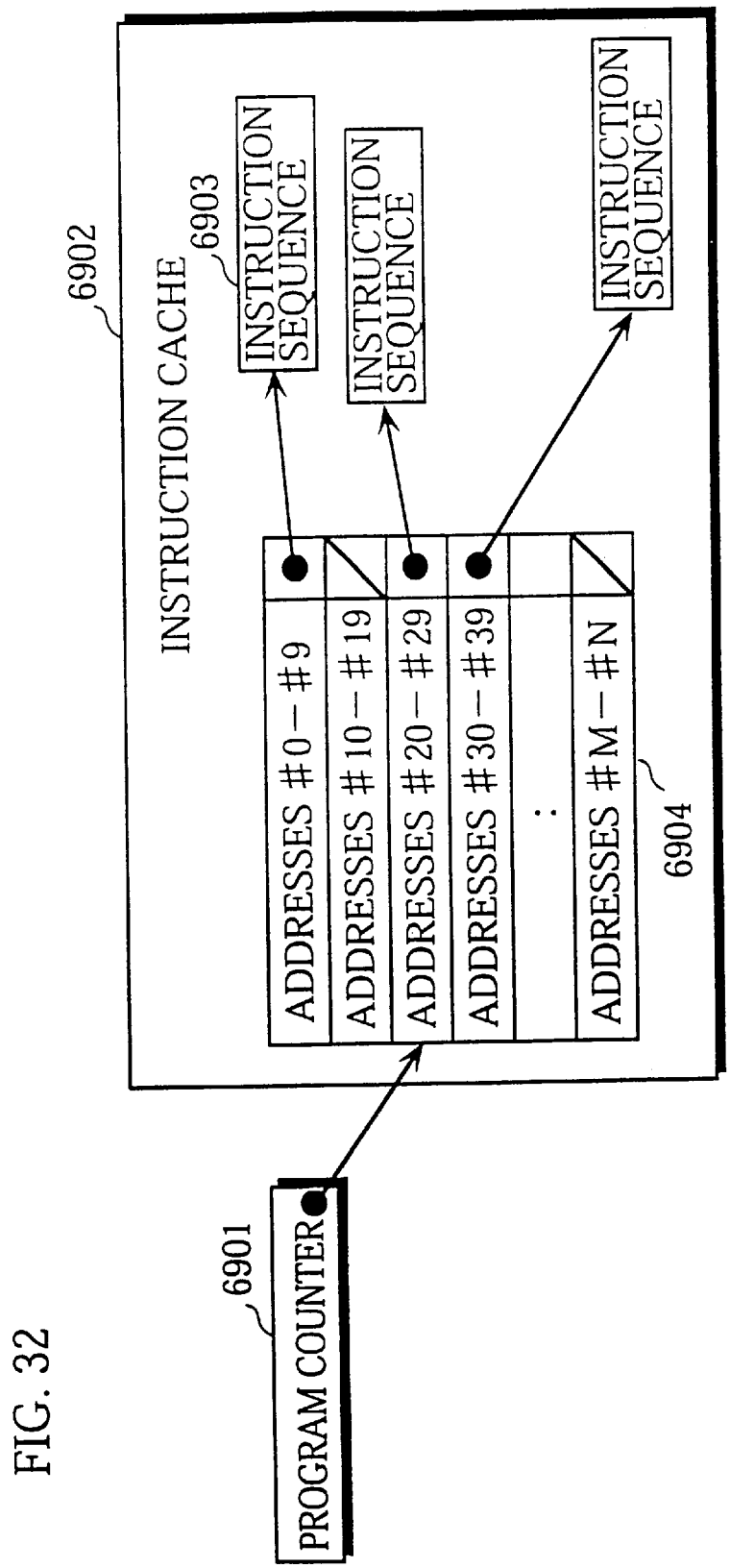
FIG. 32 is a drawing for explaining a problem likely to occur to the conventional virtual machine that includes a cache memory.
Figure 33:
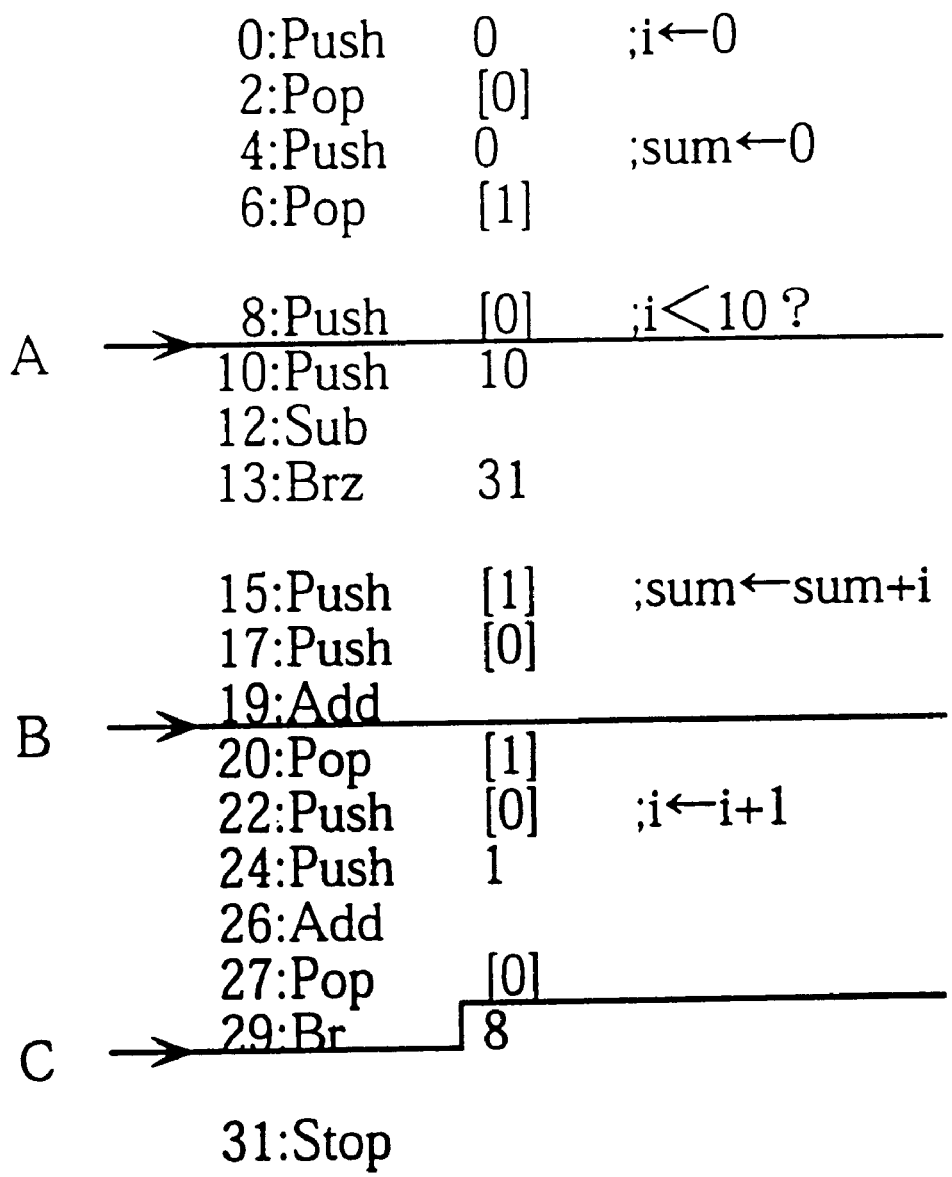
FIG. 33 shows the case where the sample virtual machine program shown in FIG. 27 is stored in the cache memory, with the boundary lines A, B, and C marking the boundaries between the cache blocks.
Figure 83:
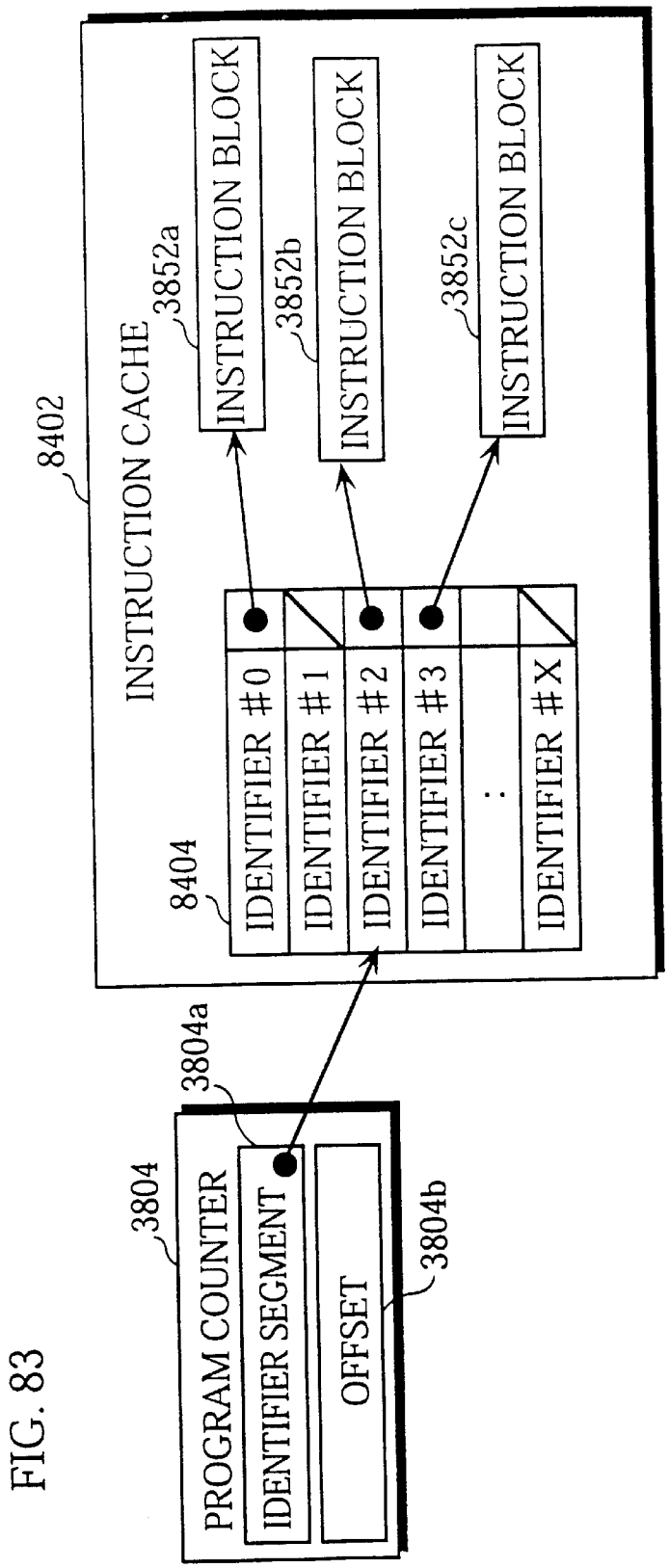
FIG. 83 shows the relationship between the PC, the instruction block storing areas, and the cache table when caching is performed by the virtual machine in instruction block units.

FIG. 83 shows the relationship between the PC 3804, the instruction block storing areas 3852a~3852d and the cache table 8084 when caching is performed by the virtual machine 3800 of the present embodiment in instruction block units. This corresponds to the conventional art shown in FIG. 32. Conventionally, an ten-address instruction sequence 6903 is placed in the instruction cache 6902 as a cache block. With the present virtual machine 3800, however, instructions are arranged into the instruction cache in units of instruction blocks 3852a~3852d, with these being managed using the identifiers in the cache table 8404, as shown in FIG. 83.

Figure 84:
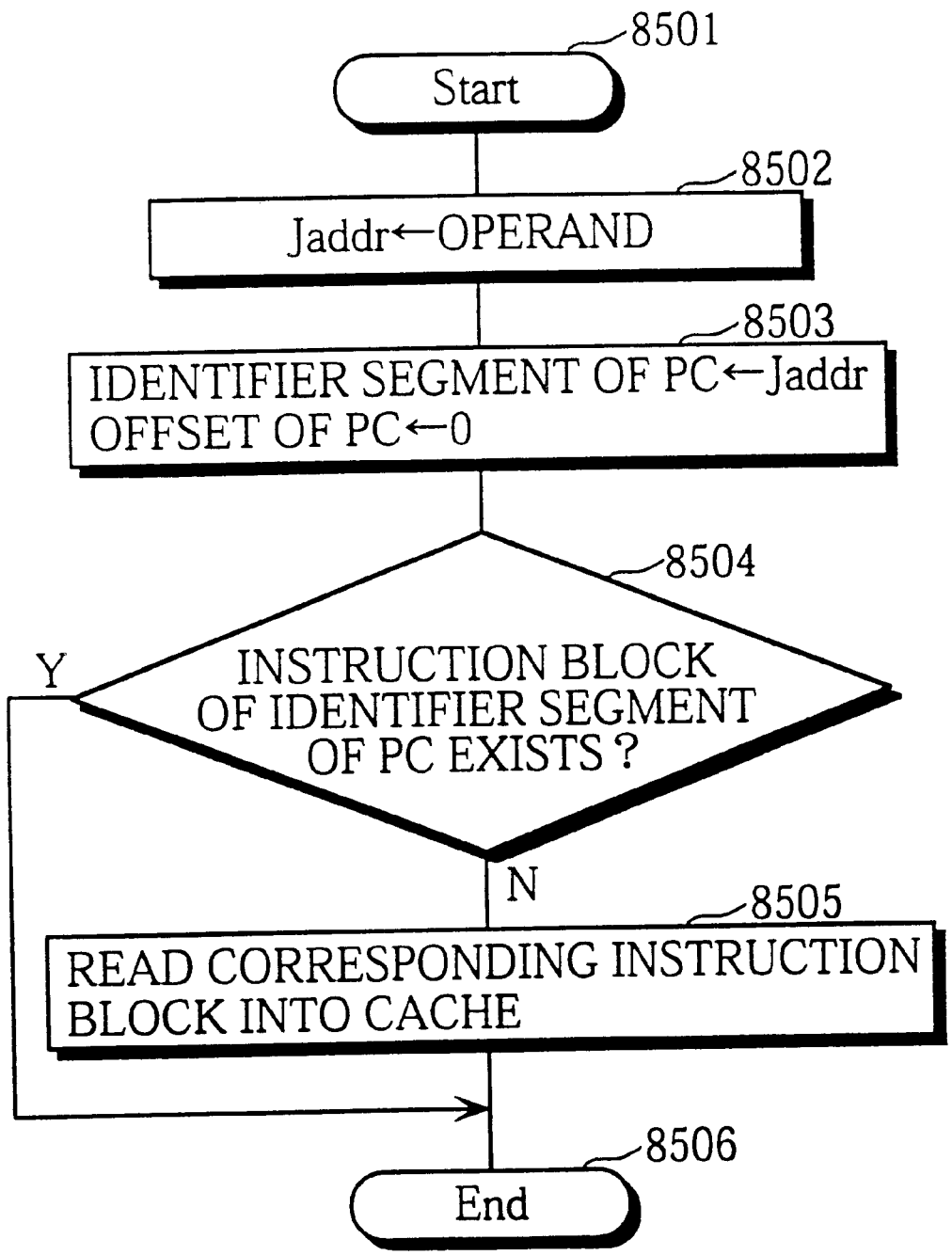
FIG. 84 is a flowchart showing the instruction processing of branch instructions by the executing unit when instructions are cached in instruction block units in the virtual machine.

FIG. 84 is a flowchart showing the instruction processing of branch instructions by the executing unit 3810 when instructions are cached in instruction block units in the virtual machine 3800 of the present embodiment. This corresponds to the FIG. 75 where units are not reconciled to the cache construction. By comparing these drawings, it can be seen that the virtual machine 3800 can be made into a suitable virtual machine for the cache construction by referring to the identifiers in the cache table 8404 and judging in instruction block units whether a cache hit is made (step 8504), and then performing a write into the instruction cache 8402 when there is a cache miss (step 8505).

In this way, by caching a virtual machine program in instruction block units, processes that were conventionally necessary, such as judgments regarding the cache boundaries, are no longer required. Even when an instruction needs to be loaded into the cache as a result of a cache miss, the original virtual machine program will already has been divided into instruction blocks, so that there is a reduced load for the loading process.

As described above, the virtual machine system of the present embodiment converts a source program into a standard virtual machine program and then divides the virtual machine program into instruction blocks using basic blocks as units. These instruction blocks are stored in the instruction storing unit 3801 and the branch destinations of each branch instruction are converted into the identifiers of instruction blocks. As a result, the address analysis processing for branch destination instructions by a JIT compiler is simplified, and the timing taken by compiling is reduced. By caching instructions in instruction block units, the judgment processing regarding the cache boundaries is simplified, and decreases in execution efficiency that occur when a cache is provided for the virtual machine can be made smaller than in conventional techniques.

Note that while the virtual machine compiler 7660 of the present embodiment is provided with an intermediate instruction sequence converting unit 7661 and a generating unit 7662, it should be obvious that a standard compiler for generating a virtual machine program from a source program may be used instead.

Sixth Embodiment

The following describes the virtual machine of the sixth embodiment. This virtual machine has a faster decoding process than the virtual machine of the fifth embodiment.

Construction of the Virtual Machine

Figure 85:
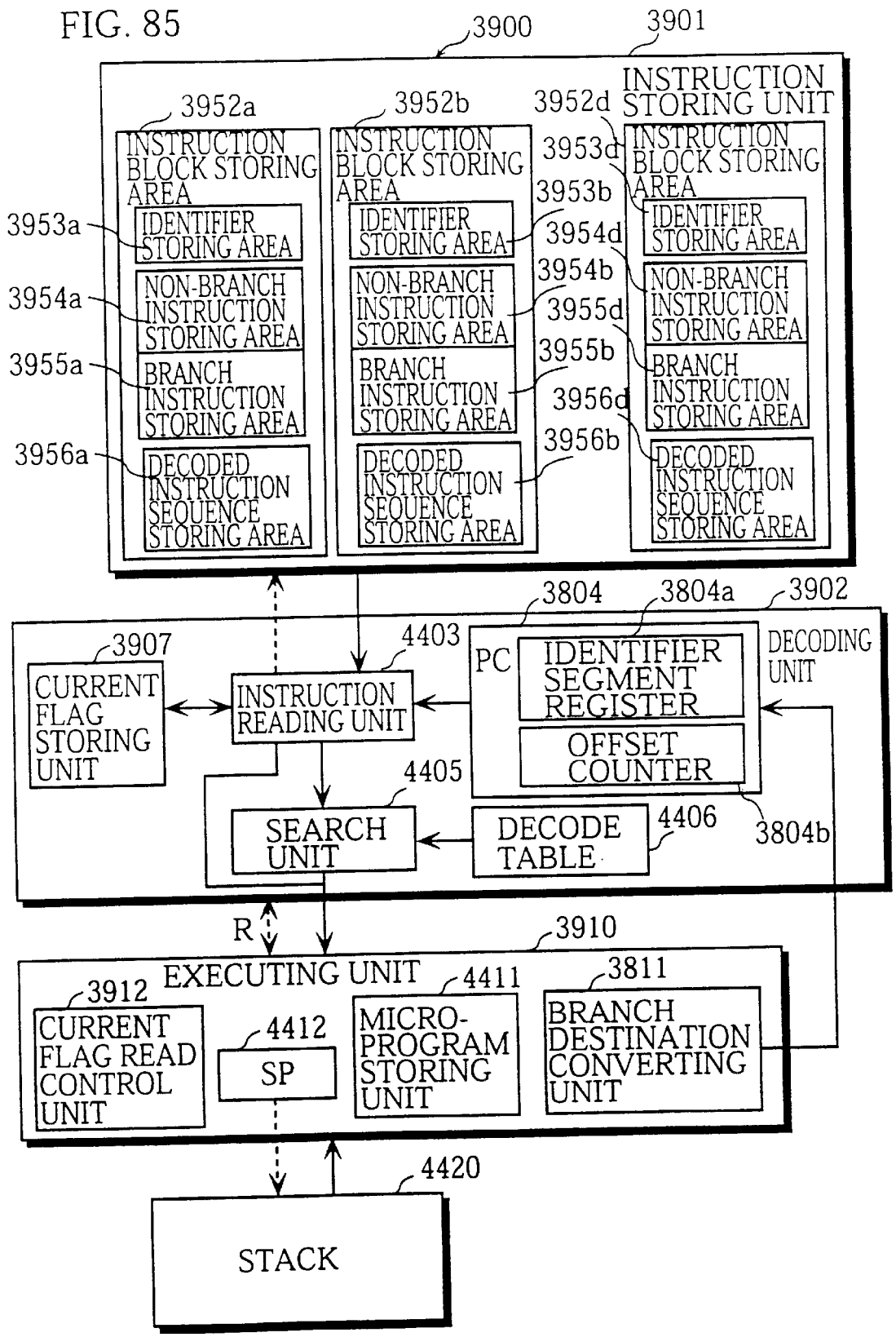
FIG. 85 is a block diagram showing the construction of the virtual machine in the sixth embodiment.

FIG. 85 is a block diagram showing the construction of the virtual machine 3900 in this sixth embodiment. This virtual machine 3900 includes an instruction storing unit 3901, a decoding unit 3902, an executing unit 3910, and a stack 4420.

As can be seen by comparing FIG. 85 with FIG. 71, the present virtual machine 3900 has almost the same construction as the virtual machine 3800 of the fifth embodiment. The differences between the two lie in the stored content of the instruction storing unit 3901, in the provision of the current flag storing unit 3907 in the decoding unit 3902, in the functions of the instruction reading unit 3903, and in the addition of the current flag read control unit 3912 to the executing unit 3910. The following explanation focuses on these differences between the present virtual machine 3900 and the virtual machine 3800 of the fifth embodiment.

The instruction storing unit 3901 stores the virtual machine program to be executed split into a plurality of instruction blocks 3952a~3952d, in the same way as the instruction storing unit 3801 in the fifth embodiment. However, the instruction block storing areas 3952a~3952d of the sixth embodiment differ in further including decoded instruction sequence storing areas 3956a~3956d for storing decoded data sequences that correspond to all of the virtual machine codes stored in the non-branch instruction storing areas and branch instruction storing areas (collectively called the "virtual machine code area") of the corresponding instruction block.

Figure 86A:
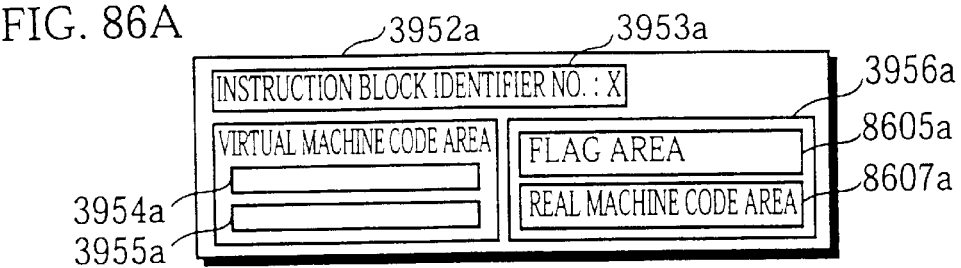
FIGS. 86A to 86C show examples of the stored state of virtual machine programs in the instruction storing unit.
Figure 86B:
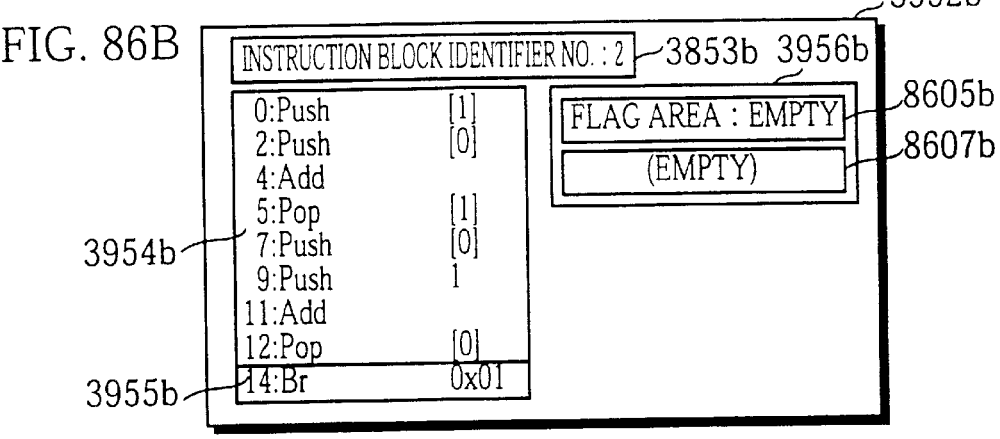
Figure 86C:
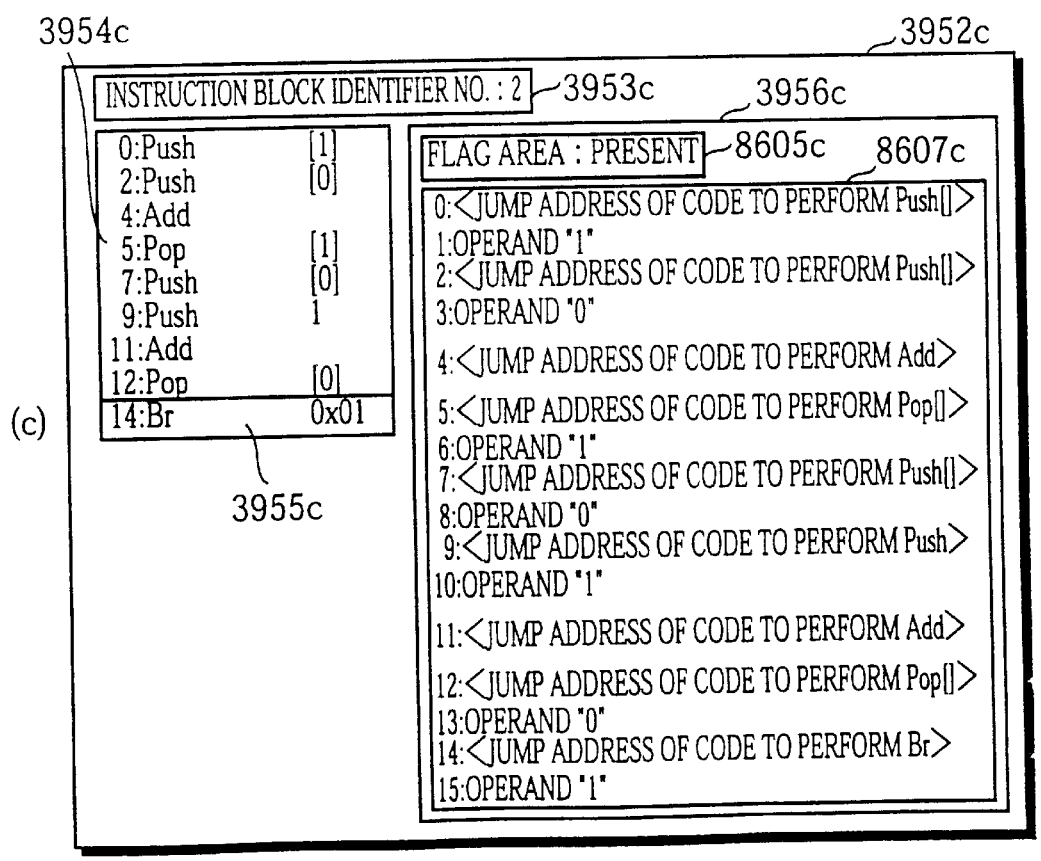

FIGS. 86A to 86C shows examples of the stored state of virtual machine programs in the instruction storing unit 3901. These correspond to the case when the sample virtual machine program shown in FIG. 27 is stored.

As shown in FIGS. 86A to 86C, the decoded instruction sequence storing areas 3956a~3956d provided in the instruction block storing areas 3952a~3952d further include real machine code areas 8607a~8607c for storing the decoded instruction sequences and the flag areas 8605a~8605c for storing flags that respectively show whether a decoded instruction sequence is stored in the real machine code areas 8607a~8607c. As one example, the instruction block storing area 3952b shown in FIG. 86B does not have a decoded instruction sequence in the real machine code area 8607b, so that flag ("empty") showing an indication of this is stored in the flag area 8605b. On the other hand, the instruction block storing area 3952c shown in FIG. 86(c) has a decoded instruction sequence in the real machine code area 8607c, so that a flag ("present") showing an indication of this is stored in the flag area 8605c.

Note that the decoded instruction sequence that should be stored in each real machine code area can obtained in advance, such as by using the virtual machine 3800 of the fifth embodiment. This is because the decoded instruction sequence is the same as the decoded data sequence outputted by the decoding unit 3802 to the executing unit 3810 when the virtual machine 3800 of the fifth embodiment executes the virtual machine program in each instruction block.

In each instruction block, the separate virtual machine instructions located in the virtual machine code areas 3954a~3954d, 3955a~3955d and the corresponding decoded data located in the real machine code area 8607a~8607d are arranged at positions with addresses that are separated by a predetermined offset.

The current flag storing unit 3907 is a temporary storage area that holds a flag that is stored in the flag area of the instruction block in the instruction storing unit 3901 that is currently being executed by the virtual machine 3900.

The instruction reading unit 3903 reads a virtual machine instruction or decoded data from the instruction storing unit 3901, based on the value of the flag held by the current flag storing unit 3907, and outputs the read item to the search unit 4405 or executing unit 3910. This means that when decoded data is read, the search unit 4405 is bypassed, so that the decoded data is sent directly to the executing unit 3910.

The current flag read control unit 3912 checks whether the decoded data sent from the decoding unit 3902 is a branch instruction. If so, the current flag read control unit 3912 controls the decoding unit 3902 immediately after the branch instruction is executed, so that flag stored in the flag area of the branch destination instruction block is read and stored in the current flag storing unit 3907.

Operation of Virtual Machine

The following describes the operation of the virtual machine 3900.

Figure 87:
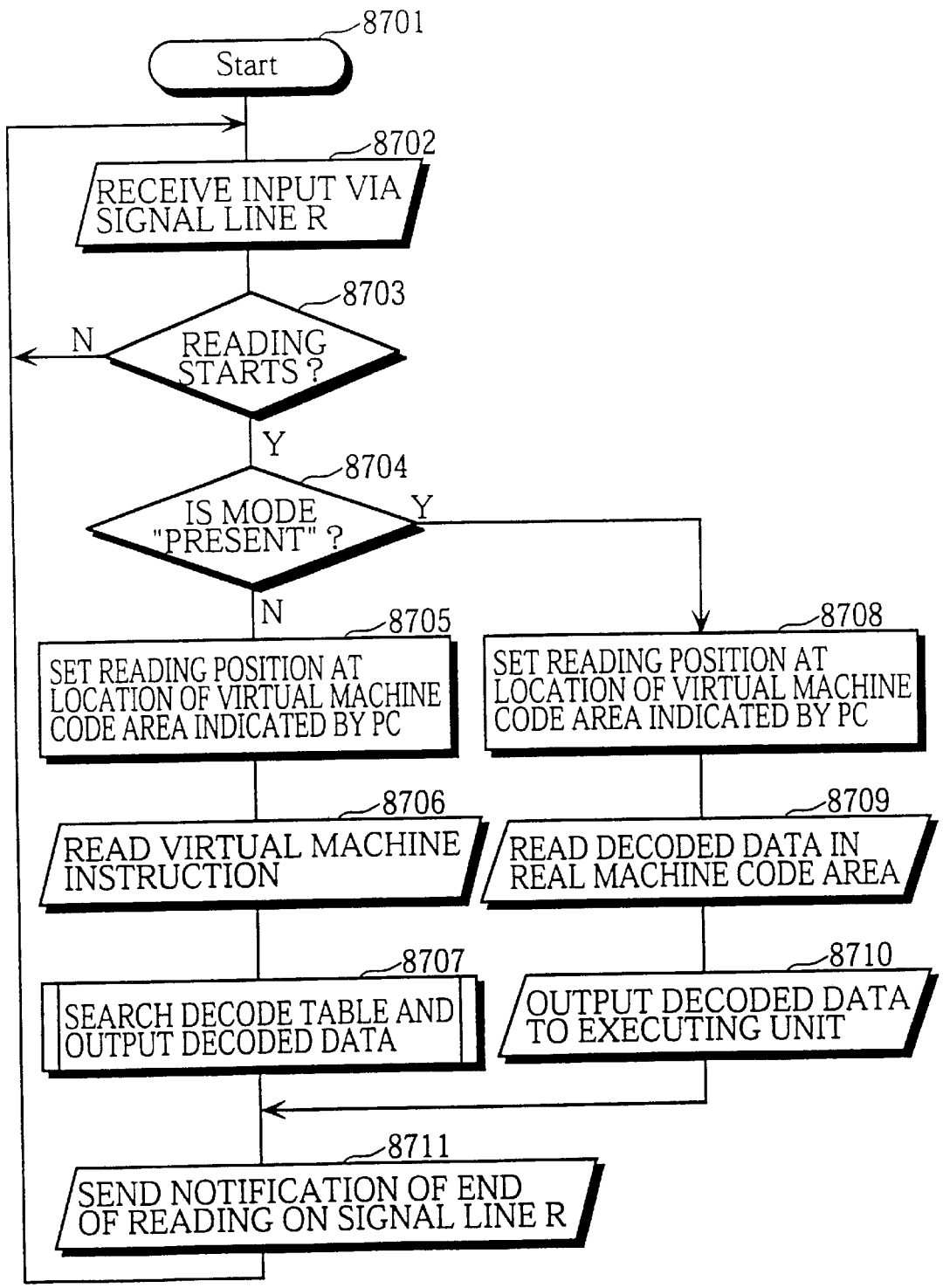
FIG. 87 is a flowchart showing the processing of the decoding unit of the virtual machine.

FIG. 87 is a flowchart showing the operation of the decoding unit 3902.

The instruction reading unit 3903 of the decoding unit 3902 is instructed by the executing unit 3910 via the signal line R to read a next virtual machine instruction (steps 8702, 8703). The instruction reading unit 3903 then reads the flag held by the current flag storing unit 3907 and judges its content (step 8704).

On judging that a decoded instruction sequence is not included, the instruction reading unit 3903 operates in the same way as in the fifth embodiment. The instruction reading unit 3903 reads the virtual machine code stored in the branch instruction storing area or non-branch instruction storing area in accordance with the address in the virtual machine code area that is stored in the PC 3804, and passes the read virtual machine code over to the search unit 4405 (steps 8705, 8706). Next, the search unit 4405 specifies the jump address by referring to the decode table 4406, and outputs the jump address to the executing unit 3910 as decoded data (step 8707), before sending notification of this on the signal line R (step 8711).

On the other hand, on judging from the current flag that a decoded instruction sequence is included, the instruction reading unit 3903 calculates an address in the real machine code areas 8607a~8607d by adding the predetermined offset to the address in the virtual machine code area stored in the PC 3804 (step 8708). The instruction reading unit 3903 then reads the decoded data in accordance with the calculated address (step 8709) and outputs the read decoded data directly to the executing unit 3910 (step 8710).

Figure 88:
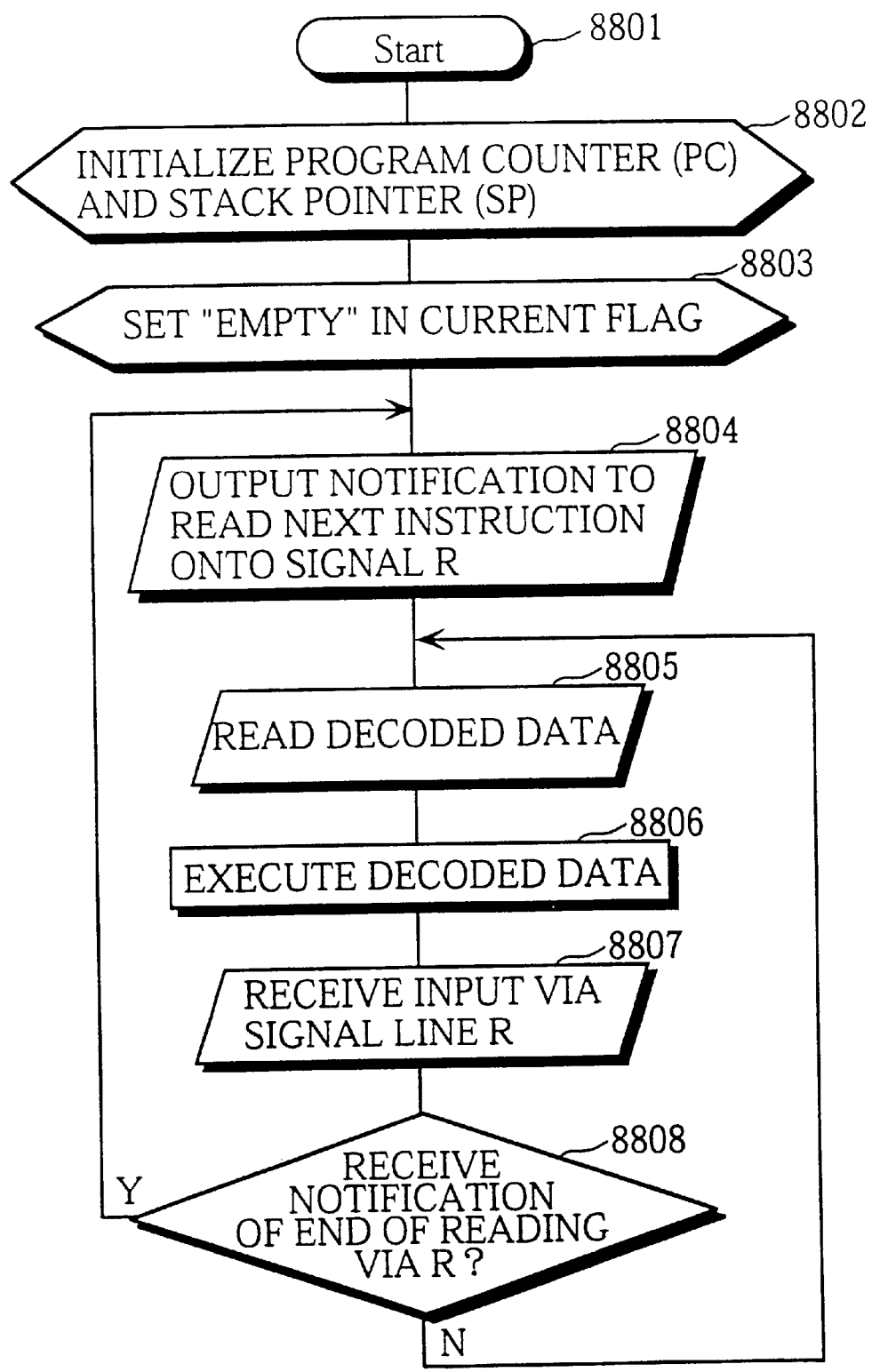
FIG. 88 is a flowchart showing the processing of the executing unit of the virtual machine.

FIG. 88 is a flowchart showing the operation of the executing unit 3910.

FIG. 88 has fundamentally the same flow as the conventional art shown in FIG. 9. The PC 3804 and SP 4412 are initialized (step 8802), and then the microprogram in the microprogram storing unit 4411 is executed based on the decoded data sent from the decoding unit 3902 (steps 8804~8808).

The difference with FIG. 9 lies in the addition of the processing that involves the current flag storing unit 3907 (step 8803). On starting its operation, the executing unit 3910 stores a flag showing that no decoded data sequence is present into the current flag storing unit 3907 to initialize the value of the current flag (step 8803).

Figure 89:
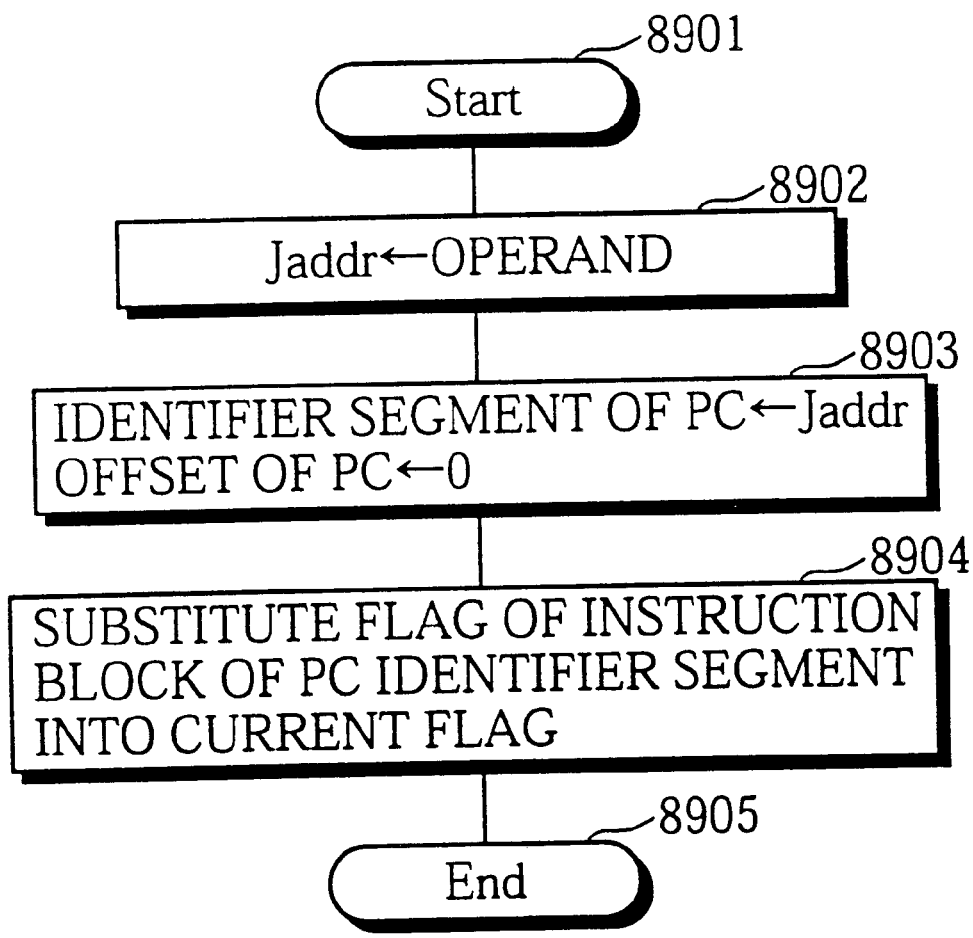
FIG. 89 is a flowchart showing the control performed for the decoding unit when the executing unit of the virtual machine executes a branch instruction.

FIG. 89 is a flowchart showing the control performed for the decoding unit 3902 when the executing unit 3910 executes a branch instruction. As can be understood by comparing FIG. 89 with FIG. 75, when the executing unit 3910 executes a branch instruction, the branch destination converting unit 3811 converts the operand of the branch instruction into an identifier segment of the branch destination instruction block and initializes the offset. The branch destination converting unit 3811 stores this identifier segment and updated offset respectively into the identifier segment register 3804a and the offset counter 3804b of the PC 3804 (steps 8902, 8903), though this processing is same as in the fifth embodiment.

The difference with the fifth embodiment lies again in the addition of the processing that involves the current flag storing unit 3907 (step 8904). After the PC 3804 has been updated by the branch destination converting unit 3811 (steps 8902, 8903), the current flag read control unit 3912 controls the instruction reading unit 3903 so as to read the value of the flag area in the instruction block shown by the identifier segment stored in the identifier segment register 3804a and store the read value into the current flag storing unit 3907 (step 8904). As a result, when a branch is performed to a new instruction block, the content of the current flag storing unit 3907 is updated, with a flag showing whether a decoded instruction sequence is stored in the real machine code area of the instruction block to be executed next being set in the current flag storing unit 3907.

As described above, the virtual machine 3900 of the present embodiment divides a virtual machine program to be executed into instruction blocks that are generated from basic blocks. These instruction blocks are stored in the instruction storing unit 3901. However, instruction blocks do not just include virtual machine instructions, and so may also include decoded data that corresponds to the virtual machine instructions. The decoding unit 3902 refers to the flag area in each instruction block and, when decoded data exists for an instruction block, only needs to read the decoded data and pass it on to the executing unit 3910. When this happens, the search unit 4405 does not need to search the search table. In addition to the effects achieved by the virtual machine 3800 of the fifth embodiment, the present virtual machine 3900 can execute the instruction blocks that already include decoded data in a shorter time.

Note that in the present embodiment, the virtual machine code area and real machine area in each instruction block were described as having a positional relationship whereby corresponding addresses are separated by a predetermined offset, although this need not be the case. As one example, the limitations of this positional relationship can be removed by providing each instruction block with an offset address for specifying the first address in the decoded instruction sequence storing area. When such offset addresses are provided, the flag and offset address of the instruction block can be read whenever a branch is performed to a new instruction block. In this way, addresses that respectively suit the virtual machine code area and real machine code area can be set in the PC 3804 in accordance with the current flag.

Seventh Embodiment

The following describes the virtual machine 4000 of the seventh embodiment of the present invention. This virtual machine 4000 dynamically generates the decoded instruction sequences for the virtual machine of the sixth embodiment.

Construction of the Virtual Machine

Figure 90:
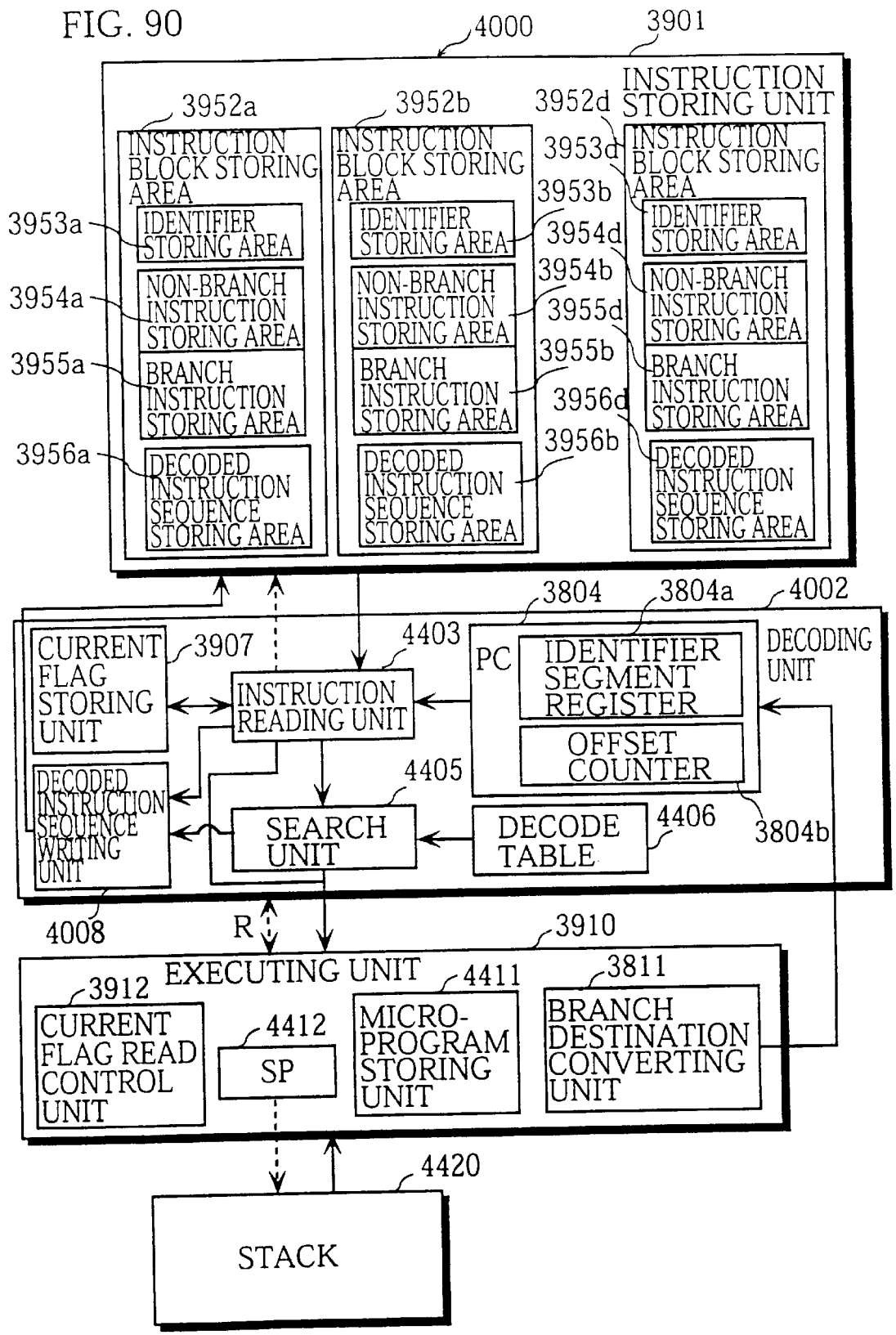
FIG. 90 is a block diagram showing the construction of the virtual machine in the seventh embodiment.

FIG. 90 is a block diagram showing the construction of the virtual machine 4000 in this seventh embodiment. This virtual machine 4000 includes an instruction storing unit 3901, a decoding unit 4002, an executing unit 3910, and a stack 4420.

As can be seen by comparing FIG. 90 with FIG. 85, the present virtual machine 4000 has almost the same construction as the virtual machine 3900 of the sixth embodiment. The differences between the two lie in the provision of the decoded instruction sequence writing unit 4008 in the decoding unit 4002 and in the accompanying changes to the internal wiring of the decoding unit 4002. The following explanation focuses on these differences between the present virtual machine 4000 and the virtual) machine 3900 of the sixth embodiment.

The decoded instruction sequence writing unit 4008 operates as follows. When execution control by the present virtual machine 4000 has branched to an instruction block that does not have a decoded instruction sequence, the decoded instruction sequence writing unit 4008 halts the execution of the instruction block and then has the entire virtual machine program located in that instruction block converted into a decoded instruction sequence by the instruction reading unit 3903 and the search unit 4405. The decoded instruction sequence writing unit 4008 then writes the decoded instruction sequence into decoded instruction sequence storing area of that instruction block. After this, the decoded instruction sequence writing unit 4008 has the reading by the instruction reading unit 3903 and executing by the executing unit 3910 recommenced for the decoded instruction sequence it has written.

As a result, only decoded data that has been read from the instruction storing unit 3901 by the instruction reading unit 3903 is passed over to the executing unit 3910 without amendment. Decoded data that is obtained by the search unit 4405 searching the decode table 4406 is not directly passed over to the executing unit 3910. This differs from the sixth embodiment, and corresponds to the decoded data being sent from the search unit 4405 not to the executing unit 3910 but to the decoded instruction sequence writing unit 4008.

Operation of the Virtual Machine

The following describes the operation of the present virtual machine 4000.

Figure 91:
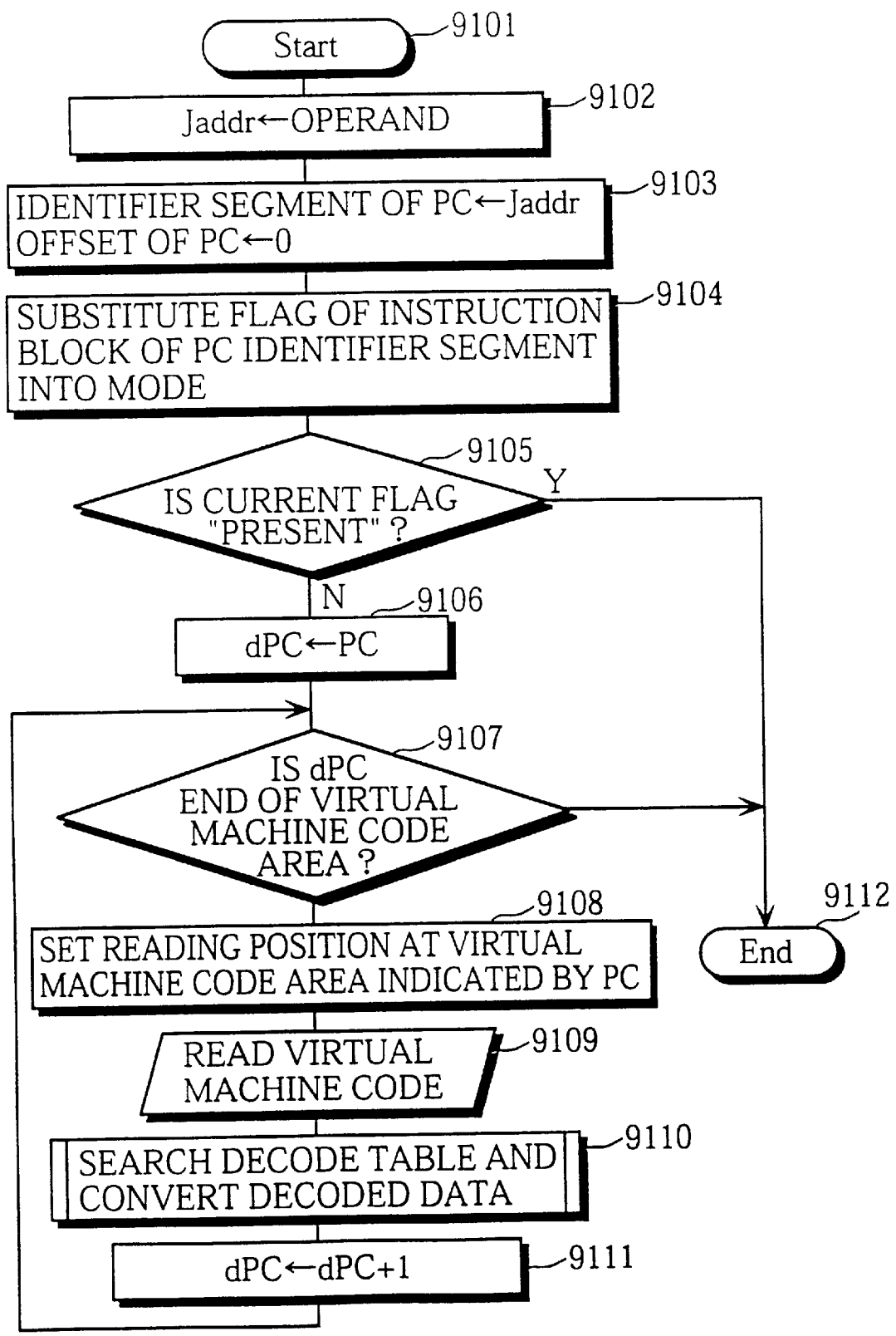
FIG. 91 is a flowchart showing the processing of the decoded instruction sequence writing unit, the current flag read control unit, and the branch destination converting unit when the virtual machine executes a branch instruction.

FIG. 91 is a flowchart showing the characteristic operation of the virtual machine 4000 when executing a branch instruction. This characteristic operation is the operation of the decoded instruction sequence writing unit 4008, the current flag read control unit 3912, and the branch destination converting unit 3811. When branching to a new instruction block, the updating the value of the PC 3804 by the branch destination converting unit 3811 (steps 9102,9103) and the updating of the content of the current flag storing unit 3907 by the current flag read control unit 3912 use the same procedures as the sixth embodiment shown in FIG. 89. The difference between the present embodiment and the sixth embodiment lies in the subsequent generation and writing in the instruction storing unit 3901 of a decoded instruction sequence by the decoded instruction sequence writing unit 4008 (steps 9105~9111).

In more detail, the decoded instruction sequence writing unit 4008 receives and refers to the flag that has been read by the instruction reading unit 3903 to judge whether a decoded data sequence has already been stored for the present instruction block (step 9105).

On finding that a decoded instruction sequence exists, the decoded instruction sequence writing unit 4008 performs no particular processing (step 9112). When this is the case, the decoded instruction sequence in present block is read out in order and is directly executed by the executing unit 3910.

On the other hand, when no decoded instruction sequence exists, the decoded instruction sequence writing unit 4008 increments the pointer dPC (steps 9106~9111) while having the instruction reading unit 3903 successively read the virtual machine codes in the present instruction block (steps 9108, 9109) and having the search unit 4405 convert the read virtual machine codes into decoded data with the required jump addresses. Here, the decoded instruction sequence writing unit 4008 writes the resulting decoded data into the decoded instruction sequence storing area of the present instruction block (step 9110).

Once the converting into decoded data and writing has been completed for all of the virtual machine code in the present block (step 9107), the decoded instruction sequence writing unit 4008 writes a flag showing a decoded data sequence exists into the current flag storing unit 3907 and into the flag area of the present instruction block and thereby completes its processing (step 9112). As a result, the reading by the instruction reading unit 3903 and the executing by the executing unit 3910 can recommence for the decoded instruction sequence of the instruction block.

Figure 92:
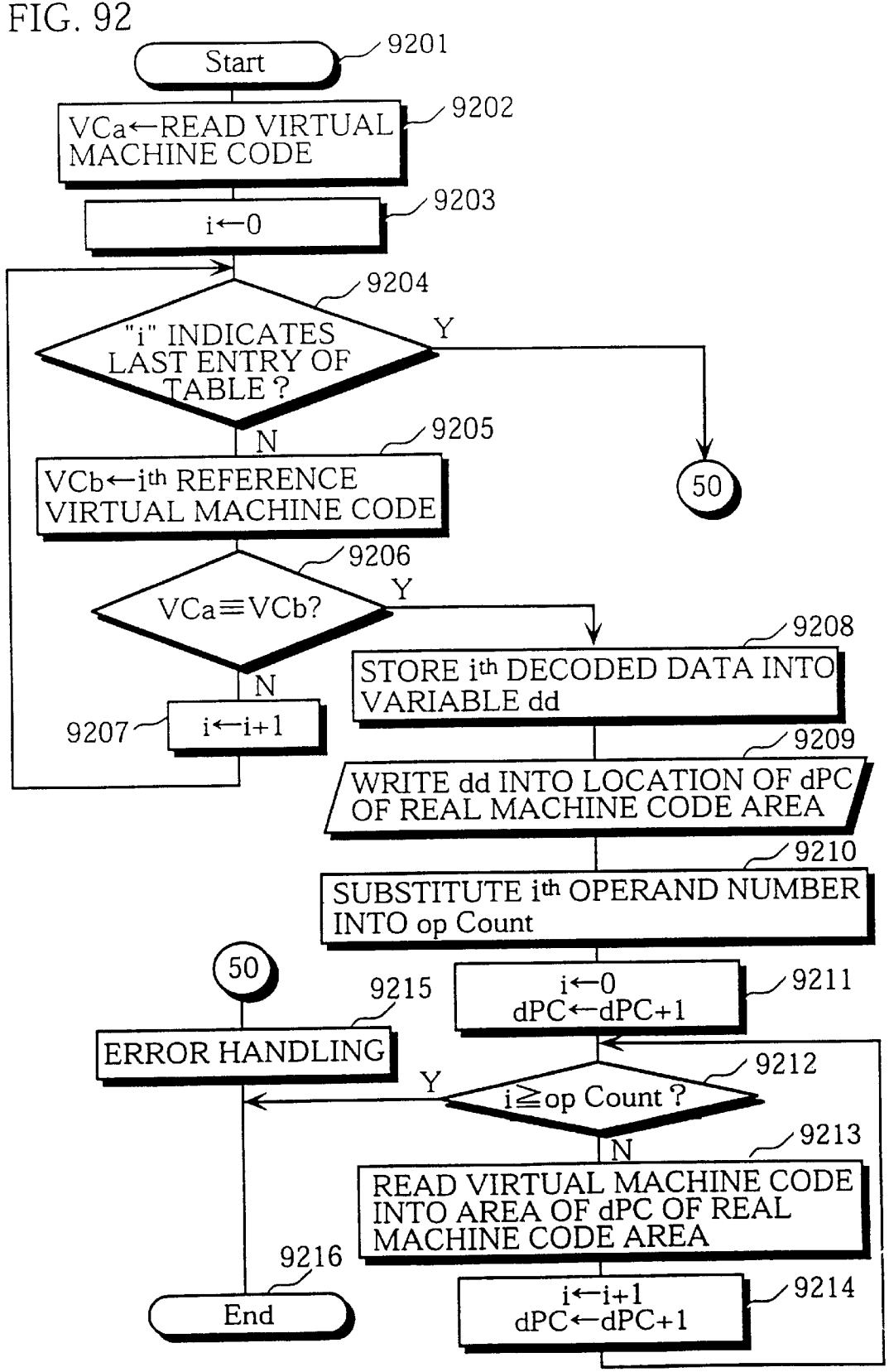
FIG. 92 is a flowchart showing the detailed processing of step 9110 in FIG. 91.

FIG. 92 is a flowchart showing the details of the processing in step 9110 of FIG. 91, which is to say, the conversion from virtual machine code into decoded data and the storage in instruction storing unit 3901. As can be seen by comparing FIG. 92 with FIG. 7, the present processing is composed of the processing of the conventional search unit 4405 plus the processing by the decoded instruction sequence writing unit 4008. This processing by the decoded instruction sequence writing unit 4008 writes the jump addresses dd obtained by searches of the decode table 4406 and the operands of virtual machine instructions into the instruction storing unit 3901 as decoded data (steps 9209, 9213).

Figure 93:
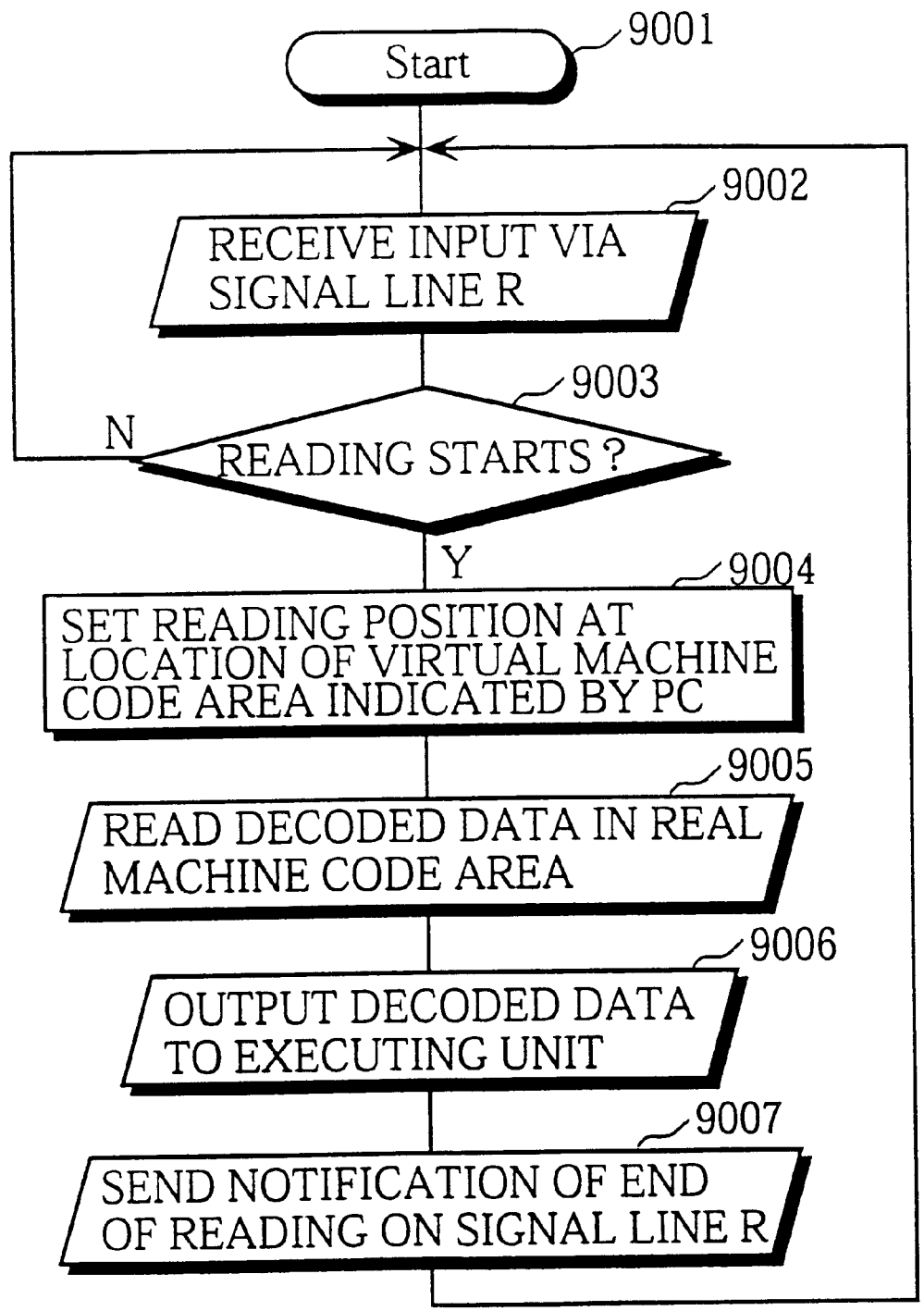
FIG. 93 is a flowchart showing the operation of the decoding unit when viewed from the executing unit.

FIG. 93 is a flowchart showing the operation of the decoding unit 4002 when viewed from the executing unit 3910. The instruction reading unit 3903 only passes decoded data read from a real machine code area of the instruction storing unit 3901 to the executing unit 3910, and so from its relation with the executing unit 3910 can be said to function as a specialized reading unit for decoded data.

As described above, when a branch has been performed to an instruction block that does not have a decoded instruction sequence, the virtual machine 4000 of the present embodiment first has the virtual machine code in that instruction block converted into decoded data that is written into the instruction storing unit 3901, with this decoded data then being directly executed. As a result, when this execution block is next executed, the same decoded data can be read and directly executed, so that the time taken for decoding, which is to say, the time taken by the search unit 4405 to search the decode table 4406, can be saved. The resulting increase in execution speed is especially pronounced when a same instruction block is repeatedly executed, such as for a loop process.

Eighth Embodiment

The following describes the virtual machine 4100 of the eighth embodiment. This virtual machine 4100 is similar to the virtual machine of the seventh embodiment, but uses data compression.

Construction of the Virtual Machine

Figure 94:
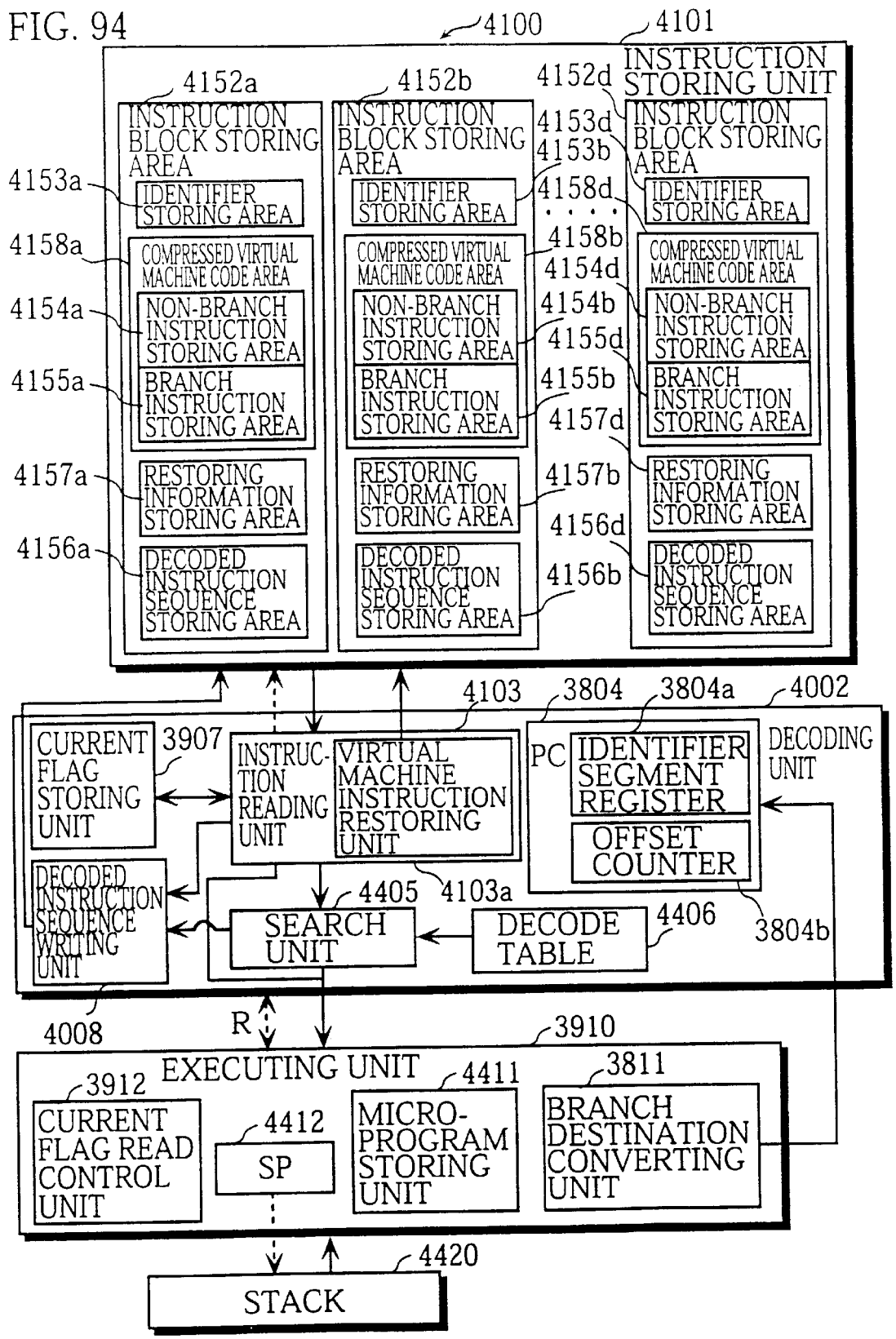
FIG. 94 is a block diagram showing the construction of the virtual machine in the eighth embodiment.

FIG. 94 is a block diagram showing the construction of the virtual machine 4100 in this seventh embodiment. This virtual machine 4100 includes an instruction storing unit 4101, a decoding unit 4102, an executing unit 3910, and a stack 4420.

As can be seen by comparing FIG. 94 with FIG. 90, the present virtual machine 4100 has almost the same construction as the virtual machine 3900 of the sixth embodiment. The differences between the two lie in the code format of the virtual machine program stored in the instruction storing unit 4101, in the provision of the restoring information storing areas 4157a~4157d in the instruction storing unit 4101, and in the addition of the virtual machine instruction restoring unit 4103a to the instruction reading unit 4103 of the decoding unit 4102. The following explanation focuses on these differences between the present virtual machine 4100 and the virtual machine 4000 of the seventh embodiment.

The branch instruction storing areas 4154a~4154d and non-branch instruction storing areas 4155a~4155d (hereafter collectively called the "compressed virtual machine code areas) of the instruction storing unit 4101 store compressed virtual machine instructions in advance. The restoring information storing areas 4157a~4157d of the instruction storing unit 4101 each store a decompression table for decompressing the compressed virtual machine instructions that are stored in the corresponding instruction block.

Figures 95A, 95B:
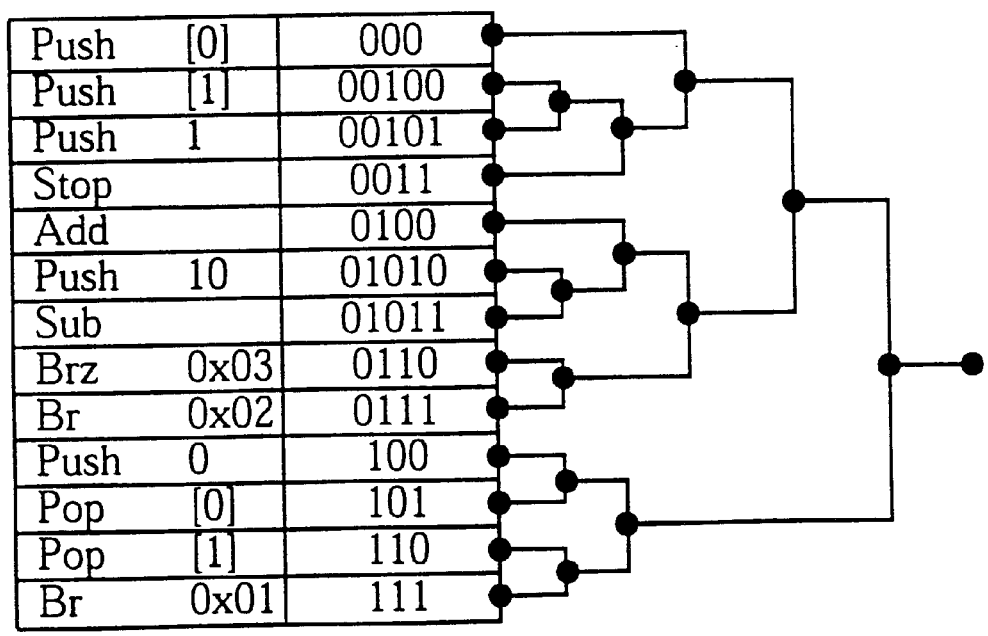
FIG. 95A shows an example of the decompression table stored in the restoring information storing unit of the virtual machine.
FIG. 95B shows the rules governing codes in the decompression table shown in FIG. 95A.

FIG. 95A shows an example of a decompression table. This table includes numerous pairs of a compressed bit sequence and the corresponding virtual machine instruction.

FIG. 95B shows the rules governing codes in the decompression table shown in FIG. 95A. In this embodiment, single virtual machine instructions including operands are compressed into bit sequences according to a bit compression method based on Huffman coding. As one example, the bit sequence "000" represents the virtual machine instruction "Push [0]", while the bit sequence "01010" represents the virtual machine instruction "Push 10".

Figure 96A:
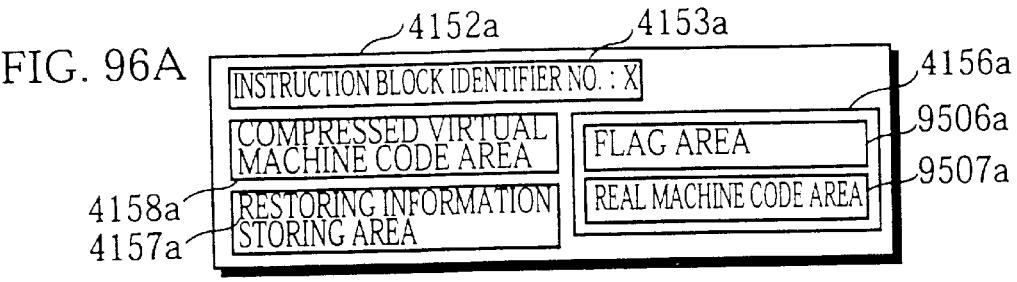
FIGS. 96A to 96C show examples of the stored states of a virtual machine program that is stored in the instruction storing unit of the virtual machine.
Figure 96B:
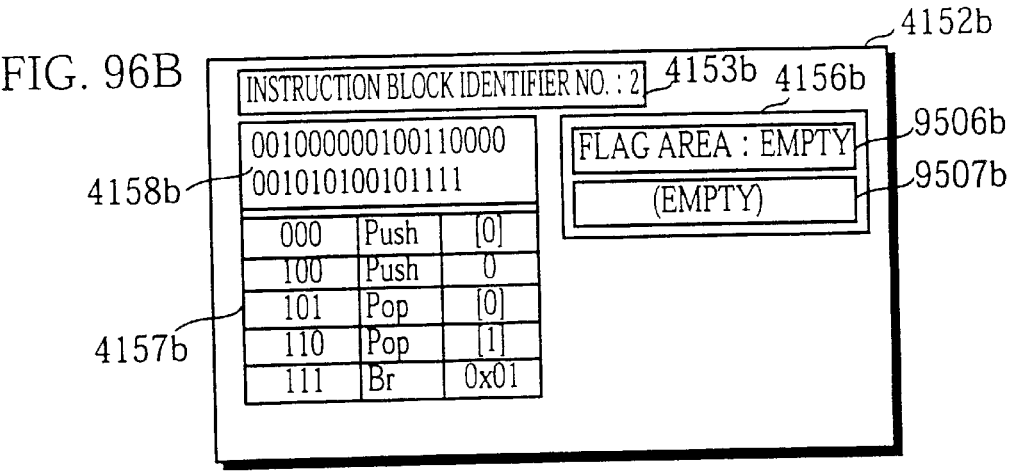
Figure 96C:
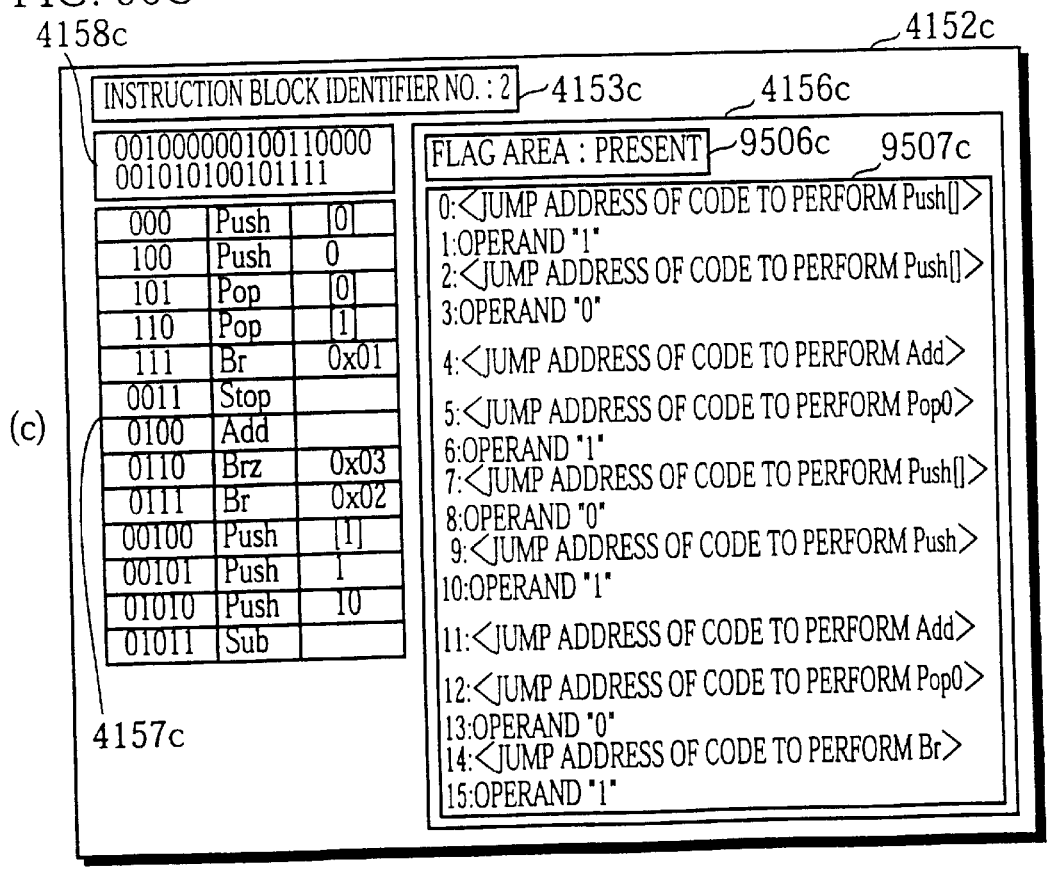

FIGS. 96A~96C show examples of the stored state of a virtual machine program that is stored in the instruction storing unit 4101. This virtual machine program is equivalent to the sample virtual machine program shown in FIG. 27. The compressed virtual machine code areas 4158a~4158c, composed of the non-branch instruction storing areas 4154a~4154c and the branch instruction storing areas 4155a~4155c, in the instruction block storing areas 4152a~4152c respectively store bit sequences (hereafter, "compressed bit sequences") that are obtained by compression encoding the virtual machine program in the corresponding instruction block and linking the results into sequences. Each restoring information storing area 4157a~4157c stores a decompression table for decompressing the bit sequences in the corresponding compressed virtual machine code areas 4158a~4158c. Note that FIG. 96B shows the instruction block storing area 4152b that does not have a decoded instruction sequence, while FIG. 96C shows the instruction block storing area 4152c that has a decoded instruction sequence.

The instruction reading unit 4103 has the same functions as the instruction reading unit 3903 of the seventh embodiment, which is to say the instruction reading unit 4103 reads compressed bit sequences from the compressed virtual machine code areas 4158a~4158d in the instruction storing unit 4101 and reads decoded instruction sequences from the decoded instruction sequence storing areas 4156a~4156d. However, the instruction reading unit 4103 is also provided with a virtual machine instruction restoring unit 4103a.

The virtual machine instruction restoring unit 4103a operates as follows. When the instruction reading unit 4103 reads one bit at a time in a compressed bit sequence from one of the compressed virtual machine code areas 4158a~4158d in the instruction storing unit 4101, the virtual machine instruction restoring unit 4103a refers to a decompression table stored in the corresponding restoring information storing area 4157a~4157d and specifies the virtual machine instruction that corresponds to the read compressed bit sequence. The virtual machine instruction restoring unit 4103a then passes this virtual machine instruction on to the search unit 4405. These processes compose the decompression (restoring) processing that is repeated by the virtual machine instruction restoring unit 4103a.

Operation of the Virtual Machine

The following describes the operation of the present virtual machine 4100.

As mentioned above, the present virtual machine 4100 includes all of the functions of the virtual machine 4000 of the seventh embodiment, so that the overall processing by the virtual machine 4100 is the same except for the decompression of the compressed bit sequences. Accordingly, the processing of the virtual machine 4100 is the same as that shown by the flowchart in FIG. 91.

The present virtual machine 4100 operates in the same way as the virtual machine 4000 in the seventh embodiment when there is a branch to an instruction block that does not have a decoded instruction sequence. The instruction reading unit 4103 and search unit 4405 first convert the virtual machine program in this instruction block into decoded data which is written into the instruction storing unit 4101 by the decoded instruction sequence writing unit 4008. After this, the resulting decoded instruction sequence is read by the instruction reading unit 4103 and directly executed by the executing unit 3910.

The virtual machine 4100 of the present embodiment differs from the virtual machine 4000 in that it reads virtual machine instructions that have been compressed. As a result, the detailed processing in steps 9109 and 9110 of FIG. 91 differs from the processing in the seventh embodiment. This is because a suitable read process must be performed for the compressed bit sequences and a decompression process must be additionally performed.

Figure 97:
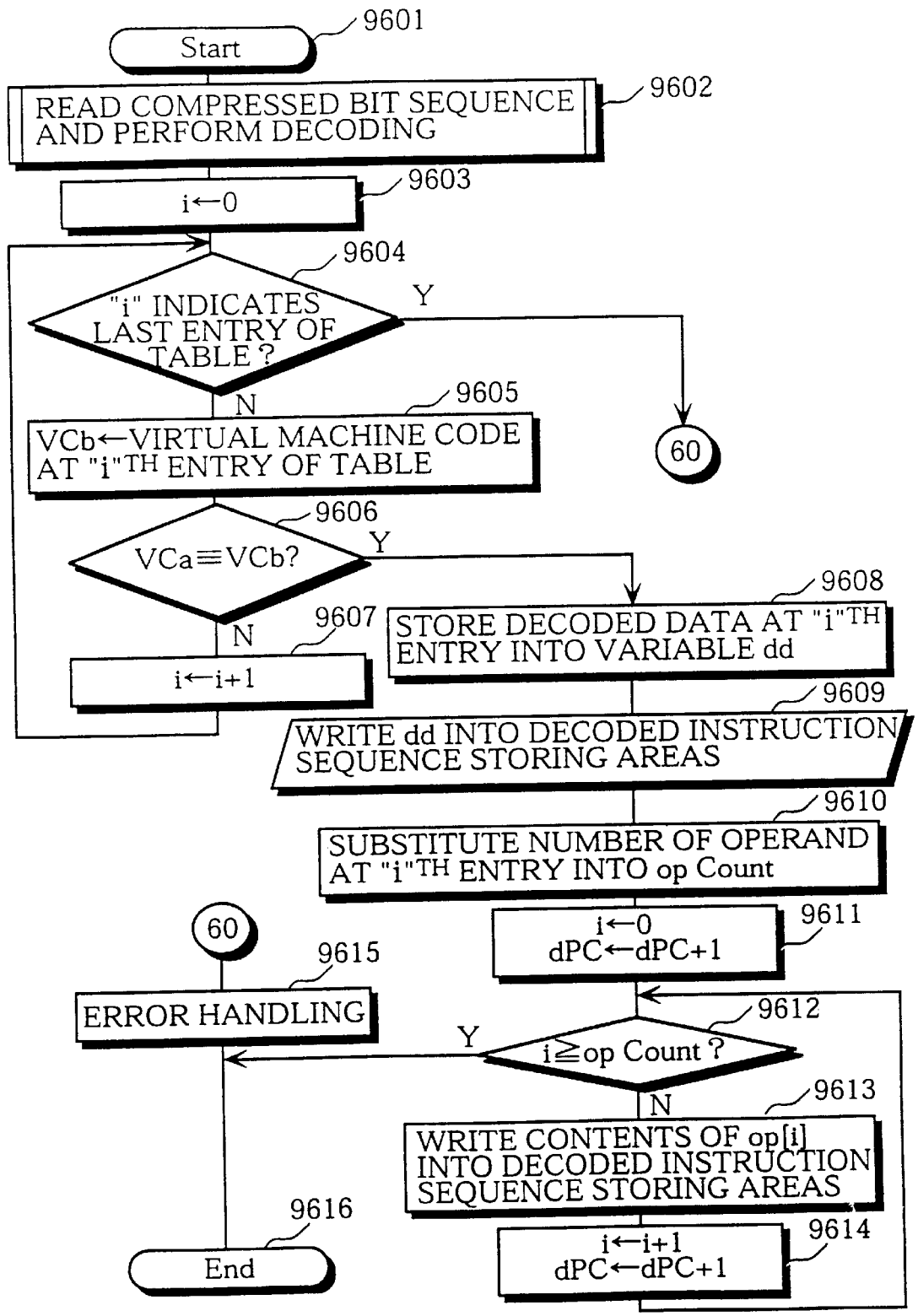
FIG. 97 is a flowchart showing the processing of the decoding unit of the virtual machine.

FIG. 97 is a flowchart showing the detailed processing of steps 9109 and 9110 in the FIG. 91 for this eighth embodiment. This processing is performed by the decoding unit 4102 of the virtual machine 4100. Here, steps 9602 and 9603~9616 in FIG. 97 respectively correspond to steps 9109 and 9110 in FIG. 91.

Figure 98:
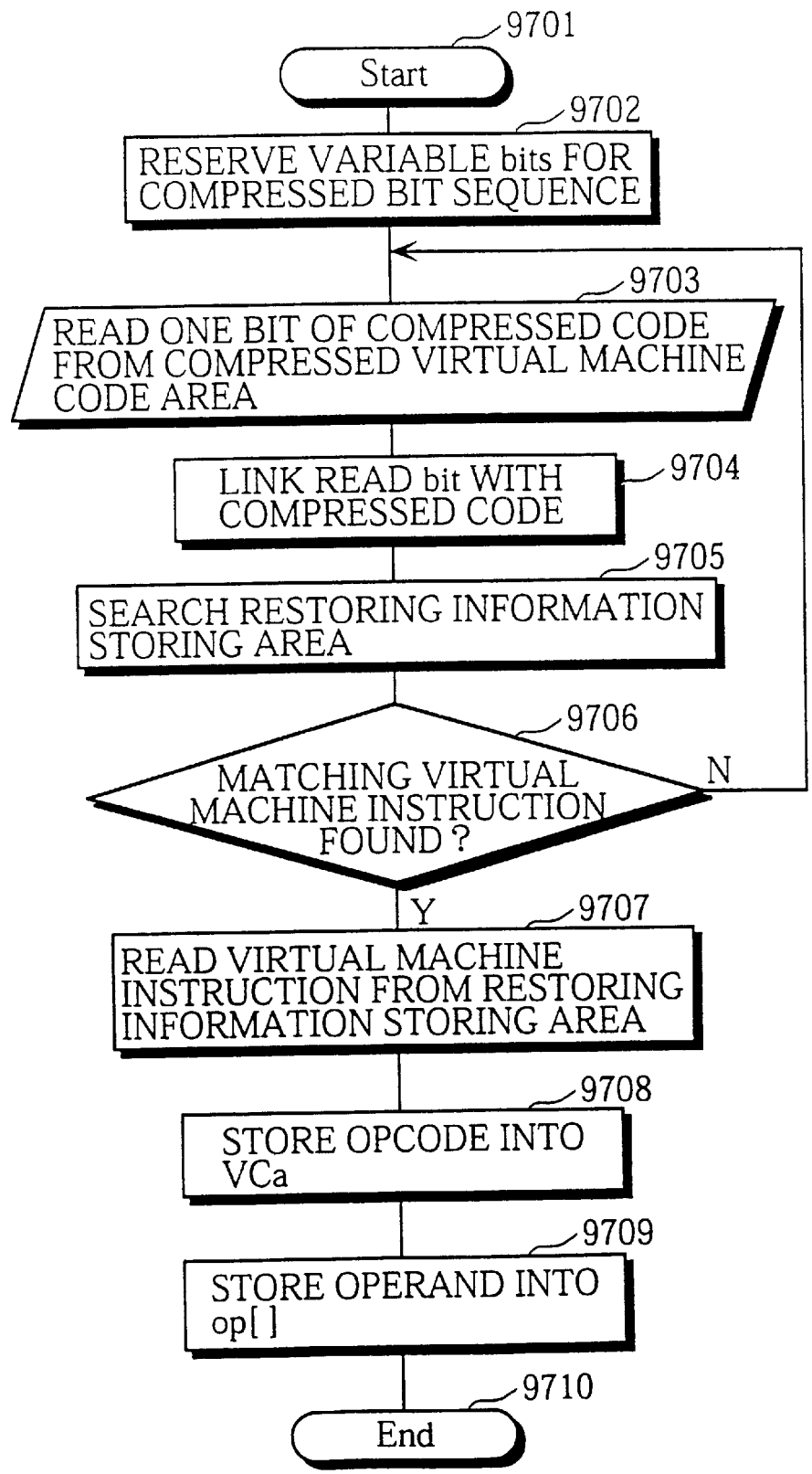
FIG. 98 is a flowchart showing the detailed processing of step 9602 in FIG. 97.

As can be understood by comparing FIG. 97 with FIG. 92 that shows the operation in the seventh embodiment, the differences between the two are as follows. First, instead of reading the virtual machine code directly, the present embodiment reads compressed bit sequences and performs decoding (step 9602). Second, operands (the patterns op[i]) are also obtained as necessary during the decoding (step 9602), so that instead of reading the operands from the instruction storing unit 4101, the present embodiment writes these operands (the patterns op[i]) into the decoded instruction sequence storing areas 4156a~4156d (step 9613). FIG. 98 is a flowchart showing the details of step 9602 in FIG. 97. The instruction reading unit 4103 first reserves a temporary storage area (the variable bits) for the compressed bit sequences (step 9702), and then reads one bit of compressed code from one of the compressed virtual machine code areas 4158a~4158d in one of the instruction block storing areas 4152a~4152d that does not have a decoded instruction sequence (step 9703). The instruction reading unit 4103 links this read bit with the compressed codes (the variable bits) that it has already read (step 9704).

The virtual machine instruction restoring unit 4103a compares the compressed code (the variable bits) obtained in step 9704 in order with each compressed code sequence registered in the decoding table in a restoring information storing area 4157a~4157d that starts from an address given by adding a predetermined offset to the value of the PC 3804, and so specifies the matching virtual machine instruction (step 9705). This reading (step 9703) and search (step 9705) are repeated until a matching virtual machine instruction is found (step 9706).

When a matching virtual machine instruction has been found, the virtual machine instruction restoring unit 4103a reads that virtual machine instruction from that restoring information storing area 4157a~4157d (step 9707) and outputs the virtual machine instruction to the search unit 4405, having separated the virtual machine instruction into an opcode and operand (the pattern op[ ]) when such operand exists (steps 9708, 9709). After this, the search unit 4405 converts the virtual machine instruction into the corresponding decoded data, as shown in steps 9603~9614 in FIG. 97, and the decoded instruction sequence writing unit 4008 writes this decoded data with the operand pattern op[ ] if necessary into the real machine code area of the corresponding instruction block. In this way, the virtual machine 4100 of the present embodiment arranges a compressed virtual machine program into each instruction block in the instruction storing unit 4101, so that when there is a branch to an instruction block that does not have a decoded instruction sequence, the virtual machine 4100 first decompresses the compressed virtual machine program in that instruction block, converts it into decoded data, and writes the decoded data into the instruction storing unit 4101 so that the decoded data can then be directly executed.

As a result, the virtual machine 4100 of the present embodiment guarantees that each compressed bit sequence will always be decoded starting from the start of an instruction block, which is to say, from the start of a complete instruction. As a result, the problems caused when the execution of a branch instruction leads to decoding being mistakenly performed starting midway through a compressed bit sequence can be completely avoided. In this way, the present embodiment realizes a virtual machine that can correctly execute virtual machine programs that have been compressed.

Note that while the instruction block storing areas 4152a~4152d in the instruction storing unit 4101 of the present embodiment are provided with decoded instruction sequence storing areas 4156a~4156d, provided that the conventional problem of failing to decode a compressed bit sequence from its start can still be avoided, these decoded instruction sequence storing areas 4156a~4156d may be omitted.

This is to say, the virtual machine 4100 of the present embodiment was described as corresponding to the virtual machine 4000 of the seventh embodiment, which includes the decoded instruction sequence storing areas 4156a~4156d, but having a further function of being able to decode and execute virtual machine programs that have been compressed. However, it is also possible to achieve a virtual machine that corresponds to the virtual machine 3800, which does not have decoded instruction sequence storing areas 4156a~4156d, but is capable of decoding and executing virtual machine programs that have been compressed. In either case, the compressed virtual machine program is stored in units of instruction blocks based on basic blocks, and the branch destination of every branch instruction is guaranteed to be the first instruction in an instruction block. This means that compressed bit sequences will not be mistakenly decoded starting midway through.

Note that while the present embodiment uses Huffman coding bo compress the virtual machine instruction, it should be obvious that LZ methods or other compression techniques may be used.

Ninth Embodiment

Figure 99:
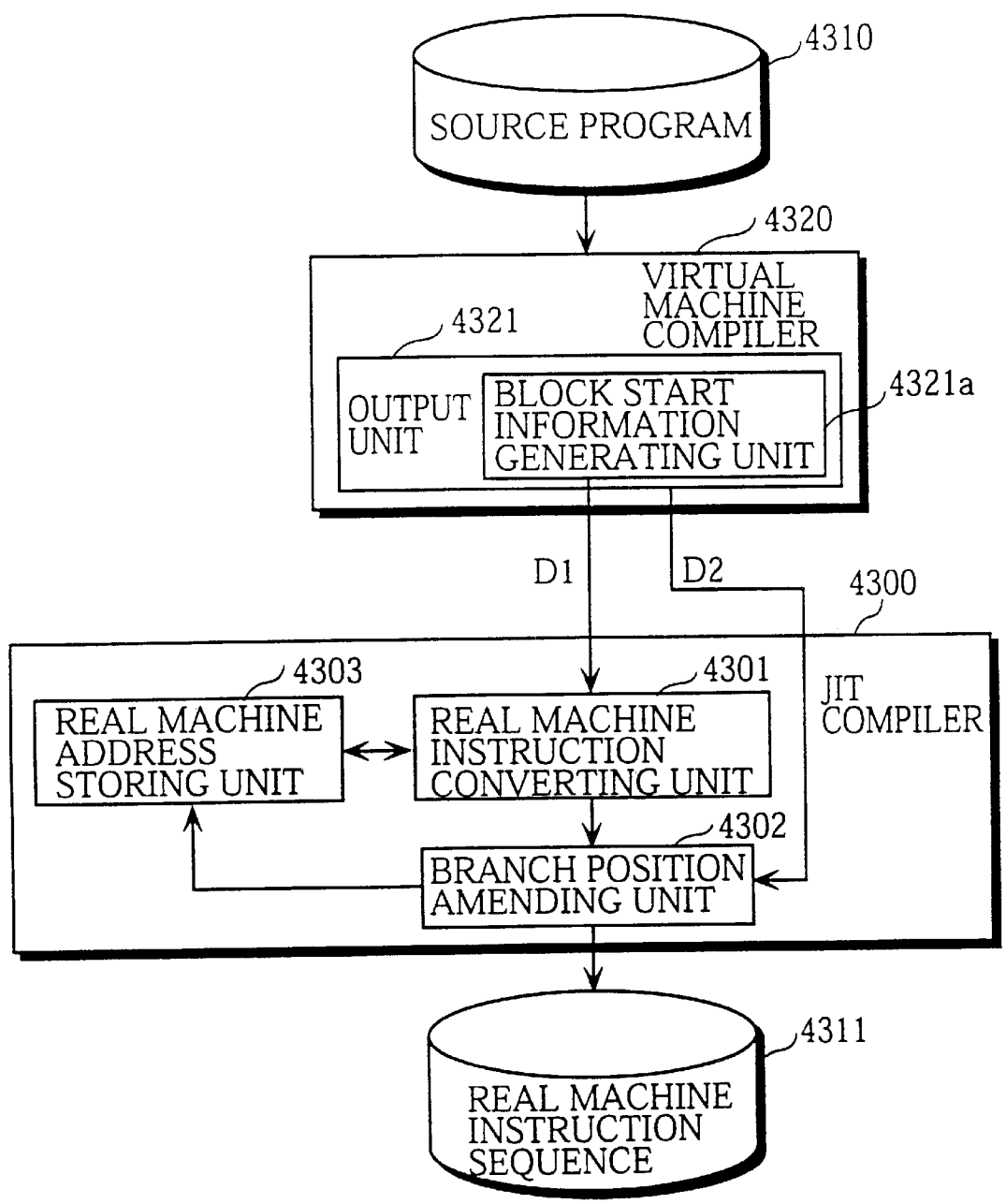
FIG. 99 is a block diagram showing the construction of the entire compiler system including the JIT compiler of the ninth embodiment.

The following explains the JIT compiler that is a ninth embodiment of the present invention. This JIT compiler can quickly generate real machine code that satisfies the boundary restrictions relating to jump destinations in the target real machine Construction of the Compiler System FIG. 99 is a functional block diagram showing the entire JIT compiler 4300 of the present embodiment. This figure shows not only JIT compiler 4300, but also the virtual machine compiler 4320 that generates the information that needs to be inputted into the JIT compiler 4300.

The virtual machine compiler 4320 is equipped with language conversion functions that are provided in a standard compiler, which means that it receives an input of a source program written in a high-level language like "C", generates virtual machine codes for a specified virtual machine, and outputs the resulting virtual machine codes to circuit D1. However, the virtual machine compiler 4320 is further equipped with a block start information generating unit 4321a that generates special information (the block start information) that is required by the JIT compiler 4300 and outputs this special information to the circuit D2.

The block start information generating unit 4321a is a function that is additionally provided in an output unit 4321 of a standard compiler, which is to say, an output unit 4321 that sequentially outputs virtual machine codes, which are finally obtained after syntactic analysis and conversion into intermediate code, to the periphery. This block start information generating unit 4321a judges whether each virtual machine code outputted from the output unit 4321 to the circuit D1 should be made the start of a basic block, and outputs the block start information that shows the results of these judgments to the circuit D2.

The JIT compiler 4300 receives an input of the virtual machine codes and the block start information generated by the virtual machine compiler 4320, and converts the virtual machine codes into a real machine instruction sequence 4311 for a real machine that has a restriction whereby the branch destinations of real machine instructions are based on the two-word alignment in the address space. This JIT compiler 4300 includes a real machine instruction converting unit 4301, a branch position amending unit 4302, and a real machine address storing unit 4303.

The real machine instruction converting unit 4301 operates as follows. When a virtual machine code outputted from the virtual machine compiler 4320 via the circuit D1 is an opcode, the real machine instruction converting unit 4301 converts the virtual machine code into the corresponding real machine code based on an internal conversion table. On the other hand, when a virtual machine code is an operand, the real machine instruction converting unit 4301 outputs the operand as it is to the branch position amending unit 4302. When doing so, the real machine instruction converting unit 4301 reads the real machine address PC stored by the real machine address storing unit 4303 and outputs it together with the real machine code to the branch position amending unit 4302, before updating the real machine address PC.

The real machine address storing unit 4303 stores a relative address PC in the real machine space at which the next real machine code to be generated should be placed in the real machine instruction converting unit 4301.

The branch position amending unit 4302 judges whether the real machine instruction at the start of a basic block is positioned at an odd-numbered address, based on the real machine address PC sent from the real machine instruction converting unit 4301 and the block start information outputted from the virtual machine compiler 4320 via the circuit D2. This is to say, the branch position amending unit 4302 judges whether this starting real machine instruction violates the restriction concerning the two-word alignment in the address space. If the address violates this restriction, the branch position amending unit 4302 inserts a one-word dummy instruction, which is to say, a no-operation instruction "Nop" in front of the instruction, before outputting the real machine code send from the real machine instruction converting unit 4301 to the periphery as part of the real machine instruction sequence 4311. By doing so, the branch position amending unit 4302 arranges the effective start of the basic block at an address complying with the two-word alignment without affecting the processing content of the program.

Operation of the Compiler System

The following is an explanation of a compiler system of the above construction, focusing on the differences with a standard compiler.

Figure 100:
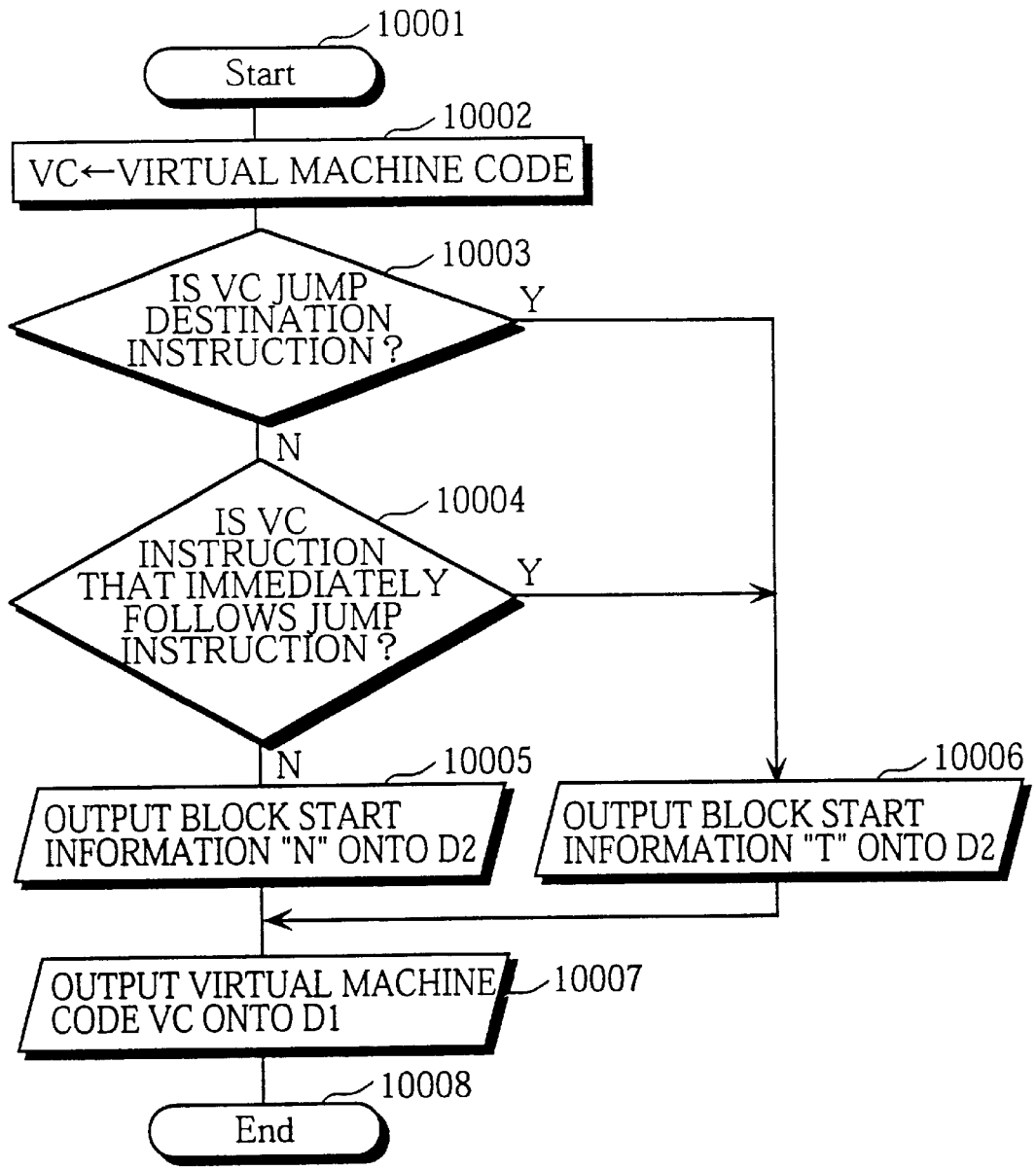
FIG. 100 is a flowchart showing the processing of the block start information generating unit of the virtual machine compiler.

FIG. 100 is a flowchart showing the operation of the block start information generating unit 4321a of the virtual machine compiler 4320. This flowchart has fundamentally the same flow as the operation of the virtual machine compiler of the fifth embodiment that was shown in FIG. 80.

First, the block start information generating unit 4321a judges whether each virtual machine code that the output unit 4321 is trying to output should be made the start of a basic block (steps 10003, 10004). The block start information generating unit 4321a outputs block start information "T" on judging that a virtual machine code should be made the start of a basic block, (step 10006), or otherwise outputs the block start information "N" (step 10005). The block start information generating unit 4321a outputs the block start information "T" or "N" to the circuit D1 and the virtual machine code VC to circuit D2 (step 10007).

Figure 101:
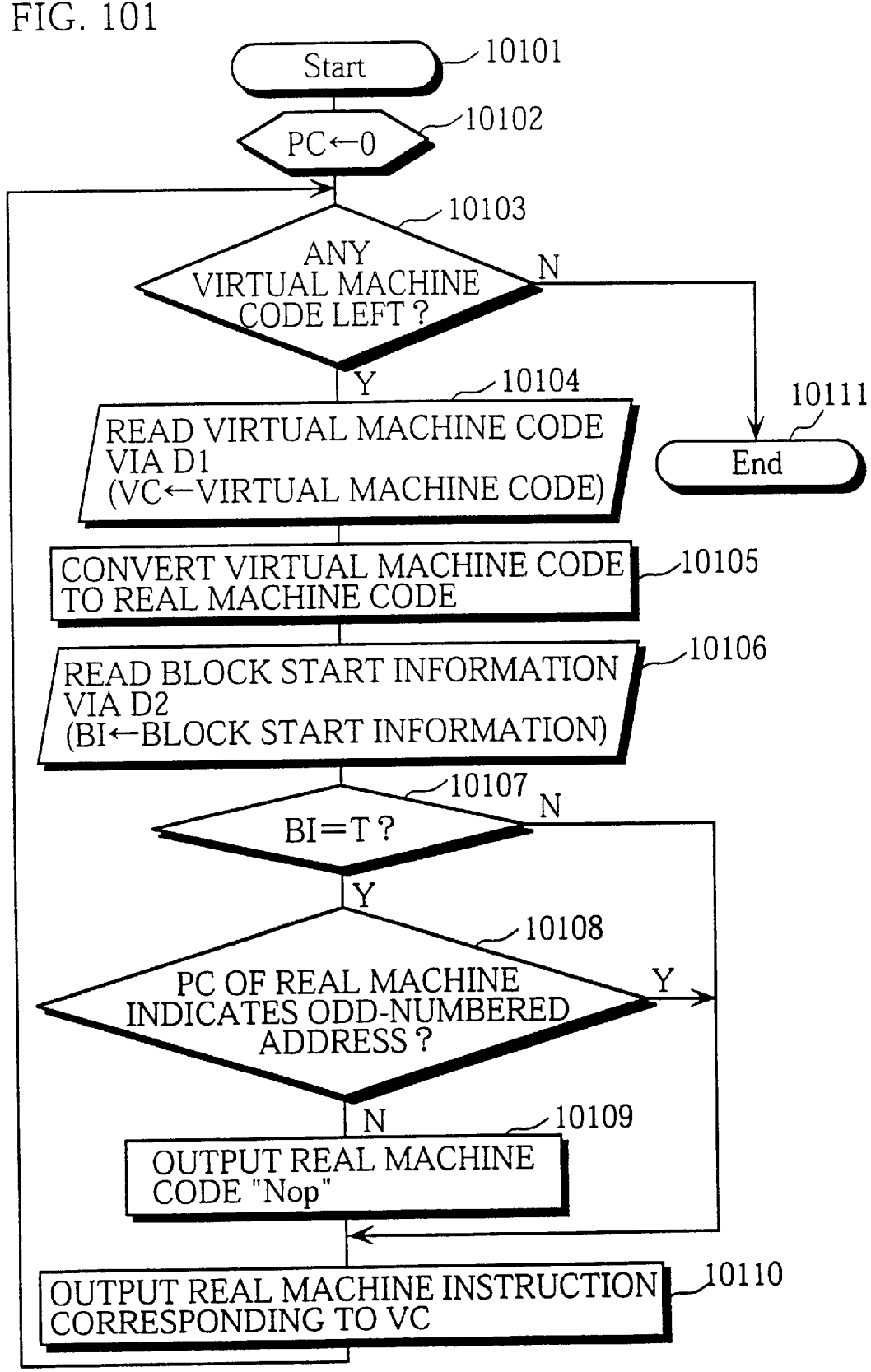
FIG. 101 is a flowchart showing the processing of the real machine instruction converting unit, the branch position amending unit, and the real machine address storing unit.

FIG. 101 is a flowchart showing the operation of the real machine instruction converting unit 4301, the branch position amending unit 4302, and the real machine address storing unit 4303. First, the real machine address storing unit 4303 initializes the real machine address PC (step 10102).

The real machine instruction converting unit 4301 receives the virtual machine code VC outputted by the block start information generating unit 4321a (steps 10103, 10304), converts the virtual machine code VC into a corresponding real machine code as necessary, and transfers this to the branch position amending unit 4302 together with the real machine address PC read from the real machine address storing unit 4303. After this, the real machine instruction converting unit 4301 increments the real machine address PC (step 10105).

Following this, the branch position amending unit 4302 receives the block start information "BI" corresponding to the virtual machine code VC from the block start information generating unit 4321a (step 10106) and, when outputting the real machine code received from the real machine instruction converting unit 4301, judges whether the virtual machine code will cause a violation of the boundary restrictions described earlier (steps 10107, 10108). Specifically, the branch position amending unit 4302 judges whether the block start information BI received from the block start information generating unit 4321a is "T" showing the start of a basic block and the real machine address PC received from the real machine instruction converting unit 4301 violates the two-word alignment restriction (steps 10107, 10108).

On judging that a virtual machine code VC should be made the start of a basic block and that the real machine address PC violates the two-word alignment restriction, the branch position amending unit 4302 generates and outputs a real machine instruction "Nop", before outputting the aforementioned real machine instruction as part of the real machine instruction sequence 4311 (steps 10109, 10110). Note that whenever the branch position amending unit 4302 generates "Nop" real machine instructions (step 10110), it also updates the real machine address PC in the real machine address storing unit 4303 accordingly.

The processing in steps 10104~10110 described above is repeated while virtual machine codes are transferred from the block start information generating unit 4321a (steps 10103, 10111).

FIG. 102 is a table showing the block start information generated by the block start information generating unit 4321a, the timing of the generation of "Nop" real machine instructions by the branch position amending unit 4302, and other related information, for a case when the sample virtual machine instruction sequence shown in FIG. 27 is inputted into the JIT compiler 4300. As can be seen from FIG. 102, the virtual machine instructions at the virtual machine addresses 0, 8, 15, and 31 are each set as the start of a basic block, so that the block start information "T" is generated for these instructions.

When processing the virtual machine address 15, the branch position amending unit 4302 receives the block start information "T" from the block start information generating unit 4321a and an odd number (35) as the real machine address PC from the real machine instruction converting unit 4301. Before outputting the virtual machine instruction corresponding to the virtual machine instruction "Push[1]", the branch position amending unit 4302 outputs a "Nop" instruction. As a result, cases where the first instruction in a block is located at an odd-numbered address can be avoided.

With the JIT compiler 4300 of the present embodiment, the analysis of the branch destinations of branch instructions does not require the complicated procedure that was conventionally necessary. As a result, the JIT compiler 4300 can generate real machine programs that do not violate the boundary restrictions for jump destinations. This is because the block start information generating unit 4321a in the virtual machine compiler 4320 detects the basic blocks and informs the JIT compiler 4300 of the block start information.

Compared to a conventional JIT compiler 4300, the JIT compiler 4300 of the present invention can eradicate the problems regarding boundary restrictions by merely adding "Nop" virtual machine instructions based on the block start information. As a result, the present embodiment realizes a JIT compiler that generates suitable real machine code where the jump destinations of jump instructions do not violate the boundary restrictions.

Note that while the block start information generating unit 4321a of the present embodiment is provided as an additional feature of the output unit 4321 of the virtual machine compiler 4320, this may be replaced with a procedure for dividing into basic blocks that is provided in a standard compiler. As part of optimization, a standard compiler will divide a program into basic blocks, so that by outputting block start information obtained during this block division procedure to the periphery (the JIT compiler 4300), a block start information generating unit 4321a can be easily realized.

In this ninth embodiment, "Nop" instructions are used as the no-operation instructions, although such no operation instructions do not need to be explicit. As one example, instructions that add zero to the value of a register may be used instead.

Also in the present embodiment, alignment processing is only performed when positioning real machine instructions that are jump destinations, although it should be obvious that other instructions may also be rearranged in the same way when there is a delayed branch or a canceling branch. This means that by merely arranging a required number of no-operation instructions at the start of a basic block, it can be guaranteed that delayed branches will be properly performed. This is because when basic blocks are arranged into memory with no intervals between them, the branch instruction that is located at the end of each basic block will definitely be linked to the required number of no-operation instructions, so that erroneous operations due to a delayed branch are avoided.

The virtual machine, virtual machine compiler, and JIT compiler of the present invention have been described by way of the first~ninth embodiments, although the present invention is not limited to these embodiments. The characteristic components of each embodiment may be combined or partially integrated into other embodiments, so that a variety of variations of the present invention may be realized.

As one example, by combining the first and fifth embodiments, the virtual machine program can be divided into basic blocks and stored into an instruction storing unit together with the corresponding next instruction information. This realizes a high-speed virtual machine that removes true data dependency and simplifies the address processing by a JIT compiler.

In the same way, combining the second and eighth embodiments realizes an interrupt-handling virtual machine that only performs sufficient interrupt handling and executes compressed bit sequences for which proper decoding is guaranteed.

Figure 103:

In the first embodiment, the next instruction information and virtual machine instructions have a separate structure to the block start information and virtual machine instructions in the ninth embodiment. As shown in FIG. 103, however, the virtual machine instructions executed by the virtual machine of the present invention may be defined as extended virtual machine instructions that have such next instruction information and block start information embedded. In such a case, by routinely branching after a read has been performed from an instruction storing unit in units of extended virtual machine instructions, the next instruction information, block start information, and opcode and operand(s) of the virtual machine can be distinguished and separately obtained.

In the fifth~eighth embodiments, each instruction block storing unit was given a unique identifier, although should identifiers do not need to be used if each instruction block can be separately identified, such as when each instruction block is arranged in an instruction block storing unit according to certain rules.

The virtual machine, virtual machine compiler, and JIT compiler of the present invention can each be realized by a program that is executed by a standard personal computer. It should be obvious that such programs may be distributed having been recorded onto a storage medium such as CD-ROM or by being transmitted via communication lines.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A Just-In-Time (JIT) compiler for use with a virtual machine that executes a virtual machine instruction sequence under control of a real machine, the JIT compiler converting parts of the virtual machine instruction sequence into real machine instruction sequences before execution, and the JIT compiler comprising:

block start information receiving means for receiving an input of block start information for each virtual machine instruction that composes the virtual machine instruction sequence, the block start information showing whether a corresponding virtual machine instruction would correspond to a start of a basic block if the virtual machine instruction sequence were divided into basic blocks;

converting means for converting virtual machine instructions in the virtual machine instruction sequence into real machine instruction sequences; and outputting means for rearranging the real machine instruction sequences produced by the converting means into basic block units in accordance with the block start information received by the block start information receiving means.

2. The JIT compiler of claim 1, further comprising branch violation judging means for judging, when a real machine instruction at a start of a produced real machine instruction sequence corresponds to a virtual machine instruction whose block start information indicates that the virtual machine instruction would be a start of a basic block, whether the real machine instruction is going to be arranged in an address that violates an address alignment restriction of the real machine, wherein if the real machine instruction is going to be arranged in an address that violates the address alignment restriction, the outputting means rearranges the real machine instruction sequence so that the real machine instruction is not arranged in the address.

3. The JIT compiler of claim 2, wherein the outputting means rearranges the real machine instruction sequence by inserting a necessary number of no-operation instructions at the start of the basic block to which the real machine instruction belongs.

4. The JIT compiler of claim 1, wherein the outputting means inserts a certain number of no-operation instructions at a start of each basic block, the number being a number of real machine instructions processed during a delay of a delayed branch.

5. A computer-readable recording medium that stores a program to have a computer function as a compiler that generates a program for a virtual machine with a stack architecture, wherein the compiler comprises:

instruction sequence converting means for converting a source program into a virtual machine instruction sequence executable by the virtual machine;

succeeding instruction information generating means for generating sets of succeeding instruction information corresponding to virtual machine instructions in the virtual machine instruction sequence, each set of succeeding instruction information indicating a change in a storage state of data in the stack due to execution of a virtual machine instruction executed after a virtual machine instruction corresponding to the set of succeeding instruction information; and associating means for associating each set of generated succeeding instruction information with a corresponding virtual machine instruction and outputting the set of succeeding instruction information and the virtual machine instruction.

6. A computer-readable recording medium that stores a program to have a computer function as a Just-In-Time (JIT) compiler used with a virtual machine that executes a virtual machine instruction sequence under control of a real machine, the JIT compiler converting parts of the virtual machine instruction sequence into real machine instruction sequences before execution, wherein the compiler comprises:

block start information receiving means for receiving an input of block start information for each virtual machine instruction that composes the virtual machine instruction sequence, the block start information showing whether a corresponding virtual machine instruction would correspond to a start of a basic block if the virtual machine instruction sequence were divided into basic blocks;

converting means for converting virtual machine instructions in the virtual machine instruction sequence into real machine instruction sequences; and outputting means for rearranging the real machine instruction sequences produced by the converting means into basic block units in accordance with the block start information received by the block start information receiving means.

7. A Just-In-Time (JIT) compiler for use with a virtual machine that executes a virtual machine instruction sequence under control of a real machine, the JIT compiler converting parts of the virtual machine instruction sequence into real machine instruction sequences before execution, and the JIT compiler comprising:

block start information receiving unit for receiving an input of block start information for each virtual machine instruction that composes the virtual machine instruction sequence, the block start information showing whether a corresponding virtual machine instruction would correspond to a start of a basic block if the virtual machine instruction sequence were divided into basic blocks;

converting unit for converting virtual machine instructions in the virtual machine instruction sequence into real machine instruction sequences; and outputting unit for rearranging the real machine instruction sequences produced by the converting means into basic block units in accordance with the block start information received by the block start information receiving unit.

8. The JIT compiler of claim 7, further comprising branch violation judging unit for judging, when a real machine instruction at a start of a produced real machine instruction sequence corresponds to a virtual machine instruction whose block start information indicates that the virtual machine instruction would be a start of a basic block, whether the real machine instruction is going to be arranged in an address that violates an address alignment restriction of the real machine, wherein if the real machine instruction is going to be arranged in an address that violates the address alignment restriction, the outputting unit rearranges the real machine instruction sequence so that the real machine instruction is not arranged in the address.

9. The JIT compiler of claim 8, wherein the outputting unit rearranges the real machine instruction sequence by inserting a necessary number of no-operation instructions at the start of the basic block to which the real machine instruction belongs.

10. The JIT compiler of claim 7, wherein the outputting unit inserts a certain number of no-operation instructions at a start of each basic block, the number being a number of real machine instructions processed during a delay of a delayed branch.

* * * * *